US012663652B2

(12) United States Patent
Li et al.

(10) Patent No.: US 12,663,652 B2
(45) Date of Patent: Jun. 23, 2026

(54) SYSTEMS, METHODS, AND DEVICES FOR ADHESION OF INTERIOR WAVEGUIDE PILLARS

(71) Applicant: Magic Leap, Inc., Plantation, FL (US)

(72) Inventors: Ling Li, Cedar Park, TX (US); Christophe Peroz, Tokyo (JP); Chieh Chang, Cedar Park, TX (US); Sharad D. Bhagat, Plantation, FL (US); Ryan Jason Ong, Plantation, FL (US); Ali Karbasi, Coral Gables, FL (US); Stephen Richard Rugg, Plantation, FL (US); Mauro Melli, Plantation, FL (US); Kevin Messer, Mountain View, CA (US); Brian George Hill, Duxbury, MA (US); Melanie Maputol West, Plantation, FL (US)

(73) Assignee: MAGIC LEAP, INC., Plantation, FL (US)

( * ) Notice: Subject to any disclaimer, the term of this patent is extended or adjusted under 35 U.S.C. 154(b) by 407 days.

(21) Appl. No.: 18/257,516

(22) PCT Filed: Dec. 21, 2021

(86) PCT No.: PCT/US2021/064679
    § 371 (c)(1),
    (2) Date: Jun. 30, 2023

(87) PCT Pub. No.: WO2022/140436
    PCT Pub. Date: Jun. 30, 2022

(65) Prior Publication Data
    US 2024/0036321 A1     Feb. 1, 2024

Related U.S. Application Data

(60) Provisional application No. 63/130,233, filed on Dec. 23, 2020.

(51) Int. Cl.
    *G02B 27/01*        (2006.01)
    *F21V 8/00*        (2006.01)

(52) U.S. Cl.
    CPC ........ *G02B 27/0176* (2013.01); *G02B 6/0076* (2013.01)

(58) Field of Classification Search
    CPC .......................... G02B 27/0176; G02B 6/0076
    See application file for complete search history.

(56) References Cited

U.S. PATENT DOCUMENTS

| | | |
|---|---|---|
| 2002/0106582 A1 | 8/2002 | Xu et al. |
| 2007/0152985 A1 | 7/2007 | Ostergaard et al. |

(Continued)

FOREIGN PATENT DOCUMENTS

| | | |
|---|---|---|
| EP | 3739015 A1 | 11/2020 |
| WO | 2019195193 A1 | 10/2019 |
| WO | 2020185954 A1 | 9/2020 |

OTHER PUBLICATIONS

Songhan Plastic Technology Co., Ltd. Datasheet for Aptek 6106-A/B Epoxy (Year: 2016).*

(Continued)

*Primary Examiner* — George G. King
(74) *Attorney, Agent, or Firm* — KLINTWORTH & ROZENBLAT LLP

(57) ABSTRACT

In some embodiments, a near-eye, near-eye display system comprises a stack of waveguides having pillars in a central, active portion of the waveguides. The active portion may include light outcoupling optical elements configured to outcouple image light from the waveguides towards the eye of a viewer. The pillars extend between and separate neighboring ones of the waveguides. The light outcoupling optical elements may include diffractive optical elements that are formed simultaneously with the pillars, for example, by imprinting or casting. The pillars are disposed on one or (Continued)

more major surfaces of each of the waveguides. The pillars may define a distance between two adjacent waveguides of the stack of waveguides. The pillars may be bonded to adjacent waveguides may be using one or more of the systems, methods, or devices herein. The bonding provides a high level of thermal stability to the waveguide stack, to resist deformation as temperatures change.

18 Claims, 33 Drawing Sheets

(56) References Cited

U.S. PATENT DOCUMENTS

| | | |
|---|---|---|
| 2011/0157679 A1 | 6/2011 | Fike, III et al. |
| 2014/0168260 A1 | 6/2014 | O'Brien et al. |
| 2020/0400941 A1 | 12/2020 | Li et al. |

OTHER PUBLICATIONS

Extended European Search Report and Supplementary Search Report and Search Opinion for European Patent Application No. 21912070.6 dated Oct. 23, 2024 [completion date Oct. 10, 2024]. (9 pages).
International Search Report and Written Opinion of the International Searching Authority for application PCT/US2021/064679 completion date Feb. 15, 2022, mailing date Mar. 16, 2022. (25 pages).

\* cited by examiner

210

R1

Z

210

R2

Z

210

R3

Z

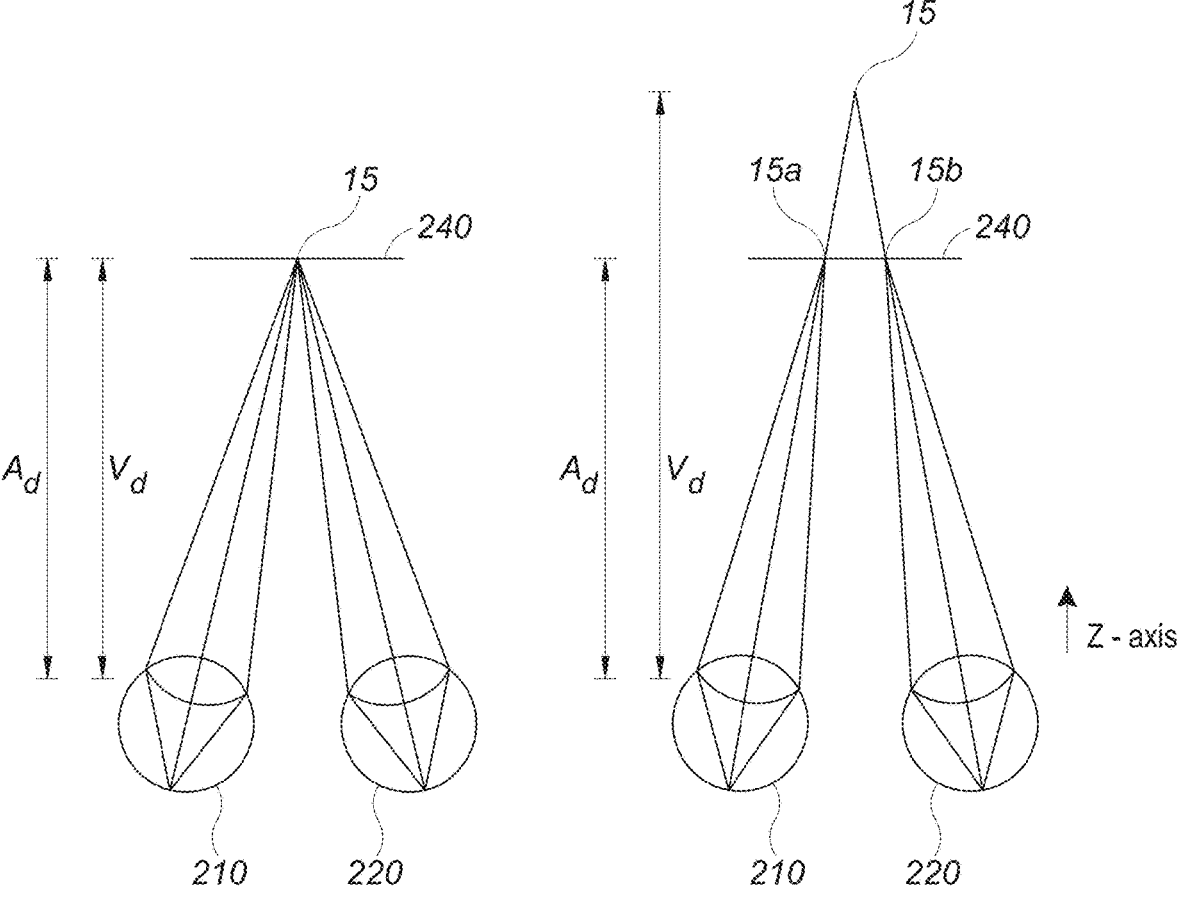
*FIG. 4C*            *FIG. 4D*

660

800, 810, 820

670, 680, 690

700    720

710

730, 740, 750

SYSTEMS, METHODS, AND DEVICES FOR ADHESION OF INTERIOR WAVEGUIDE PILLARS

BACKGROUND

Field

The present disclosure relates to display systems and, more particularly, to augmented reality display systems.

Description of the Related Art

Modern computing and display technologies have facilitated the development of systems for so called "virtual reality" or "augmented reality" experiences, wherein digitally reproduced images or portions thereof are presented to a user in a manner wherein they seem to be, or may be perceived as, real. A virtual reality, or "VR", scenario typically involves presentation of digital or virtual image information without transparency to other actual real-world visual input; an augmented reality, or "AR", scenario typically involves presentation of digital or virtual image information as an augmentation to visualization of the actual world around the user. A mixed reality, or "MR", scenario is a type of AR scenario and typically involves virtual objects that are integrated into, and responsive to, the natural world. For example, in an MR scenario, AR image content may be blocked by or otherwise be perceived as interacting with objects in the real world.

Referring to FIG. 1, an augmented reality scene 10 is depicted wherein a user of an AR technology sees a real-world park-like setting 20 featuring people, trees, buildings in the background, and a concrete platform 30. In addition to these items, the user of the AR technology also perceives that he "sees" "virtual content" such as a robot statue 40 standing upon the real-world platform 30, and a cartoon-like avatar character 50 flying by which seems to be a personification of a bumble bee, even though these elements 40, 50 do not exist in the real world. Because the human visual perception system is complex, it is challenging to produce an AR technology that facilitates a comfortable, natural-feeling, rich presentation of virtual image elements amongst other virtual or real-world imagery elements.

Systems and methods disclosed herein address various challenges related to AR and VR technology.

SUMMARY

Some aspects include a near-eye display system comprising: a stack of waveguides configured to display images by outputting image light, the stack of waveguides comprising: a first waveguide comprising an optically transmissive body, a first major surface, and a pillar integral with the optically transmissive body, the pillar extending vertically from the first major surface; a second waveguide comprising an optically transmissive body and a second major surface, the second major surface facing and spaced apart from the first major surface of the first waveguide by the pillar; one or more diffractive optical elements in a central area of the first major surface of the first waveguide, wherein the pillar is located in the central area; and an adhesive on a top surface of the pillar, the adhesive attaching the pillar to the second major surface of the second waveguide. In some embodiments, the adhesive has an as-deposited viscosity of less than 25 mPa·s at 25° C. In some embodiments, the near-eye display system further comprises a spacer integral with the optically transmissive body, the spacer extending vertically from the first major surface, wherein the spacer extends laterally along a perimeter of the first waveguide. In some embodiments, the spacer defines an edge of the first waveguide. In some embodiments, the first waveguide comprises a plurality of spacers extending vertically from the first major surface and laterally along a perimeter of the first waveguide.

In some embodiments, the top surface comprises a roughened surface. In some embodiments, the pillar comprises a maximum transverse cross-sectional dimension of 500 μm or less. In some embodiments, the pillar comprises a maximum transverse cross-sectional dimension of 300 μm or less. In some embodiments, wherein the pillars comprise a maximum transverse cross-sectional dimension of 100 μm or less. In some embodiments, the second major surface of the second waveguide comprises an indentation accommodating the pillar in the indentation. In some embodiments, the stack of waveguides comprises a plurality of waveguides, wherein two or more waveguides of the plurality of waveguides comprise a pillar and an indentation, wherein the indentations accommodate pillars of underlying waveguides. In some embodiments, the pillar comprises a shape selected from the group consisting of rectangular prism, rectangular pyramid, triangular prism, triangular pyramid, cylinder, and cone. In some embodiments, the first and the second waveguide are separated by an air gap having a size defined by the pillar and adhesive.

In some embodiments, the one or more diffractive optical elements comprise: in-coupling optical elements configured to in-couple incident image light; and out-coupling optical elements configured to out-couple the in-coupled image light, wherein the out-coupling optical elements are disposed within the central area. In some embodiments, the near-eye display system further comprises a light projector system configured to project the image light to the in-coupling optical elements.

Some aspects include a near-eye display system comprising: an eyepiece comprising: a waveguide comprising: an optically transmissive body comprising at least one pillar integral with the optically transmissive body; and out-coupling optical elements configured to out-couple light propagating within the optically transmissive body; and an overlying waveguide spaced from the waveguide by the at least one pillar; wherein the optically transmissive body comprises a first composition and at least a tip of the at least one pillar comprises a second composition different from the first composition. In some embodiments, the out-coupling optical elements comprises a diffractive grating comprising a plurality of protrusions and intervening recesses on a major surface of the optically transmissive body, wherein the at least one pillar extends from the major surface to a height greater than a height of the plurality of protrusions.

In some embodiments, the second composition comprises a lower concentration of photoinitiator than the first composition. In some embodiments, the second composition comprises a transparent material. In some embodiments, the second composition comprises a hydrophilic or superhydrophilic material. In some embodiments, the second composition comprises an adhesion-promoting layer. In some embodiments, wherein the adhesion-promoting layer comprises a silane mixture. In some embodiments, the adhesion-promoting layer forms a top surface of the at least one pillar. In some embodiments, the second composition comprises a hydroxyl group. In some embodiments, the at least a tip comprises a top surface of the at least one pillar.

Some aspects include a method for making a waveguide stack, the method comprising: forming an underlying waveguide, wherein forming the underlying waveguide comprises: defining diffractive optical elements and an integral pillar on a top major surface of the underlying waveguide, wherein the integral pillar is located amidst the diffractive optical elements and extends to a height above the out-coupling optical elements; and providing an adhesive on a top surface the integral pillar; and bringing the overlying waveguide and the adhesive on the top surface into contact with one another to attach the overlying waveguide to the underlying waveguide, wherein the integral pillar defines a gap between the top major surface of the underlying waveguide and a bottom surface of the overlying waveguide.

In some embodiments, the adhesive comprises a liquid adhesive. In some embodiments, the adhesive is provided by dipping the top surface of the pillar into a reservoir of the adhesive or a sponge loaded with the adhesive. In some embodiments, providing the adhesive on the top surface comprises dispensing the adhesive from an ink-jet printer. In some embodiments, the adhesive has a viscosity of less than 25 mPa·s at 25° C.

Some aspects include a method for making a waveguide stack, the method comprising: forming an underlying waveguide, wherein forming the underlying waveguide comprises defining diffractive optical elements and an integral pillar on a major surface of the underlying waveguide, wherein the integral pillar is located amidst the diffractive optical elements and extends to a height above the diffractive optical elements; stacking an overlying waveguide on the underlying waveguide; bonding the integral pillar to a bottom surface of the overlying waveguide by annealing the underlying waveguide and the overlying waveguide at a heating temperature and for a heating duration, wherein the integral pillar defines a gap between the major surface of the underlying waveguide and the bottom surface of the overlying waveguide.

In some embodiments, annealing the underlying waveguide is performed at a heating temperature and duration to soften only a portion of the integral pillar proximate to the overlying waveguide. In some embodiments, the heating temperature is at or above a glass transition temperature (Tg) of the pillar. In some embodiments, annealing the underlying waveguide comprises placing the underlying waveguide and the overlying waveguide into an oven in a vertical orientation, such that the overlying waveguide is oriented above the underlying waveguide. In some embodiments, annealing the underlying waveguide and the overlying waveguide at a heating temperature and for a heating duration causes the waveguide stack to undergo a softening process. In some embodiments, the method further comprises cooling the underlying waveguide following the annealing the underlying waveguide, wherein the cooling hardens the underlying waveguide.

Some aspects include a method for making a waveguide stack, the method comprising: forming an underlying waveguide, wherein forming the underlying waveguide comprises defining diffractive optical elements and an integral pillar on a major surface of the underlying waveguide, wherein the integral pillar is located amidst the diffractive optical elements and extends to a height above the diffractive optical elements; curing the underlying waveguide using ultraviolet light, wherein the major surface of the underlying waveguide is cured to a greater extent than at least a tip of the integral pillar; and stacking an overlying waveguide on the underlying waveguide, wherein the integral pillar defines a gap between the major surface of the underlying waveguide and the bottom surface of the overlying waveguide.

In some embodiments, curing the underlying waveguide using ultraviolet light comprises directing the ultraviolet light to the underlying waveguide from underneath the underlying waveguide such that the tip of the integral pillar receives less ultraviolet light than the major surface of the underlying waveguide. In some embodiments, the composition of the tip of the integral pillar is different from a composition of a remaining portion of the integral pillar and the major surface of the underlying waveguide. In some embodiments, the tip of the plurality of integral pillar comprises a lower concentration of photoinitiator than a remaining portion of the integral pillar and the major surface of the underlying waveguide.

Some aspects include a method for making a waveguide stack, the method comprising: forming an underlying waveguide, wherein forming the underlying waveguide comprises: casting diffractive optical elements and an integral pillar on a major surface of the underlying waveguide, wherein the integral pillar is located amidst the diffractive optical elements and extends to a height above the out-coupling optical elements, wherein the major surface of the underlying waveguide is formed with a first material, and at least a tip of the integral pillar is casted with a second material having a different composition than the major surface of the underlying waveguide; and attaching an overlying waveguide to the underlying waveguide, wherein the integral pillar defines a gap between the major surface of the underlying waveguide and a bottom surface of the overlying waveguide.

In some embodiments, the at least a tip of the integral pillar comprises the whole integral pillar. In some embodiments, the at least a tip of the integral pillar comprises a hydrophilic or superhydrophilic material. In some embodiments, casting the integral pillar comprises: dispensing the second material into one or more openings of a casting mold; and subsequently dispensing the first material into the one or more openings of the casting mold.

Some aspects include a method for making a waveguide stack, the method comprising: forming an underlying waveguide, wherein forming the underlying waveguide comprises: providing monomers in the mold; polymerizing the monomers to define diffractive optical elements and an integral pillar on a major surface of the underlying waveguide; and subsequently removing the waveguide from the mold, wherein the integral pillar is located amidst the diffractive optical elements and extends to a height above the diffractive optical elements, and wherein a tip of the pillar comprises residual monomers; stacking an overlying waveguide on the underlying waveguide; and applying energy to the residual monomers to cause reactions between the residual monomers and the overlying waveguide, wherein the integral pillar defines a gap between the major surface of the underlying waveguide and the bottom surface of the overlying waveguide.

In some embodiments, the overlying waveguide and the underlying waveguide comprise polydimethylsiloxane (PDMS). In some embodiments, applying energy to the residual monomers comprises treating the stacked overlying waveguide and the underlying waveguide with heat or ultraviolet light.

Some aspects include a near-eye display system comprising: a stack of waveguides, the stack of waveguides comprising: a first waveguide comprising an optically transmissive body, a first major surface, and a pillar integral with the optically transmissive body, the pillar extending vertically from the first major surface; a second waveguide comprising an optically transmissive body and a second major surface, the second major surface facing and spaced apart from the first major surface of the first waveguide by the pillar, and the second major surface comprising an indentation, wherein a portion of the pillar is positioned within the indentation; one or more diffractive optical elements in a central area of the first major surface of the first waveguide, wherein the pillar is located in the central area.

In some embodiments, the indentation comprises a lateral dimension, the lateral dimension being between 0% and 20% larger than a lateral dimension of the pillar. In some embodiments, the indentation has a height of 2 μm to 20 μm from the second major surface.

Some aspects include a method for making a waveguide stack, the method comprising: forming an underlying waveguide, wherein forming the underlying waveguide comprises: defining diffractive optical elements and an integral pillar on a major surface of the underlying waveguide, wherein the integral pillar is located amidst the diffractive optical elements and extends to a height above the out-coupling optical elements; and providing an adhesion-promoting material on a top surface the integral pillar; and attaching an overlying waveguide to the underlying waveguide, wherein the integral pillar defines a gap between the major surface of the underlying waveguide and a bottom surface of the overlying waveguide.

In some embodiments, the adhesion-promoting material comprises silane, titanate, zirconate, zircoaluminate, alkyl phosphate ester mixtures, or a metal organic. In some embodiments, the adhesion-promoting material comprises an interfacial layer between the top surface of the integral pillar and an adhesive. In some embodiments, the adhesion-promoting material is deposited directly onto the integral pillars after the integral pillars are casted. In some embodiments, the adhesion-promoting material is deposited onto one or more holes of a casting mold of the underlying waveguide, such that the adhesion-promoting material is provided on the top surface of the integral pillar during casting of the integral pillar.

Some aspects include a method for making a waveguide stack, the method comprising: forming an underlying waveguide, wherein forming the underlying waveguide comprises: defining diffractive optical elements and an integral pillar on a major surface of the underlying waveguide, wherein the integral pillar is located amidst the diffractive optical elements and extends to a height above the out-coupling optical elements; and modifying a surface of the underlying waveguide by contacting the underlying waveguide with a plasma; and attaching an overlying waveguide to the underlying waveguide, wherein the integral pillar defines a gap between the major surface of the underlying waveguide and a bottom surface of the overlying waveguide.

In some embodiments, modifying the surface of the underlying waveguide causes the surface to become more hydrophilic. In some embodiments, modifying the surface of the underlying waveguide forms hydroxyl groups on the surface.

Some aspects include a near-eye display system comprising: a stack of waveguides, the stack of waveguides comprising: a first waveguide comprising an optically transmissive body, a first major surface, and a pillar integral with the optically transmissive body, the pillar extending vertically from the first major surface, wherein a top surface of the pillar comprises a roughened surface; a second waveguide comprising an optically transmissive body and a second major surface, the second major surface facing and spaced apart from the first major surface of the first waveguide by the integral pillar; and one or more diffractive optical elements in a central area of the first major surface of the first waveguide, wherein the pillar is located in the central area.

In some embodiments, the near-eye display system further comprises one or more spacers positioned along a perimeter of the first major surface of the waveguide, wherein the pillar is taller than the one or more spacers. In some embodiments, the roughened surface comprises a nanostructure formed during casting of the first waveguide. In some embodiments, the roughened surface comprises a was roughened by physical abrasion of the top surface of the pillar.

BRIEF DESCRIPTION OF THE DRAWINGS

FIG. 4C illustrates an example of a representation of a top-down view of a user viewing content via a display system.

FIG. 4D illustrates another example of a representation of a top-down view of a user viewing content via a display system.

DETAILED DESCRIPTION

Figure 1:
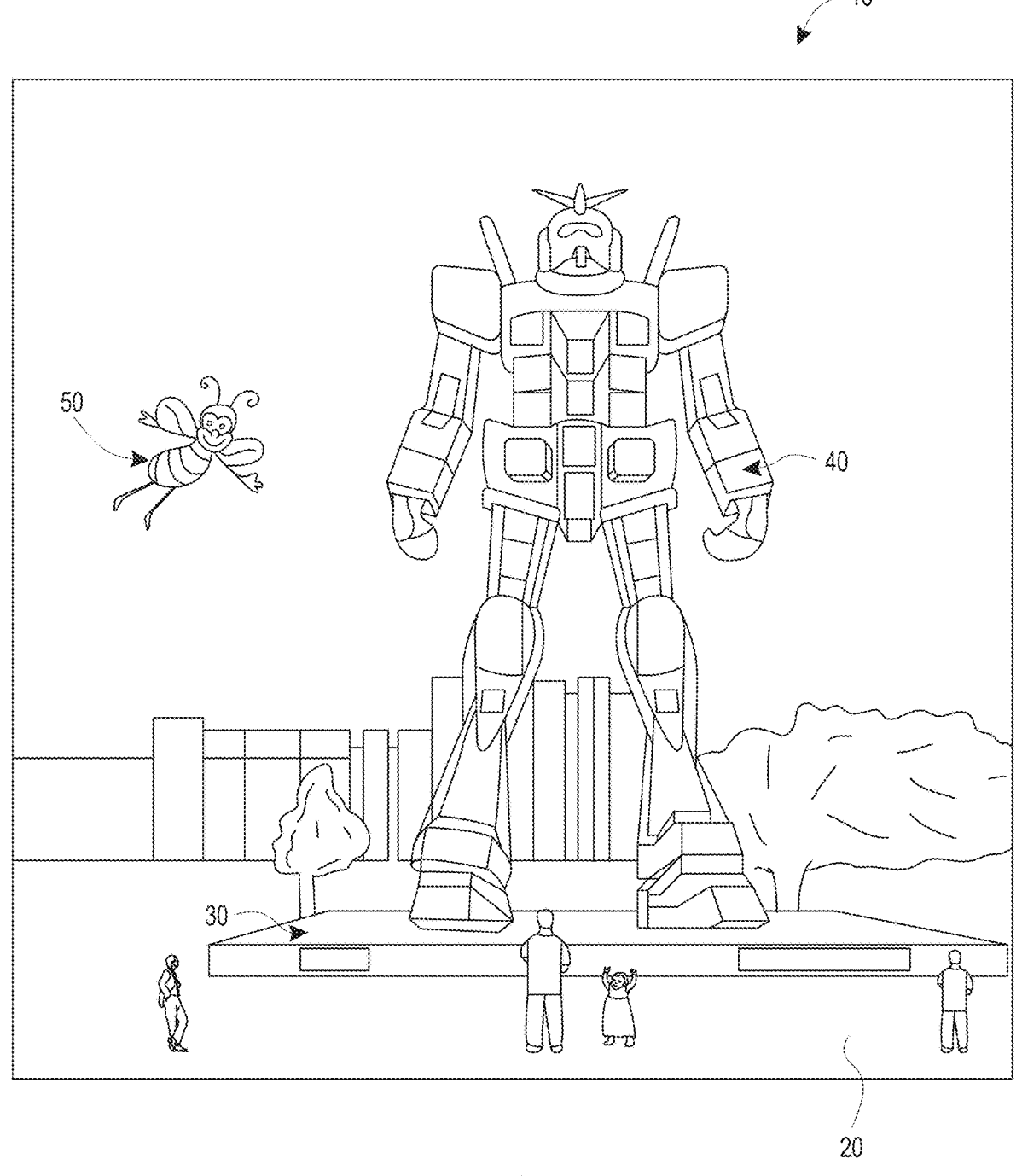
FIG. 1 illustrates a user's view of augmented reality (AR) through an AR device.

Near-eye augmented and virtual reality display systems may include eyepieces for directing image light, having image information, into the eyes of a viewer to form images. Such display systems may include wearable or head-mounted display systems, so-called since they may be worn on the head of the viewer.

The eyepieces for outputting image light may be formed of stacks of waveguides comprising two or more waveguides that are separated by fixed distances. In some embodiments, adjacent waveguides in a stack of waveguides may be spaced apart by one or more spacers located on a peripheral portion of each of the waveguides. In some embodiments, the waveguides may additionally or alternatively comprise one or more pillars located in a central portion of the underlying waveguide. The pillars may be used alone or in combination with the spacers to maintain a relatively fixed distance between the adjacent waveguides.

It will be appreciated that the pillars may be located in portions of the waveguides to output image light and/or allow a view of the ambient environment in the case of augmented reality displays. In some embodiments, the pillars may comprise a sufficiently small profile along the visual axis, such that the pillars will not interfere with the sight lines of a wearer. For example, the cross-sectional sizes of the pillars may be sufficiently small that they are substantially imperceptible by an average viewer.

As discussed herein, systems, devices, and methods utilizing waveguides with integrated pillars advantageously allows the formation of eyepieces with high thermal stability. For example, the systems, devices, and methods herein may improve the thermal stability of eyepieces formed using polymer waveguides. Many eyepieces used in augmented and virtual reality display systems are made of glass. However, glass eyepieces may have undesirable properties such as poor durability and excessive weight. Polymer eyepieces, on the other hand, are generally lighter and may provide enhanced durability relative to glass, while also having advantages for ease of manufacturing.

A challenge with polymer eyepieces, however, is the thermal stability of the eyepieces. The constituent polymer materials may have a relatively high coefficient of thermal expansion (CTE) (e.g., some polymers may have a CTE that is ~7× of that of glass material). Consequently, because the degree of expansion may be proportional to temperature, temperature variations across the polymer material may result in local differences in the expansion of the polymer material. As a result, temperature differences across an eyepiece may cause pronounced differences in the expanded volume of different parts of the eyepiece, which may cause physical warping of the eyepiece and may degrade the performance of a display using the eyepiece.

For example, deformation in the eyepiece may be induced by the heat generated by the display system during operation. Many AR and VR wearables comprise projectors, having a heat generating part such as a light source, or other heat sources that are located in close proximity to the eyepiece. Portions of the eyepiece that are directly adjacent to the projector or other heat source may receive a greater amount of heat than portions of the eyepiece further from the projector or other heat source. Relatively large degrees of polymer expansion at portions of waveguides of the eyepiece receiving greater amounts of heat may result in reduced optical performance as light outputted from the waveguides may propagate away from the waveguides at unintended angles due to the deformation. For example, waveguides forming a waveguide stack that forms an eyepiece may become misaligned or nonparallel, such that different waveguides may undesirably output light in different directions.

Preferably, the eyepieces have high mechanical and thermal stability so as to prevent deformation, expansion, or collapse of the eyepiece structure due to exposure to heat, such as described above. Systems, devices and methods herein facilitate bonding of an integrated pillar structure to adjacent waveguides, such that the eyepiece formed by a stack of the waveguides maintains a high level of physical integrity and thermal stability under operation. Strategies to adhere pillars to neighboring waveguides are disclosed herein. Advantageously, such adhesion may provide a high level of structural and thermal stability for polymer eyepieces by, e.g., further integrating constituent waveguides as a unitary structure.

It will be appreciated that spacers for supporting and attaching neighboring waveguides to one another may be disposed at the peripheries of the waveguides. In some embodiments, both the spacers and the pillars may be considered integrated or integral structures with a waveguide in the sense that the pillars and/or spacers may be formed simultaneously with the main body of the waveguide, e.g., by casting in a mold, as discussed herein. The pillars and spacers may be formed at least partially of the same material as the waveguide, such that there is no discernible boundary at locations at which the pillars and spacers are attached to the main body of the waveguide.

Strategies for forming and using integrated spacers are discussed in U.S. patent application Ser. No. 16/909,922, entitled WAVEGUIDES HAVING INTEGRAL SPACERS AND RELATED SYSTEMS AND METHODS, U.S. Patent Application No. 62/651,502, entitled WAVEGUIDES HAVING INTEGRATED SPACERS AND METHODS FOR MAKING THE SAME, U.S. Patent Application No. 62/908, 247, entitled WAVEGUIDE HAVING INTEGRATED SPACERS AND RELATED SYSTEMS AND METHODS, U.S. Patent Application No. 62/865,689, entitled STRATEGIES FOR STACKING POLYMER EYEPIECE LAYERS WITH IN-SITU CASTED INTEGRATED SPACERS, PCT Application No. PCT/US2019/025236, entitled WAVEGUIDES HAVING INTEGRATED SPACERS, WAVEGUIDES HAVING EDGE ABSORBERS, AND METHODS FOR MAKING THE SAME, and PCT Application No. PCT/US2020/039199, entitled WAVEGUIDES HAVING INTEGRAL SPACERS AND RELATED SYSTEMS AND METHODS. Each of the foregoing applications is hereby incorporated by reference in its entirety.

In some embodiments, one or more waveguides, which may be used to form a stack of waveguides, include integral pillars for providing a desired separation from overlying or underlying structures, such as other waveguides. The waveguides may form an eyepiece which is part of a display system (e.g., AR or VR headsets), with the waveguides having light out-coupling optical elements for redirecting image light, propagating within the waveguide by total internal reflection, to a user's eye. In some embodiments, the light out-coupling optical elements may be surface relief features, e.g., diffractive optical elements that are formed simultaneously with the integral pillars. In addition to display systems, various embodiments described herein may be applied generally to the stacking of polymer waveguides where a fixed separation distance is required between waveguides, particularly where structural stability under nonuniform heating (which may be referred to herein as thermal stability) is desired.

In some embodiments, the pillars and the main body of the waveguides form a monolithic structure, and such pillars may be referred to as integral pillars, as discussed herein. In some embodiments, integral spacers may additionally be part of the monolithic waveguide structure. In some embodiments, the waveguide may be a hybrid waveguide comprising a plurality of layers, one of which may include the pillars and the out-coupling optical elements, and optionally the integral spacers. In some embodiments, the pillars and the main body of the waveguide (or a layer of a hybrid waveguide), and optionally integral spacers, may have the same material composition, which extends continuously and homogeneously from the main body (or layer of the hybrid waveguide) to define at least a portion of the pillars and optional spacers extending up from the main body. It will be appreciated that spacers may be located outside of portions of a waveguide that output image light and/or provide a view of the outside world, e.g., the spacers are outside of the viewing area of the waveguide. As such, the spacers are larger than the pillars, which may be in the viewing area.

In some embodiments, the pillars may be located in the viewing area of the waveguide and may be sized and shaped such that they are substantially not visible to the user (e.g., such that interference with the sightlines of a user may be eliminated or sufficiently mitigated to provide good display quality and a view of the external environment). It will be appreciated that the viewing area may comprise out-coupling optical elements that redirect image light, propagating within the waveguide by total internal reflection, out of the waveguide towards the user's eye. In some other embodiments, the out-coupling optical elements may be located in the viewing area of the waveguide, while the pillars may be located in non-viewing area of the waveguide (e.g., an area of the waveguide spaced apart from an area having the diffractive optical elements), such that the pillars do not interfere with sightlines of a user of a display system comprising the waveguide. For example, the pillars may be located in an area of the waveguide comprising light-redirecting features for directing light from in-coupling optical elements to out-coupling optical elements, as discussed further herein.

As noted above, waveguide-based eyepieces for VR and AR applications may be assembled by stacking two or more waveguides as different layers of the eyepieces. In some embodiments, each waveguide may be separated by an air gap of about 10 µm to 200 µm. Polymer eyepieces may have a variety of advantages over glass eyepieces, including lower weight, lower cost, greater mechanical durability, and simpler manufacturing, particularly when the manufacturing includes forming surface features for redirecting light (including in-coupling and out-coupling light). However, a challenge of integrating polymer eyepieces with a near-eye display is the low thermal stability of the eyepiece caused by the high CTE of the polymer material, as discussed herein. This non-uniformity may have negative consequences on the performance and usability of display devices with the polymer eyepieces. For example, waveguide-based display devices may outcouple image light to display an image. In some embodiments, different component color images are outputted from different waveguides to form a single-color image. It will be appreciated that deformation of different waveguides may cause outputted light from the different waveguides to reach the eye at different angles, which may undesirably cause misalignments between the different component color images. In addition, the angles at which image light is outputted from the waveguides may be significant to providing a desired field of view, with image light for displaying virtual objects from different parts of the field of view impinging on the eye at different angles. Because deformation of the waveguides may cause the image light to impinge on the eye from unintended angles, desired field of view and the realism of the virtual object may be negatively impacted.

However, it has been found that under some conditions, even when additionally provided with pillars, waveguides of an eyepiece may separate due to thermal expansion or pillars may slip due to compression of neighboring waveguides. Thus, disclosed herein are systems, methods, and devices for adhesion and/or bonding of the pillars to adjacent eyepiece waveguides, which may advantageously mitigate separation between neighboring waveguides and which may better form a monolithic eyepiece structure to maintain a fixed distance between the waveguides forming the eyepiece.

It will be appreciated that one or more pillars located in a central, viewing area of a waveguide may provide a desired spacing between the waveguide and an overlying waveguide. The systems, methods, and devices herein utilize the pillars to form a monolithic polymer eyepiece stack with waveguides that may move together to provide substantially constant separation and orientation between waveguides even under nonuniform heating of the eyepiece. Consequently, an improved parallelism between the waveguides and better optical performance of the display can be achieved. It will be appreciated that the polymer eyepieces, and their constituent waveguides, described herein may be either flat or curved.

In some embodiments, adhesives are applied on tips of the pillars. The pillars may have various shapes, including any of those illustrated in FIG. 17. For example, the pillars may comprise rectangular prisms, rectangular pyramids, triangular prisms, triangular pyramids, cylinders, cones, or any other desired three-dimensional shape. In some embodiments, different pillars of the same waveguide may have different shapes. In some embodiments, the upper surfaces of the pillars may have an indentation for retaining adhesive on the tip of the pillars. As discussed herein, the pillars may be bonded to an adjacent waveguide to mitigate waveguide stack separation during device operation.

In some embodiments, the adhesive applied to the pillars is a low viscosity adhesive. For example, in some embodiments, the adhesive may comprise a viscosity of less than about 50 cP at 25° C., including less than 25 cP at 25° C. For example, in some embodiments, the adhesive may have a viscosity, at 25° C., of about 1 cP, about 2 cP, about 3 cP, about 4 cP, about 5 cP, about 6 cP, about 7 cP, about 8 cP, about 9 cP, about 10 cP, about 11 cP, about 12 cP, about 13 cP, about 14 cP, about 15 cP, about 16 cP, about 17 cP, about 18 cP, about 19 cP, about 20 cP, about 21 cP, about 22 cP, about 23 cP, about 24 cP, about 25 cP, or any value between the aforementioned values. In some embodiments, the adhesive may be applied to the pillars with an ink-jet printer. Alternatively, the adhesive may be applied by dipping the waveguide structure, including the pillars, into a pool of liquid adhesive or a 'sponge pad' that is loaded with liquid adhesive. When a pool of liquid adhesive or a 'sponge pad' is utilized, the range of viscosities of the adhesive may exceed 25 cP.

Figure 6:
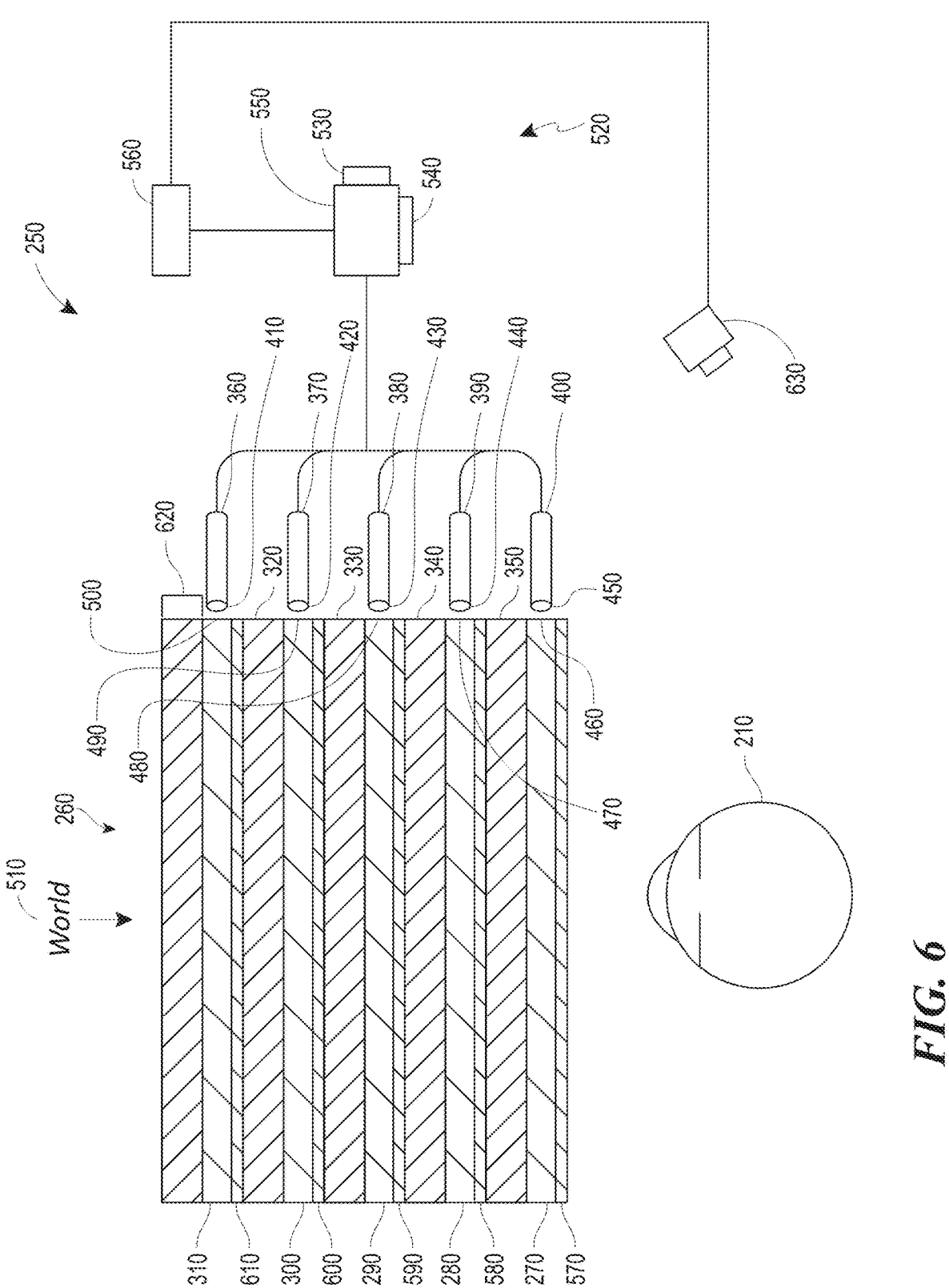
FIG. 6 illustrates an example of a waveguide stack for outputting image information to a user.

In some embodiments, the adhesive may be applied during a stacking process, wherein two or more waveguides are bonded and stacked to form a stacked waveguide assembly or waveguide stack, such as stacked waveguide assembly 260 of FIG. 6. In some embodiments, after stacking two adjacent waveguides, or after stacking of the entire waveguide assembly, the adhesive may undergo a curing process, in which the adhesive may be hardened, e.g., by exposure to heat, light, air, etc. Once cured, the adhesive may provide a high strength and flexible or rigid bond between adjacent waveguides. After curing, the adhesive may preferably be resistant to changes in temperature or humidity, such that the adhesive is capable of maintaining a strong bond despite temperature changes or exposure to moisture inside of a display device.

In some embodiments, the pillars are disposed on one major surface of a waveguide and indentations, or grooves are provided (e.g., casted) on an opposite major surface of the waveguide. The indentations are sized and positioned to align with pillars of immediately neighboring waveguides, thereby forming a self-aligned stack of waveguides. The indentations or grooves may have a height of about 2 μm to about 20 μm from the major surface of a waveguide including the indentations or groups (that is, the grooves may extend into the body of the waveguides by 2-20 μm). Furthermore, the indentations or grooves may comprise a slightly larger lateral dimension compared to the pillars to accommodate for alignment errors during stacking. For example, the indentations or grooves may have about a 10% larger lateral dimension than the pillars. In some embodiments the indentations or grooves may have between about a 0% and about a 20% larger lateral dimension than the pillars.

In some embodiments, adhesive may be used to align and adhere pillars (of another waveguide) to the opposite major surface of the waveguide from the major surface on which that waveguide's pillars are disposed. Adhesive may be used alone to adhere pillars or may be utilized in combination with the indentations to enhance the adhesion and mechanical stability of the waveguide stack. Furthermore, pillars may be provided with rough, uneven, or irregular surfaces to increase contact area and provide small structures which enhance adhesion between the pillars and a neighboring waveguide in contact with the pillars. For example, the contact surface of the pillars may be increased by increasing the surface roughness of or by forming nanostructures on the tips of the pillars. Where the waveguides and pillars are casted in the mold, a negative of the rough, uneven, or irregular contact surfaces may be part of the mold such that the rough, uneven, or irregular contact surfaces are formed as part of the casting process for forming the waveguide.

In some embodiments, the pillars and/or indentations may have varying sizes (e.g., widths), orientations, placements, and/or multiple pillars and/or indentations may be formed as closely packed groups of pillars and/or indentations. For example, the major surfaces of a waveguide may include pillars and indentations respectively, thereby forming an interlocking system of pillars and indentations in neighboring waveguides to form a stack of waveguides. Advantageously, the varying sizes and/or shapes of groups of pillars and/or indentations may increase the mechanical and structural stability of a single waveguide and/or stack of waveguides.

In some embodiments, as seen in a cross-section taken transverse to a height of the pillars, the pillars may comprise a lateral dimension (i.e., width) between about 10 μm and about 500 μm. For example, the pillars may comprise a lateral dimension of about 10 μm, about 20 μm, about 30 μm, about 40 μm, about 50 μm, about 60 μm, about 70 μm, about 80 μm, about 90 μm, about 100 μm, about 110 μm, about 120 μm, about 130 μm, about 140 μm, about 150 μm, about 160 μm, about 170 μm, about 180 μm, about 190 μm, about 200 μm, about 210 μm, about 220 μm, about 230 μm, about 240 μm, about 250 μm, about 260 μm, about 270 μm, about 280 μm, about 290 μm, about 300 μm, about 310 μm, about 320 μm, about 330 μm, about 340 μm, about 350 μm, about 360 μm, about 370 μm, about 380 μm, about 390 μm, about 400 μm, about 410 μm, about 420 μm, about 430 μm, about 440 μm, about 450 μm, about 460 μm, about 470 μm, about 480 μm, about 490 μm, or about 500 μm, or any value between the aforementioned values. Preferably, the cross-sectional size and shape of the pillars is sufficiently small that they are substantially impermissible to the average viewer.

In some embodiments, the pillars may comprise a lateral dimension that is significantly smaller than the lateral dimension of the integrated spacers located on a periphery of an eyepiece. For example, in some embodiments, the ratio of the lateral dimension of the pillars to the lateral dimension of the spacers may be between about 1:100 to about 1:2. For example, the ratio of the lateral dimension of the pillars to the lateral dimension of the spacers may be about 1:100, about 1:75, about 1:50, about 1:40, about 1:30, about 1:25, about 1:20, about 1:15, about 1:10, about 1:9, about 1:8, about 1:7, about 1:6, about 1:5, about 1:4, about 1:3, or about 1:2, or any value between the aforementioned values.

In some embodiments, the height of the pillars may be between about 10 μm and 200 μm. For example, the pillars may comprise a height of about 10 μm, about 15 μm, about 20 μm, about 25 μm, about 30 μm, about 35 μm, about 40 μm, about 45 μm, about 50 μm, about 55 μm, about 60 μm, about 65 μm, about 70 μm, about 75 μm, about 80 μm, about 85 μm, about 90 μm, about 95 μm, about 100 μm, about 105 μm, about 110 μm, about 115 μm, about 120 μm, about 125 μm, about 130 μm, about 135 μm, about 140 μm, about 145 μm, about 150 μm, about 155 μm, about 160 μm, about 165 μm, about 170 μm, about 175 μm, about 180 μm, about 185

µm, about 190 µm, about 195 µm, or about 200 µm, or any value between the aforementioned values. In some embodiments, the pillars and the spacers may comprise similar or identical heights. However, depending on whether adhesive is applied to either the pillars or spacers or whether inden- tations are provided in neighboring waveguides for accom- modating the pillars and/or spacers, the height of the pillars may be different than the spacers. For example, if adhesive is to be applied to the top surface of pillars to provide greater adhesion to a neighboring waveguide, the pillars may have a smaller height than that of the spacers, such that once the adhesive is applied, the distance between neighboring wave- guides is constant across the entire lateral dimension of the eyepiece. Alternatively, if indentations are provided in, for example, a bottom major surface of a neighboring wave- guide to accommodate pillars in an underlying waveguide, the pillars may comprise a greater height than the spacers, such that the distance between neighboring waveguides is constant across the entire lateral dimension of the eyepiece when the pillars are placed within the indentations. If adhesive is to be applied to the spacers but not the pillars, the pillars may be provided with a greater height than the spacers, such that the pillars and the spacers extend to a same height once adhesive is provided on the spacers. In some embodiments, the pillars may comprise a height that is within about 50 µm of the height of the spacers on the periphery of the waveguide. For example, the pillars may comprise a height between about 50 µm smaller than the height of the integrated spacers and about 50 µm greater than the height of the integrated spacers.

Polymer eyepieces may be formed by casting a polymer material with pre-formed molds. In some embodiments, the molds may be brought together to compress the material 1012. The compressed material may be subjected to a curing process (e.g., exposure to UV light and/or heat) to harden that material to form the waveguide. The negative pattern of the mold may define the patterned structure of the wave- guide, which may comprise diffractive optical elements, pillars, indentations, and/or spacers. It will be appreciated that additional negative patterns may be provided on the mold to form additional structures, including additional diffractive optical elements, as desired. The molds may be moved apart relative to one another, releasing and forming a waveguide, such as that illustrated in FIG. 10.

In some embodiments, as an alternative or in addition to applying adhesive to the tips of the pillars, the pillars are processed such that the tips include materials for bonding with another waveguide. For example, in some embodi- ments, waveguides may be formed by curing polymer mate- rial, with the curing performed in such a way that the pillars or one or more portions of the pillars are cured to a lesser extent than the rest of the eyepiece. For example, in some embodiments, when a UV cure is utilized, the UV exposure may be set and directed such that the pillars or certain portions of the pillars, e.g., the tips of the pillars, receive less exposure to UV than other portions of a waveguide com- prising the pillars. Alternatively, the composition of the pillars or a portion of the pillars may be modified such that the curing is slower for the pillar or the portion of the pillars (e.g., the tips of the pillars) compared to the bulk of the waveguide. For example, the concentration of a photoini- tiator for the pillar or for the tips of the pillars may be relatively low, such that the pillars or tips of the pillars cure more slowly than parts of the waveguide having relatively high concentrations of photoinitiator. It will be appreciated that UV curing is a process by which ultraviolet light is used to initiate a photochemical reaction that generates a crosslinked network of polymers. Thus, reducing the concentra- tion of photoinitiator in the pillars may reduce the number of cross-linking reactions, for a given exposure to UV light, relative to the number of cross-linking reactions in portions of the pillar or waveguide having higher concentrations of photoinitiator. As a result, the tip of the pillar remains softer than the remaining portion of the waveguide and may have unreacted monomers. In some embodiments, the curing is completed after casting and before stacking the eyepiece waveguides and in a manner such that only the pillar area is not fully cured afterwards. The un-cured pillars or portions of the pillars promote adhesion to adjacent waveguides, e.g., chemical species in the uncured portions may diffuse into an adjacent waveguide in form bonds with chemical species in that adjacent waveguide.

In some embodiments, residual monomers may remain on the surface of the pillars after casting, e.g., due to an incomplete cure of the material forming a waveguide. For example, in some polymer systems like Polydimethylsi- loxanes (PDMS), the residual monomers on the surface of the pillars can diffuse and bond the pillars to adjacent waveguides.

In some embodiments, the composition of the pillars or a portion of the pillars (e.g., tips of the pillars that contacts an adjacent eyepiece) may also be modified during casting of the eyepiece waveguide by forming a portion of the pillars with a different transparent material which is, for example, hydrophilic or superhydrophilic. In some embodiments, the hydrophilic or superhydrophilic material may facilitate adhesion between the pillars or portions of the pillars to the surface of an adjacent waveguide through, e.g., Van der Waals forces. In addition to being formed of hydrophilic of superhydrophilic materials, the pillars or portions of the pillars may be coated with a monomer material that polym- erizes under a thermal or UV cure of the individual wave- guides of the waveguide stack. Additionally, an adhesion- promoting layer may be deposited onto the holes of the etched eyepiece mold or directly onto the pillars of the casted polymer waveguide. Adhesion-promoting materials include, for example, some silane, titanate, zirconate, zir- coaluminate, or alkyl phosphate ester mixtures, or metal organics, among others. In some embodiments, the adhe- sion-promoting material may form a thin interfacial layer between the pillars and an adhesive. In some embodiments, the adhesion-promoting material may promote adhesion between the pillars and the adhesive, since the adhesive may more strongly couple to the adhesion-promoting material than the pillar material.

In some embodiments, the pillars may be chemically modified to promote adhesion to an adjacent waveguide. For example, the casted polymer eyepiece may be plasma bom- barded with a soft plasma, which may modify the compo- sition of the polymer surface, preferably creating an O—H terminated surface, and making the polymer surface more hydrophilic, leading to greater adhesion between the pillars and the surface of the neighboring eyepiece waveguide. During the hydrophilic plasma treatment, a precursor gas is introduced, wherein the combination of energy and a low- pressure may cause the gas to ionize and become plasma. The excited plasma ions may collide with the surface of the eyepiece substrate, microscopically changing the geometry of the surface. Without being limited by theory, it is believed that the surface undergoes oxidation and the bombarding plasma ions form hydroxyl groups on the surface. These hydroxyl groups are polar, which enhances the surface's adhesive properties. Air or oxygen ($O_2$) gas may be used to form the plasma in some embodiments.

In some embodiments, after stacking the waveguides, the waveguide stack may undergo a post-stacking anneal. As noted above, in some embodiments, the pillars may be casted at a greater height than the integrated spacers near the periphery of each waveguide to account for the thickness of an adhesive provided on the periphery integrated spacers. Thus, the pillars may be in contact with adjacent eyepiece waveguides before the post-stacking anneal. During the post-stacking anneal, the eyepiece stack may be placed into an oven vertically, such that the stack undergoes a softening and then hardening process (e.g., a heating phase and a subsequent cooling phase), in which the pillars are bonded to the adjacent waveguides. For example, during the post-stacking anneal, the polymer waveguide stack may be heated to a temperature at or above the glass transition temperature ($T_g$) of the pillar and/or waveguide material, such that at least a portion of the pillars undergo a polymer melt, thereby facilitating bonding with adjacent waveguides in contact with the pillars or portion of the pillars. In some embodiments, the duration and temperature of the post-stacking anneal is configured such that only a portion of the pillars proximate to an adjacent waveguide is softened to a polymer melt. When the pillars are subsequently allowed to call, the pillars or portions of the pillars will harden, but may retain a strong bond with adjacent waveguides.

In some embodiments, where waveguides form an eyepiece for a display system, different waveguides of the stack of waveguides may be configured to in-couple and/or out-couple light of different colors, e.g., different component colors for forming a full-color image. In addition, or alternatively, different waveguides of the waveguides may be configured to output light with different amounts of wavefront divergence, to display image content at different apparent distances from the viewer.

Advantageously, the pillars integral with the waveguides provide a rigid structure for easily and reproducibly spacing apart waveguides of a stack of waveguides. In addition, providing matching indentations in waveguides interfacing with pillars further facilitates the making of consistent stacks of pillars by providing self-aligned stacking. The consistent separation between waveguides may facilitate the total internal reflection of light through individual waveguides and provide a high degree of uniformity or control over the propagation direction of outputted light. In addition, where the waveguides comprise light-out coupling optical elements that are surface features, the pillars may be formed simultaneously with the out-coupling optical elements.

The methodologies discussed herein may simplify the assembly of separated polymer waveguides, and significantly improve performance of, for example, stacked waveguide-based polymer eyepieces for AR or VR applications. The methods of assembly described herein may produce robust polymer eyepiece (e.g., waveguide) stacks with consistent gaps and improved thermal stability throughout the stack, resulting in display devices having consistent performance.

Example Display Systems

Figure 2:
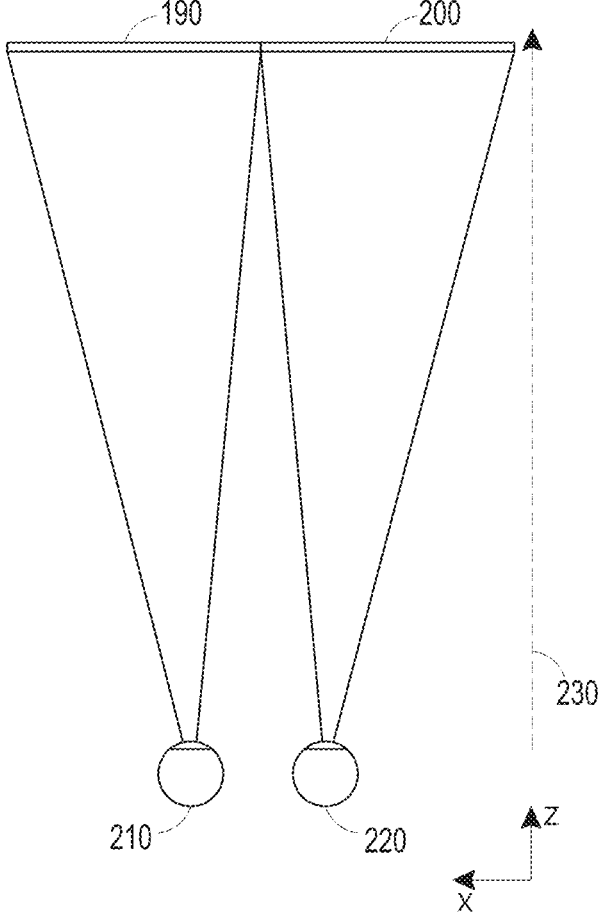
FIG. 2 illustrates a conventional display system for simulating three-dimensional imagery for a user.

FIG. 2 illustrates a conventional display system for simulating three-dimensional imagery for a user. It will be appreciated that a user's eyes are spaced apart and that, when looking at a real object in space, each eye will have a slightly different view of the object and may form an image of the object at different locations on the retina of each eye. This may be referred to as binocular disparity and may be utilized by the human visual system to provide a perception of depth. Conventional display systems simulate binocular disparity by presenting two distinct images 190, 200 with slightly different views of the same virtual object—one for each eye 210, 220—corresponding to the views of the virtual object that would be seen by each eye if the virtual object were a real object at a desired depth. These images provide binocular cues that the user's visual system may interpret to derive a perception of depth.

With continued reference to FIG. 2, the images 190, 200 are spaced from the eyes 210, 220 by a distance 230 on a z-axis. The z-axis is parallel to the optical axis of the viewer with their eyes fixated on an object at optical infinity directly ahead of the viewer. The images 190, 200 are flat and at a fixed distance from the eyes 210, 220. Based on the slightly different views of a virtual object in the images presented to the eyes 210, 220, respectively, the eyes may naturally rotate such that an image of the object falls on corresponding points on the retinas of each of the eyes, to maintain single binocular vision. This rotation may cause the lines of sight of each of the eyes 210, 220 to converge onto a point in space at which the virtual object is perceived to be present. As a result, providing three-dimensional imagery conventionally involves providing binocular cues that may manipulate the vergence of the user's eyes 210, 220, and that the human visual system interprets to provide a perception of depth.

Figure 3A:
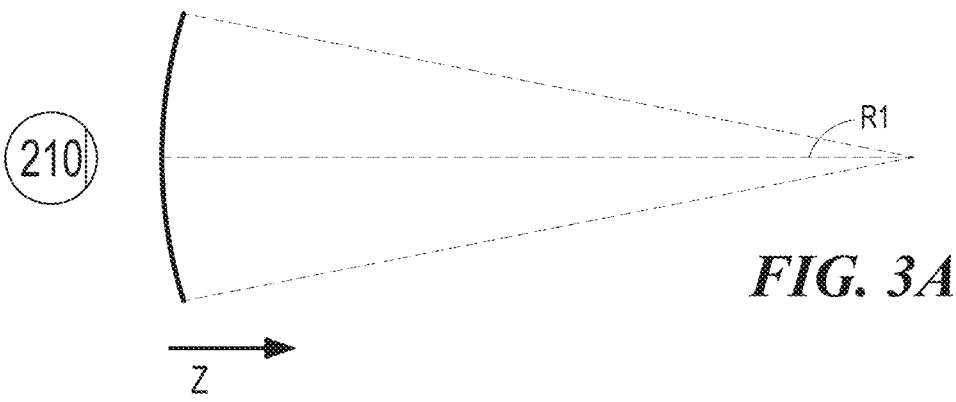
FIGS. 3A-3C illustrate relationships between radius of curvature and focal radius.
Figure 3B:
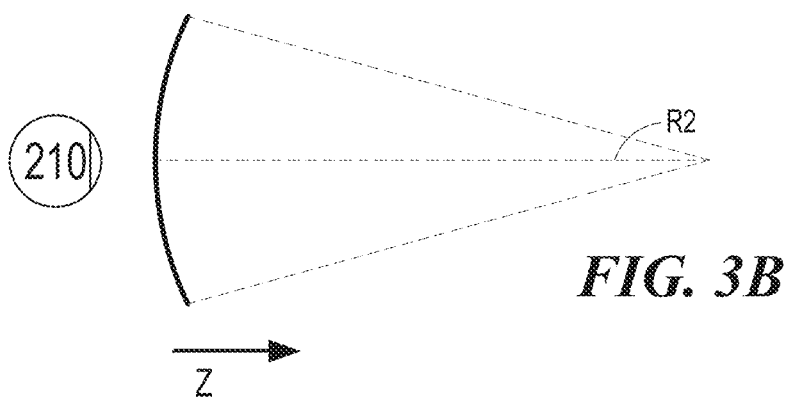
Figure 3C:
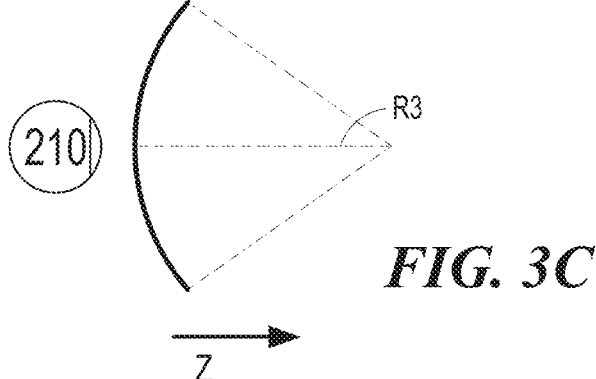

Generating a realistic and comfortable perception of depth is challenging, however. It will be appreciated that light from objects at different distances from the eyes have wavefronts with different amounts of divergence. FIGS. 3A-3C illustrate relationships between distance and the divergence of light rays. The distance between the object and the eye 210 is represented by, in order of decreasing distance, R1, R2, and R3. As shown in FIGS. 3A-3C, the light rays become more divergent as distance to the object decreases. Conversely, as distance increases, the light rays become more collimated. Stated another way, it may be said that the light field produced by a point (the object or a part of the object) has a spherical wavefront curvature, which is a function of how far away the point is from the eye of the user. The curvature increases with decreasing distance between the object and the eye 210. While only a single eye 210 is illustrated for clarity of illustration in FIGS. 3A-3C and other figures herein, the discussions regarding eye 210 may be applied to both eyes 210 and 220 of a viewer.

With continued reference to FIGS. 3A-3C, light from an object that the viewer's eyes are fixated on may have different degrees of wavefront divergence. Due to the different amounts of wavefront divergence, the light may be focused differently by the lens of the eye, which in turn may require the lens to assume different shapes to form a focused image on the retina of the eye. Where a focused image is not formed on the retina, the resulting retinal blur acts as a cue to accommodation that causes a change in the shape of the lens of the eye until a focused image is formed on the retina. For example, the cue to accommodation may trigger the ciliary muscles surrounding the lens of the eye to relax or contract, thereby modulating the force applied to the suspensory ligaments holding the lens, thus causing the shape of the lens of the eye to change until retinal blur of an object of fixation is eliminated or minimized, thereby forming a focused image of the object of fixation on the retina (e.g., fovea) of the eye. The process by which the lens of the eye changes shape may be referred to as accommodation, and the shape of the lens of the eye required to form a focused image of the object of fixation on the retina (e.g., fovea) of the eye may be referred to as an accommodative state.

Figure 4A:
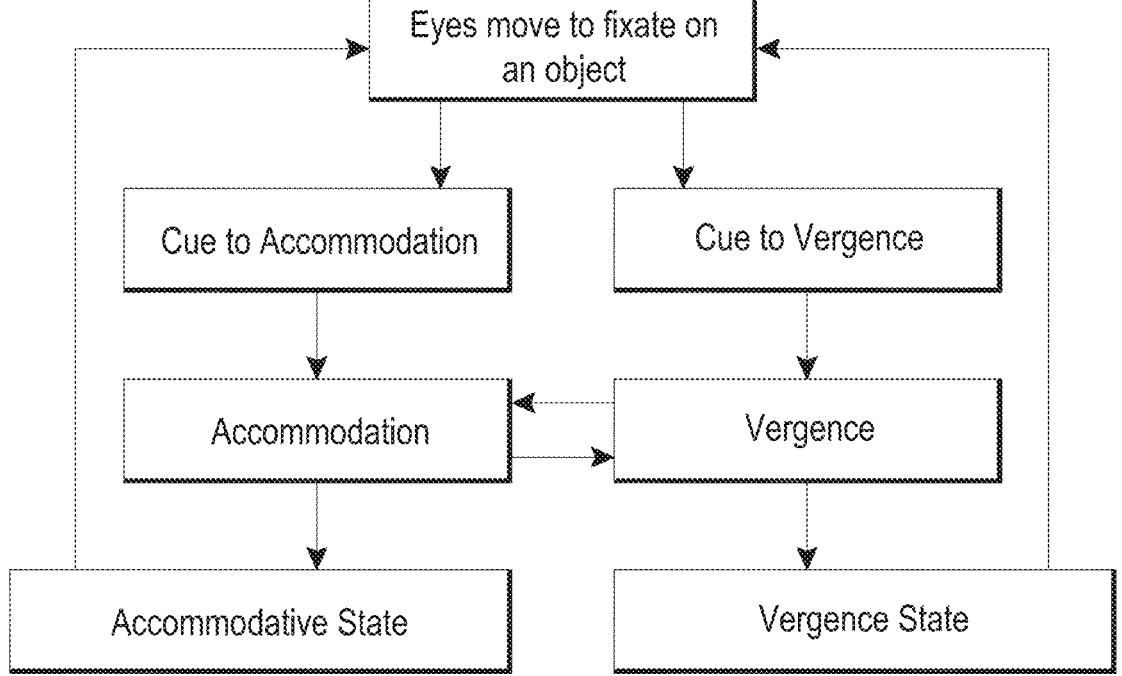
FIG. 4A illustrates a representation of the accommodation-vergence response of the human visual system.

With reference now to FIG. 4A, a representation of the accommodation-vergence response of the human visual system is illustrated. The movement of the eyes to fixate on an object causes the eyes to receive light from the object, with the light forming an image on each of the retinas of the eyes. The presence of retinal blur in the image formed on the retina may provide a cue to accommodation, and the relative locations of the image on the retinas may provide a cue to vergence. The cue to accommodation causes accommodation to occur, resulting in the lenses of the eyes each assuming a particular accommodative state that forms a focused image of the object on the retina (e.g., fovea) of the eye. On the other hand, the cue to vergence causes vergence movements (rotation of the eyes) to occur such that the images formed on each retina of each eye are at corresponding retinal points that maintain single binocular vision. In these positions, the eyes may be said to have assumed a particular vergence state. With continued reference to FIG. 4A, accommodation may be understood to be the process by which the eye achieves a particular accommodative state, and vergence may be understood to be the process by which the eye achieves a particular vergence state. As indicated in FIG. 4A, the accommodative and vergence states of the eyes may change if the user fixates on another object. For example, the accommodated state may change if the user fixates on a new object at a different depth on the z-axis.

Without being limited by theory, it is believed that viewers of an object may perceive the object as being "three-dimensional" due to a combination of vergence and accommodation. As noted above, vergence movements (e.g., rotation of the eyes so that the pupils move toward or away from each other to converge the lines of sight of the eyes to fixate upon an object) of the two eyes relative to each other are closely associated with accommodation of the lenses of the eyes. Under normal conditions, changing the shapes of the lenses of the eyes to change focus from one object to another object at a different distance will automatically cause a matching change in vergence to the same distance, under a relationship known as the "accommodation-vergence reflex." Likewise, a change in vergence will trigger a matching change in lens shape under normal conditions.

Figure 4B:
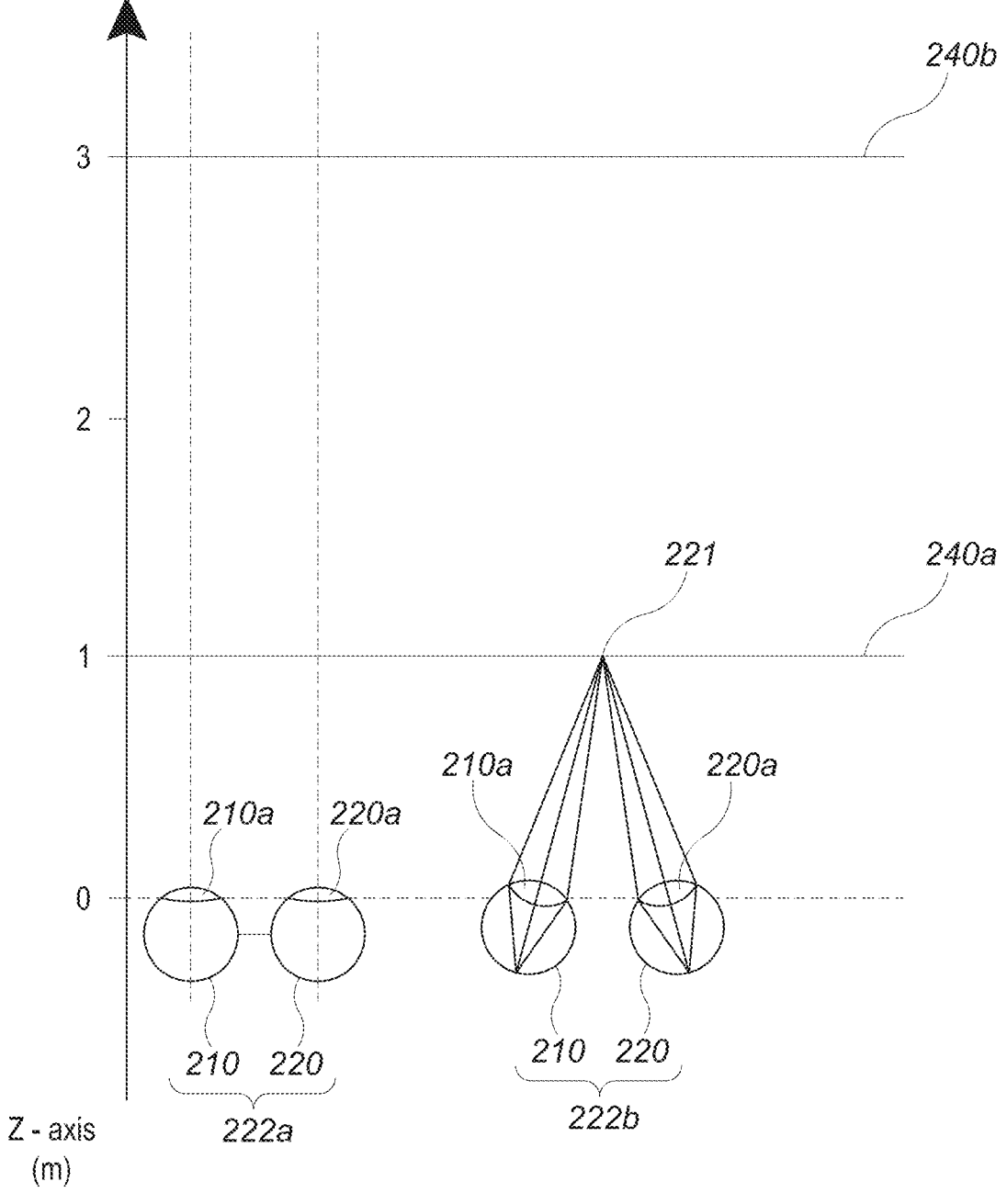
FIG. 4B illustrates examples of different accommodative states and vergence states of a pair of eyes of the user.

With reference now to FIG. 4B, examples of different accommodative and vergence states of the eyes are illustrated. The pair of eyes 222a is fixated on an object at optical infinity, while the pair eyes 222b are fixated on an object 221 at less than optical infinity. Notably, the vergence states of each pair of eyes is different, with the pair of eyes 222a directed straight ahead, while the pair of eyes 222 converge on the object 221. The accommodative states of the eyes forming each pair of eyes 222a and 222b are also different, as represented by the different shapes of the lenses 210a, 220a.

Undesirably, many users of conventional "3-D" display systems find such conventional systems to be uncomfortable or may not perceive a sense of depth at all due to a mismatch between accommodative and vergence states in these displays. As noted above, many stereoscopic or "3-D" display systems display a scene by providing slightly different images to each eye. Such systems are uncomfortable for many viewers, since they, among other things, simply provide different presentations of a scene and cause changes in the vergence states of the eyes, but without a corresponding change in the accommodative states of those eyes. Rather, the images are shown by a display at a fixed distance from the eyes, such that the eyes view all the image information at a single accommodative state. Such an arrangement works against the "accommodation-vergence reflex" by causing changes in the vergence state without a matching change in the accommodative state. This mismatch is believed to cause viewer discomfort. Display systems that provide a better match between accommodation and vergence may form more realistic and comfortable simulations of three-dimensional imagery.

Without being limited by theory, it is believed that the human eye typically may interpret a finite number of depth planes to provide depth perception. Consequently, a highly believable simulation of perceived depth may be achieved by providing, to the eye, different presentations of an image corresponding to each of these limited numbers of depth planes. In some embodiments, the different presentations may provide both cues to vergence and matching cues to accommodation, thereby providing physiologically correct accommodation-vergence matching.

With continued reference to FIG. 4B, two depth planes 240a, 240b, corresponding to different distances in space from the eyes 210, 220, are illustrated. For a given depth plane 240a, 240b, vergence cues may be provided by the displaying of images of appropriately different perspectives for each eye 210, 220. In addition, for a given depth plane 240a, 240b light forming the images provided to each eye 210, 220 may have a wavefront divergence corresponding to a light field produced by a point at the distance of that depth plane 240a, 240b.

In the illustrated embodiment, the distance, along the z-axis, of the depth plane 240a containing the point 221 is 1 m. As used herein, distances or depths along the z-axis may be measured with a zero-point located at the exit pupils of the user's eyes. Thus, a depth plane 240a located at a depth of 1 m corresponds to a distance of 1 m away from the exit pupils of the user's eyes, on the optical axis of those eyes with the eyes directed towards optical infinity. As an approximation, the depth or distance along the z-axis may be measured from the display in front of the user's eyes (e.g., from the surface of a waveguide), plus a value for the distance between the device and the exit pupils of the user's eyes. That value may be called the eye relief and corresponds to the distance between the exit pupil of the user's eye and the display worn by the user in front of the eye. In practice, the value for the eye relief may be a normalized value used generally for all viewers. For example, the eye relief may be assumed to be 20 mm and a depth plane that is at a depth of 1 m may be at a distance of 980 mm in front of the display.

With reference now to FIGS. 4C and 4D, examples of matched accommodation-vergence distances and mismatched accommodation-vergence distances are illustrated, respectively. As illustrated in FIG. 4C, the display system may provide images of a virtual object to each eye 210, 220. The images may cause the eyes 210, 220 to assume a vergence state in which the eyes converge on a point 15 on a depth plane 240. In addition, the images may be formed by a light having a wavefront curvature corresponding to real objects at that depth plane 240. As a result, the eyes 210, 220 assume an accommodative state in which the images are in focus on the retinas of those eyes. Thus, the user may perceive the virtual object as being at the point 15 on the depth plane 240.

It will be appreciated that each of the accommodative and vergence states of the eyes 210, 220 are associated with a particular distance on the z-axis. For example, an object at a particular distance from the eyes 210, 220 causes those eyes to assume particular accommodative states based upon the distances of the object. The distance associated with a particular accommodative state may be referred to as the accommodation distance, $A_d$. Similarly, there are particular vergence distances, $V_d$, associated with the eyes in particular vergence states, or positions relative to one another. Where the accommodation distance and the vergence distance match, the relationship between accommodation and vergence may be said to be physiologically correct. This is considered to be the most comfortable scenario for a viewer.

In stereoscopic displays, however, the accommodation distance and the vergence distance may not always match. For example, as illustrated in FIG. 4D, images displayed to the eyes 210, 220 may be displayed with wavefront divergence corresponding to depth plane 240, and the eyes 210, 220 may assume a particular accommodative state in which the points 15a, 15b on that depth plane are in focus. However, the images displayed to the eyes 210, 220 may provide cues for vergence that cause the eyes 210, 220 to converge on a point 15 that is not located on the depth plane 240. As a result, the accommodation distance corresponds to the distance from the exit pupils of the eyes 210, 220 to the depth plane 240, while the vergence distance corresponds to the larger distance from the exit pupils of the eyes 210, 220 to the point 15, in some embodiments. The accommodation distance is different from the vergence distance. Consequently, there is an accommodation-vergence mismatch. Such a mismatch is considered undesirable and may cause discomfort in the user. It will be appreciated that the mismatch corresponds to distance (e.g., $V_d$–$A_d$) and may be characterized using diopters.

In some embodiments, it will be appreciated that a reference point other than exit pupils of the eyes 210, 220 may be utilized for determining distance for determining accommodation-vergence mismatch, so long as the same reference point is utilized for the accommodation distance and the vergence distance. For example, the distances could be measured from the cornea to the depth plane, from the retina to the depth plane, from the eyepiece (e.g., a waveguide of the display device) to the depth plane, from the center of rotation of an eye, and so on.

Without being limited by theory, it is believed that users may still perceive accommodation-vergence mismatches of up to about 0.25 diopter, up to about 0.33 diopter, and up to about 0.5 diopter as being physiologically correct, without the mismatch itself causing significant discomfort. In some embodiments, display systems disclosed herein (e.g., the display system 250, FIG. 6) present images to the viewer having accommodation-vergence mismatch of about 0.5 diopter or less. In some other embodiments, the accommodation-vergence mismatch of the images provided by the display system is about 0.33 diopter or less. In yet other embodiments, the accommodation-vergence mismatch of the images provided by the display system is about 0.25 diopter or less, including about 0.1 diopter or less.

Figure 5:
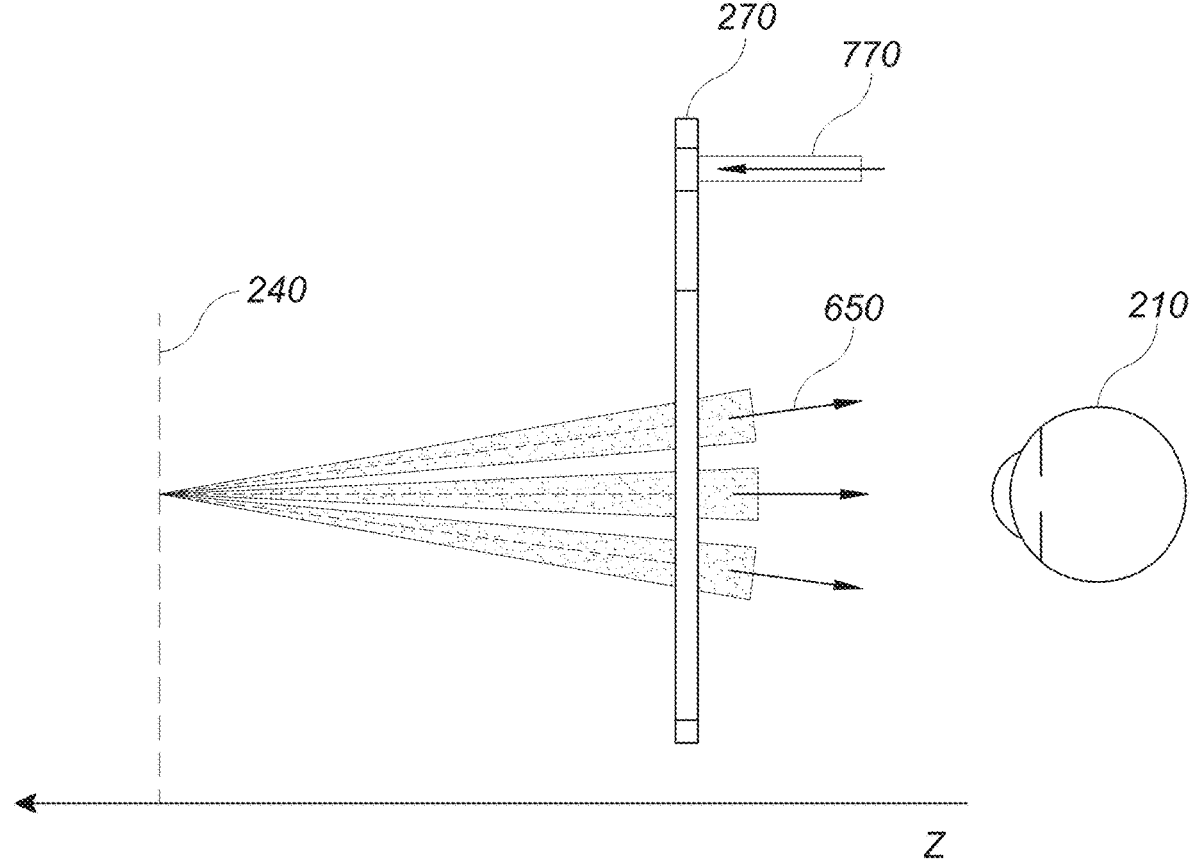
FIG. 5 illustrates aspects of an approach for simulating three-dimensional imagery by modifying wavefront divergence.

FIG. 5 illustrates aspects of an approach for simulating three-dimensional imagery by modifying wavefront divergence. The display system includes a waveguide 270 that is configured to receive light 770 that is encoded with image information, and to output that light to the user's eye 210. The waveguide 270 may output the light 650 with a defined amount of wavefront divergence corresponding to the wavefront divergence of a light field produced by a point on a desired depth plane 240. In some embodiments, the same amount of wavefront divergence is provided for all objects presented on that depth plane. In addition, it will be illustrated that the other eye of the user may be provided with image information from a similar waveguide.

In some embodiments, a single waveguide may be configured to output light with a set amount of wavefront divergence corresponding to a single or limited number of depth planes and/or the waveguide may be configured to output light of a limited range of wavelengths. Consequently, in some embodiments, a plurality or stack of waveguides may be utilized to provide different amounts of wavefront divergence for different depth planes and/or to output light of different ranges of wavelengths. As used herein, it will be appreciated that a depth plane may follow the contours of a flat or a curved surface. In some embodiments, advantageously for simplicity, the depth planes may follow the contours of flat surfaces.

FIG. 6 illustrates an example of a waveguide stack for outputting image information to a user. A display system 250 includes a stack of waveguides, or stacked waveguide assembly, 260 that may be utilized to provide three-dimensional perception to the eye/brain using a plurality of waveguides 270, 280, 290, 300, 310. It will be appreciated that the display system 250 may be considered a light field display in some embodiments. In addition, the waveguide assembly 260 may also be referred to as an eyepiece.

In some embodiments, the display system 250 may be configured to provide substantially continuous cues to vergence and multiple discrete cues to accommodation. The cues to vergence may be provided by displaying different images to each of the eyes of the user, and the cues to accommodation may be provided by outputting the light that forms the images with selectable discrete amounts of wavefront divergence. Stated another way, the display system 250 may be configured to output light with variable levels of wavefront divergence. In some embodiments, each discrete level of wavefront divergence corresponds to a particular depth plane and may be provided by a particular one of the waveguides 270, 280, 290, 300, 310.

With continued reference to FIG. 6, the waveguide assembly 260 may also include a plurality of features 320, 330, 340, 350 between the waveguides. In some embodiments, the features 320, 330, 340, 350 may be one or more lenses. The waveguides 270, 280, 290, 300, 310 and/or the plurality of lenses 320, 330, 340, 350 may be configured to send image information to the eye with various levels of wavefront curvature or light ray divergence. Each waveguide level may be associated with a particular depth plane and may be configured to output image information corresponding to that depth plane. Image injection devices 360, 370, 380, 390, 400 may function as a source of light for the waveguides and may be utilized to inject image information into the waveguides 270, 280, 290, 300, 310, each of which may be configured, as described herein, to distribute incoming light across each respective waveguide, for output toward the eye 210. Light exits an output surface 410, 420, 430, 440, 450 of the image injection devices 360, 370, 380, 390, 400 and is injected into a corresponding input surface 460, 470, 480, 490, 500 of the waveguides 270, 280, 290, 300, 310. In some embodiments, each of the input surfaces 460, 470, 480, 490, 500 may be an edge of a corresponding waveguide, or may be part of a major surface of the corresponding waveguide (that is, one of the waveguide surfaces directly facing the world 510 or the viewer's eye 210). It will be appreciated that the major surfaces of a waveguide correspond to the surfaces of the waveguide between which the thickness of the waveguide extends. In some embodiments, a single beam of light (e.g., a collimated beam) may be injected into each waveguide to output an entire field of cloned collimated beams that are directed toward the eye 210 at particular angles (and amounts of divergence) corresponding to the depth plane associated with a particular waveguide. In some embodiments, a single one of the image injection devices 360, 370, 380, 390, 400 may be associated with and inject light into a plurality (e.g., three) of the waveguides 270, 280, 290, 300, 310.

In some embodiments, the image injection devices 360, 370, 380, 390, 400 are discrete displays that each produce image information for injection into a corresponding wave-guide 270, 280, 290, 300, 310, respectively. In some other embodiments, the image injection devices 360, 370, 380, 390, 400 are the output ends of a single multiplexed display which may, e.g., pipe image information via one or more optical conduits (such as fiber optic cables) to each of the image injection devices 360, 370, 380, 390, 400. It will be appreciated that the image information provided by the image injection devices 360, 370, 380, 390, 400 may include light of different wavelengths, or colors (e.g., different component colors, as discussed herein).

In some embodiments, the light injected into the wave-guides 270, 280, 290, 300, 310 is provided by a light projector system 520, which comprises a light module 530, which may include a light emitter, such as a light emitting diode (LED). The light from the light module 530 may be directed to and modified by a light modulator 540, e.g., a spatial light modulator, via a beam splitter 550. The light modulator 540 may be configured to change the perceived intensity of the light injected into the waveguides 270, 280, 290, 300, 310 to encode the light with image information. Examples of spatial light modulators include liquid crystal displays (LCD) including a liquid crystal on silicon (LCOS) displays. It will be appreciated that the image injection devices 360, 370, 380, 390, 400 are illustrated schematically and, in some embodiments, these image injection devices may represent different light paths and locations in a com-mon projection system configured to output light into asso-ciated ones of the waveguides 270, 280, 290, 300, 310. In some embodiments, the waveguides of the waveguide assembly 260 may function as ideal lens while relaying light injected into the waveguides out to the user's eyes. In this conception, the object may be the spatial light modulator 540 and the image may be the image on the depth plane.

In some embodiments, the display system 250 may be a scanning fiber display comprising one or more scanning fibers configured to project light in various patterns (e.g., raster scan, spiral scan, Lissajous patterns, etc.) into one or more waveguides 270, 280, 290, 300, 310 and ultimately to the eye 210 of the viewer. In some embodiments, the illustrated image injection devices 360, 370, 380, 390, 400 may schematically represent a single scanning fiber or a bundle of scanning fibers configured to inject light into one or a plurality of the waveguides 270, 280, 290, 300, 310. In some other embodiments, the illustrated image injection devices 360, 370, 380, 390, 400 may schematically represent a plurality of scanning fibers or a plurality of bundles of scanning fibers, each of which are configured to inject light into an associated one of the waveguides 270, 280, 290, 300, 310. It will be appreciated that one or more optical fibers may be configured to transmit light from the light module 530 to the one or more waveguides 270, 280, 290, 300, 310. It will be appreciated that one or more intervening optical structures may be provided between the scanning fiber, or fibers, and the one or more waveguides 270, 280, 290, 300, 310 to, e.g., redirect light exiting the scanning fiber into the one or more waveguides 270, 280, 290, 300, 310.

A controller 560 controls the operation of one or more of the stacked waveguide assemblies 260, including operation of the image injection devices 360, 370, 380, 390, 400, the light source 530, and the light modulator 540. In some embodiments, the controller 560 is part of the local data processing module 140. The controller 560 includes programming (e.g., instructions in a non-transitory medium) that regulates the timing and provision of image information to the waveguides 270, 280, 290, 300, 310 according to, e.g., any of the various schemes disclosed herein. In some embodiments, the controller may be a single integral device, or a distributed system connected by wired or wireless communication channels. The controller 560 may be part of the processing modules 140 or 150 (FIG. 9D) in some embodiments.

With continued reference to FIG. 6, the waveguides 270, 280, 290, 300, 310 may be configured to propagate light within each respective waveguide by total internal reflection (TIR). The waveguides 270, 280, 290, 300, 310 may each be planar or have another shape (e.g., curved), with major top and bottom surfaces and edges extending between those major top and bottom surfaces. In the illustrated configura-tion, the waveguides 270, 280, 290, 300, 310 may each include out-coupling optical elements 570, 580, 590, 600, 610 that are configured to extract light out of a waveguide by redirecting the light, propagating within each respective waveguide, out of the waveguide to output image informa-tion to the eye 210. Extracted light may also be referred to as out-coupled light and the out-coupling optical elements light may also be referred to light extracting optical ele-ments. An extracted beam of light may be outputted by the waveguide at locations at which the light propagating in the waveguide strikes a light extracting optical element. The out-coupling optical elements 570, 580, 590, 600, 610 may, for example, be gratings, including diffractive optical fea-tures, as discussed further herein. While illustrated disposed at the bottom major surfaces of the waveguides 270, 280, 290, 300, 310, for ease of description and drawing clarity, in some embodiments, the out-coupling optical elements 570, 580, 590, 600, 610 may be disposed at the top and/or bottom major surfaces, and/or may be disposed directly in the volume of the waveguides 270, 280, 290, 300, 310, as discussed further herein. In some embodiments, the out-coupling optical elements 570, 580, 590, 600, 610 may be formed in a layer of material that is attached to a transparent substrate to form the waveguides 270, 280, 290, 300, 310. In some other embodiments, the waveguides 270, 280, 290, 300, 310 may be a monolithic piece of material and the out-coupling optical elements 570, 580, 590, 600, 610 may be formed on a surface and/or in the interior of that piece of material.

With continued reference to FIG. 6, as discussed herein, each waveguide 270, 280, 290, 300, 310 is configured to output light to form an image corresponding to a particular depth plane. For example, the waveguide 270 nearest the eye may be configured to deliver collimated light (which was injected into such waveguide 270), to the eye 210. The collimated light may be representative of the optical infinity focal plane. The next waveguide up 280 may be configured to send out collimated light which passes through the first lens 350 (e.g., a negative lens) before it may reach the eye 210; such first lens 350 may be configured to create a slight convex wavefront curvature so that the eye/brain interprets light coming from that next waveguide up 280 as coming from a first focal plane closer inward toward the eye 210 from optical infinity. Similarly, the third up waveguide 290 passes its output light through both the first 350 and second 340 lenses before reaching the eye 210; the combined optical power of the first 350 and second 340 lenses may be configured to create another incremental amount of wave-front curvature so that the eye/brain interprets light coming from the third waveguide 290 as coming from a second focal plane that is even closer inward toward the person from optical infinity than was light from the next waveguide up 280.

The other waveguides 300, 310 and lenses 330, 320 are similarly configured, with the highest waveguide 310 in the stack sending its output through all of the lenses between it and the eye for an aggregate focal power representative of the closest focal plane to the person. To compensate for the stack of lenses 320, 330, 340, 350 when viewing/interpreting light coming from the world 510 on the other side of the stacked waveguide assembly 260, a compensating lens layer 620 may be disposed at the top of the stack to compensate for the aggregate power of the lens stack 320, 330, 340, 350 below. Such a configuration provides as many perceived focal planes as there are available waveguide/lens pairings. Both the out-coupling optical elements of the waveguides and the focusing aspects of the lenses may be static (i.e., not dynamic or electro-active). In some alternative embodiments, either or both may be dynamic using electro-active features.

In some embodiments, two or more of the waveguides 270, 280, 290, 300, 310 may have the same associated depth plane. For example, multiple waveguides 270, 280, 290, 300, 310 may be configured to output images set to the same depth plane, or multiple subsets of the waveguides 270, 280, 290, 300, 310 may be configured to output images set to the same plurality of depth planes, with one set for each depth plane. This may provide advantages for forming a tiled image to provide an expanded field of view at those depth planes.

With continued reference to FIG. 6, the out-coupling optical elements 570, 580, 590, 600, 610 may be configured to both redirect light out of their respective waveguides and to output this light with the appropriate amount of divergence or collimation for a particular depth plane associated with the waveguide. As a result, waveguides having different associated depth planes may have different configurations of out-coupling optical elements 570, 580, 590, 600, 610, which output light with a different amount of divergence depending on the associated depth plane. In some embodiments, the light extracting optical elements 570, 580, 590, 600, 610 may be volumetric or surface features, which may be configured to output light at specific angles. For example, the light extracting optical elements 570, 580, 590, 600, 610 may be volume holograms, surface holograms, and/or diffraction gratings. In some embodiments, the features 320, 330, 340, 350 may not be lenses; rather, they may simply be spacers or pillars (e.g., cladding layers and/or structures for forming air gaps).

In some embodiments, the out-coupling optical elements 570, 580, 590, 600, 610 are diffractive features that form a diffraction pattern, or "diffractive optical element" (also referred to herein as a "DOE"). Preferably, the DOE's have a sufficiently low diffraction efficiency so that only a portion of the light of the beam is deflected away toward the eye 210 with each intersection of the DOE, while the rest continues to move through a waveguide via TIR. The light carrying the image information is thus divided into a number of related exit beams that exit the waveguide at a multiplicity of locations and the result is a fairly uniform pattern of exit emission toward the eye 210 for this particular collimated beam bouncing around within a waveguide.

In some embodiments, one or more DOEs may be switchable between "on" states in which they actively diffract, and "off" states in which they do not significantly diffract. For instance, a switchable DOE may comprise a layer of polymer dispersed liquid crystal, in which microdroplets comprise a diffraction pattern in a host medium, and the refractive index of the microdroplets may be switched to substantially match the refractive index of the host material (in which case the pattern does not appreciably diffract incident light) or the microdroplet may be switched to an index that does not match that of the host medium (in which case the pattern actively diffracts incident light).

In some embodiments, a camera assembly 630 (e.g., a digital camera, including visible light and infrared light cameras) may be provided to capture images of the eye 210 and/or tissue around the eye 210 to, e.g., detect user inputs and/or to monitor the physiological state of the user. As used herein, a camera may be any image capture device. In some embodiments, the camera assembly 630 may include an image capture device and a light source to project light (e.g., infrared light) to the eye, which may then be reflected by the eye and detected by the image capture device. In some embodiments, the camera assembly 630 may be attached to the frame 80 (FIG. 9D) and may be in electrical communication with the processing modules 140 and/or 150, which may process image information from the camera assembly 630. In some embodiments, one camera assembly 630 may be utilized for each eye, to separately monitor each eye.

Figure 7:
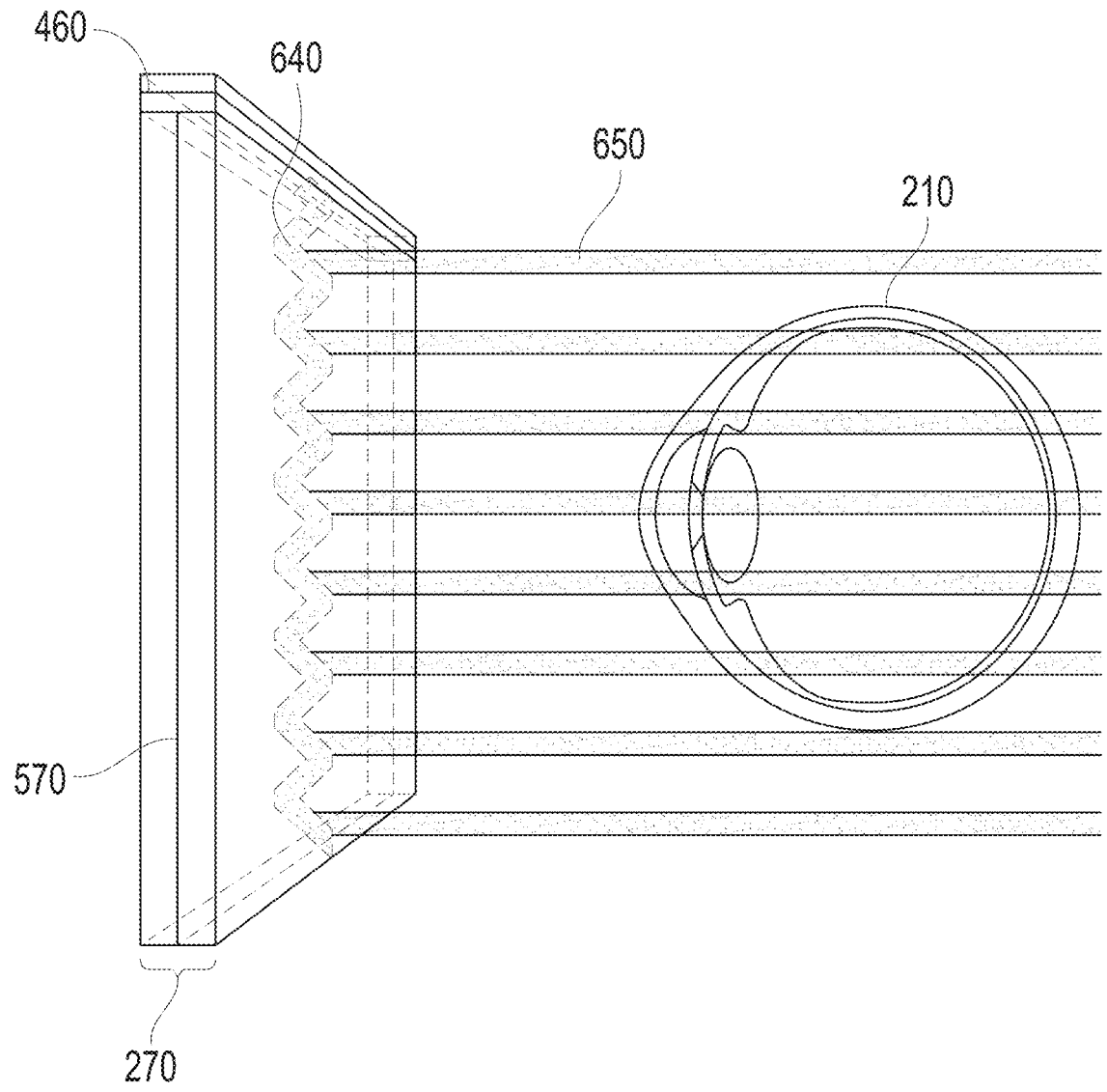
FIG. 7 illustrates an example of exit beams outputted by a waveguide.

With reference now to FIG. 7, an example of exit beams outputted by a waveguide is shown. One waveguide is illustrated, but it will be appreciated that other waveguides in the waveguide assembly 260 (FIG. 6) may function similarly, where the waveguide assembly 260 includes multiple waveguides. Light 640 is injected into the waveguide 270 at the input surface 460 of the waveguide 270 and propagates within the waveguide 270 by TIR. At points where the light 640 impinges on the DOE 570, a portion of the light exits the waveguide as exit beams 650. The exit beams 650 are illustrated as substantially parallel but, as discussed herein, they may also be redirected to propagate to the eye 210 at an angle (e.g., forming divergent exit beams), depending on the depth plane associated with the waveguide 270. It will be appreciated that substantially parallel exit beams may be indicative of a waveguide with out-coupling optical elements that out-couple light to form images that appear to be set on a depth plane at a large distance (e.g., optical infinity) from the eye 210. Other waveguides or other sets of out-coupling optical elements may output an exit beam pattern that is more divergent, which would require the eye 210 to accommodate to a closer distance to bring it into focus on the retina and would be interpreted by the brain as light from a distance closer to the eye 210 than optical infinity.

Figure 8:
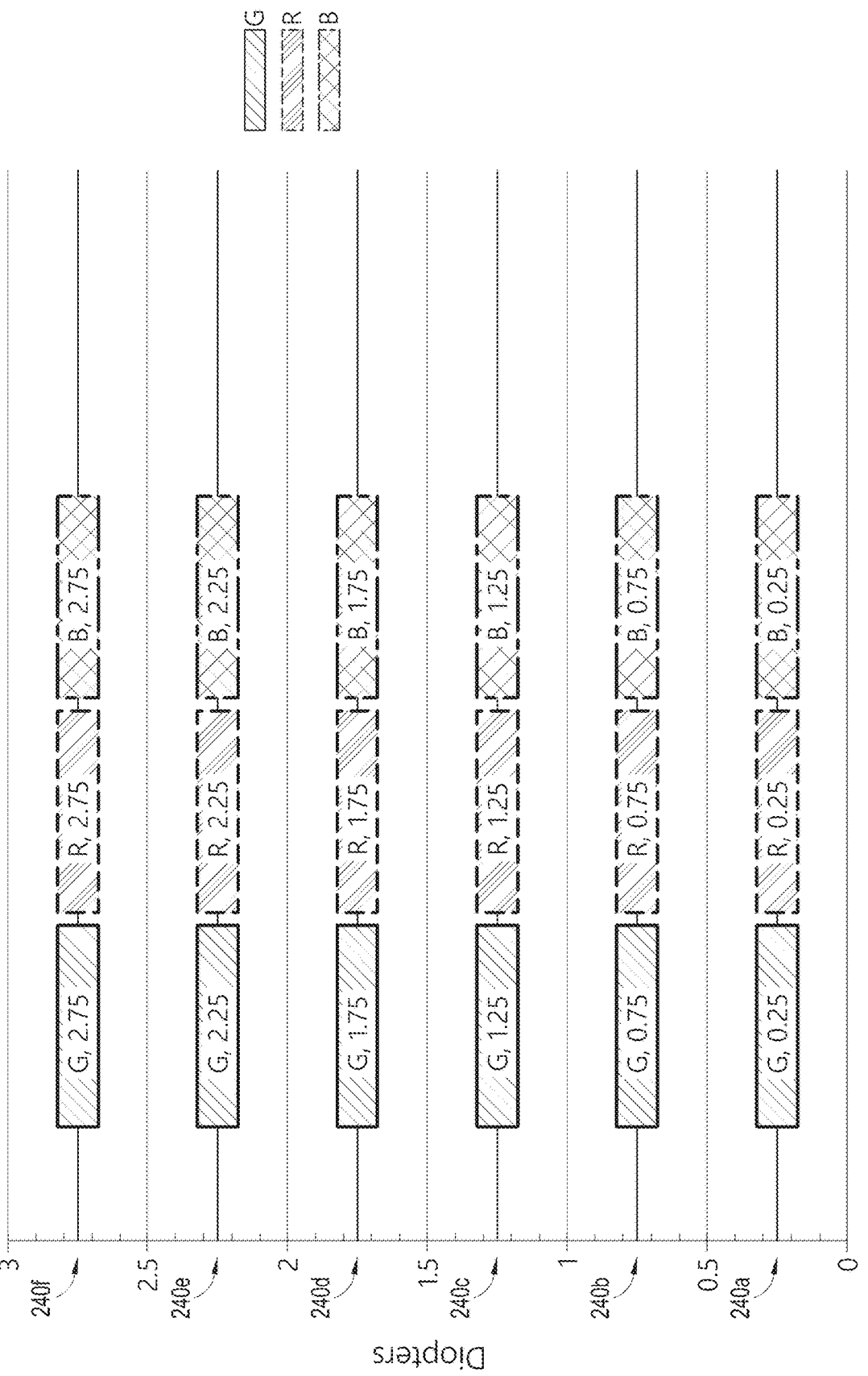
FIG. 8 illustrates an example of a stacked waveguide assembly in which each depth plane includes images formed using multiple different component colors.

In some embodiments, a full color image may be formed at each depth plane by overlaying images in each of the component colors, e.g., three or more component colors. FIG. 8 illustrates an example of a stacked waveguide assembly in which each depth plane includes images formed using multiple different component colors. The illustrated embodiment shows depth planes 240a-240f, although more or fewer depths are also contemplated. Each depth plane may have three or more component color images associated with it, including: a first image of a first color, G; a second image of a second color, R; and a third image of a third color, B. Different depth planes are indicated in the figure by different numbers for diopters (dpt) following the letters G, R, and B. Just as examples, the numbers following each of these letters indicate diopters (1/m), or inverse distance of the depth plane from a viewer, and each box in the figures represents an individual component color image. In some embodiments, to account for differences in the eye's focusing of light of different wavelengths, the exact placement of the depth planes for different component colors may vary. For example, different component color images for a given depth plane may be placed on depth planes corresponding to different distances from the user. Such an arrangement may increase visual acuity and user comfort and/or may decrease chromatic aberrations.

In some embodiments, light of each component color may be outputted by a single dedicated waveguide and, consequently, each depth plane may have multiple waveguides associated with it. In such embodiments, each box in the figures including the letters G, R, or B may be understood to represent an individual waveguide, and three waveguides may be provided per depth plane where three component color images are provided per depth plane. While the waveguides associated with each depth plane are shown adjacent to one another in this drawing for ease of description, it will be appreciated that, in a physical device, the waveguides may all be arranged in a stack with one waveguide per level. In some other embodiments, multiple component colors may be outputted by the same waveguide, such that, e.g., only a single waveguide may be provided per depth plane.

With continued reference to FIG. 8, in some embodiments, G is the color green, R is the color red, and B is the color blue. In some other embodiments, other colors associated with other wavelengths of light, including magenta and cyan, may be used in addition to or may replace one or more of red, green, or blue.

It will be appreciated that references to a given color of light throughout this disclosure will be understood to encompass light of one or more wavelengths within a range of wavelengths of light that are perceived by a viewer as being of that given color. For example, red light may include light of one or more wavelengths in the range of about 620-780 nm, green light may include light of one or more wavelengths in the range of about 492-577 nm, and blue light may include light of one or more wavelengths in the range of about 435-493 nm.

In some embodiments, the light source 530 (FIG. 6) may be configured to emit light of one or more wavelengths outside the visual perception range of the viewer, for example, infrared and/or ultraviolet wavelengths. In addition, the in-coupling, out-coupling, and other light redirecting structures of the waveguides of the display 250 may be configured to direct and emit this light out of the display towards the user's eye 210, e.g., for imaging and/or user stimulation applications.

Figure 9A:
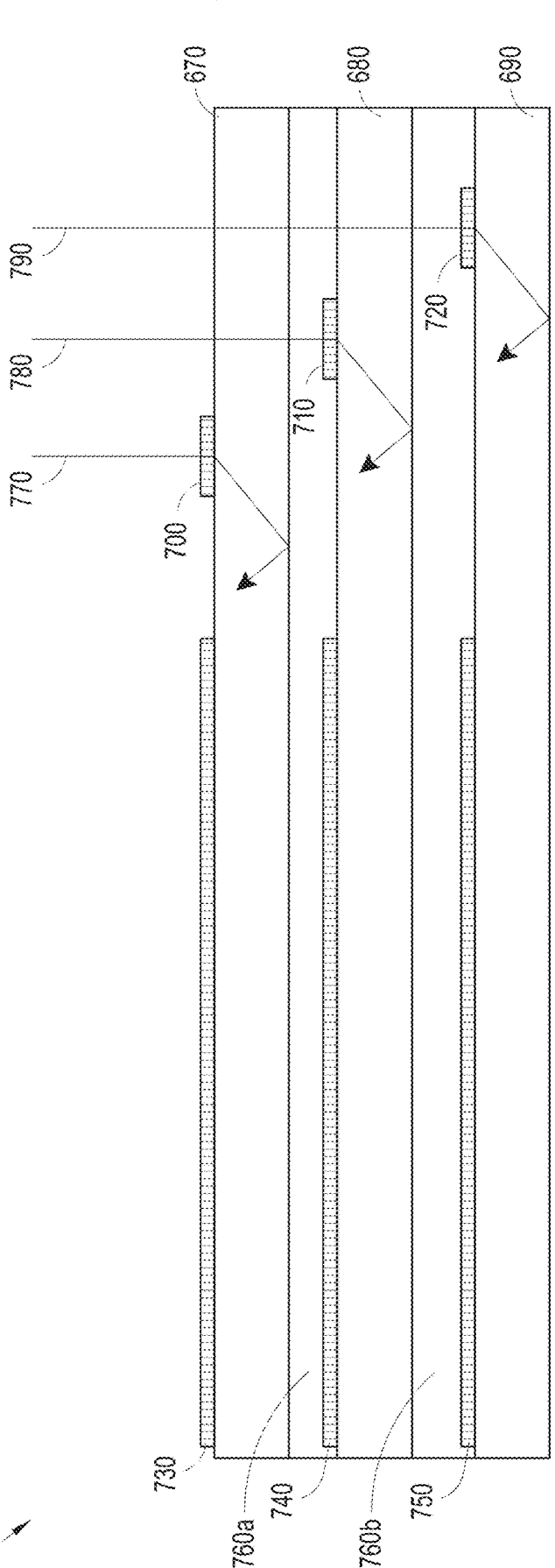
FIG. 9A illustrates a cross-sectional side view of an example of a set of stacked waveguides that each includes an in-coupling optical element.

With reference now to FIG. 9A, in some embodiments, light impinging on a waveguide may need to be redirected to in-couple that light into the waveguide. An in-coupling optical element may be used to redirect and in-couple the light into its corresponding waveguide. FIG. 9A illustrates a cross-sectional side view of an example of a plurality or set 660 of stacked waveguides that each includes an in-coupling optical element. The waveguides may each be configured to output light of one or more different wavelengths, or one or more different ranges of wavelengths. It will be appreciated that the stack 660 may correspond to the stack 260 (FIG. 6) and the illustrated waveguides of the stack 660 may correspond to part of the plurality of waveguides 270, 280, 290, 300, 310, except that light from one or more of the image injection devices 360, 370, 380, 390, 400 is injected into the waveguides from a position that requires light to be redirected for in-coupling.

The illustrated set 660 of stacked waveguides includes waveguides 670, 680, and 690. Each waveguide includes an associated in-coupling optical element (which may also be referred to as a light input area on the waveguide), with, e.g., in-coupling optical element 700 disposed on a major surface (e.g., an upper major surface) of waveguide 670, in-coupling optical element 710 disposed on a major surface (e.g., an upper major surface) of waveguide 680, and in-coupling optical element 720 disposed on a major surface (e.g., an upper major surface) of waveguide 690. In some embodiments, one or more of the in-coupling optical elements 700, 710, 720 may be disposed on the bottom major surface of the respective waveguide 670, 680, 690 (particularly where the one or more in-coupling optical elements are reflective, deflecting optical elements). As illustrated, the in-coupling optical elements 700, 710, 720 may be disposed on the upper major surface of their respective waveguide 670, 680, 690 (or the top of the next lower waveguide), particularly where those in-coupling optical elements are transmissive, deflecting optical elements. In some embodiments, the in-coupling optical elements 700, 710, 720 may be disposed in the body of the respective waveguide 670, 680, 690. In some embodiments, as discussed herein, the in-coupling optical elements 700, 710, 720 are wavelength selective, such that they selectively redirect one or more wavelengths of light, while transmitting other wavelengths of light. While illustrated on one side or corner of their respective waveguide 670, 680, 690, it will be appreciated that the in-coupling optical elements 700, 710, 720 may be disposed in other areas of their respective waveguide 670, 680, 690 in some embodiments.

As illustrated, the in-coupling optical elements 700, 710, 720 may be laterally offset from one another. In some embodiments, each in-coupling optical element may be offset such that it receives light without that light passing through another in-coupling optical element. For example, each in-coupling optical element 700, 710, 720 may be configured to receive light from a different image injection device 360, 370, 380, 390, and 400 as shown in FIG. 6, and may be separated (e.g., laterally spaced apart) from other in-coupling optical elements 700, 710, 720 such that it substantially does not receive light from the other ones of the in-coupling optical elements 700, 710, 720.

Each waveguide also includes associated light distributing elements, with, e.g., light distributing elements 730 disposed on a major surface (e.g., a top major surface) of waveguide 670, light distributing elements 740 disposed on a major surface (e.g., a top major surface) of waveguide 680, and light distributing elements 750 disposed on a major surface (e.g., a top major surface) of waveguide 690. In some other embodiments, the light distributing elements 730, 740, 750, may be disposed on a bottom major surface of associated waveguides 670, 680, 690, respectively. In some other embodiments, the light distributing elements 730, 740, 750, may be disposed on both top and bottom major surface of associated waveguides 670, 680, 690, respectively; or the light distributing elements 730, 740, 750, may be disposed on different ones of the top and bottom major surfaces in different associated waveguides 670, 680, 690, respectively.

The waveguides 670, 680, 690 may be spaced apart and separated by, e.g., gas, liquid, and/or solid layers of material. For example, as illustrated, layer 760a may separate waveguides 670 and 680; and layer 760b may separate waveguides 680 and 690. In some embodiments, the layers 760a and 760b are formed of low refractive index materials (that is, materials having a lower refractive index than the material forming the immediately adjacent one of waveguides 670, 680, 690). Preferably, the refractive index of the material forming the layers 760a, 760b is 0.05 or more, or 0.10 or less than the refractive index of the material forming the waveguides 670, 680, 690. Advantageously, the lower refractive index layers 760a, 760b may function as cladding layers that facilitate total internal reflection (TIR) of light through the waveguides 670, 680, 690 (e.g., TIR between the top and bottom major surfaces of each waveguide). In some embodiments, the layers 760a, 760b are formed of air. While not illustrated, it will be appreciated that the top and bottom of the illustrated set 660 of waveguides may include immediately neighboring cladding layers.

Preferably, for ease of manufacturing and other considerations, the material forming the waveguides 670, 680, 690 are similar or the same, and the material forming the layers 760a, 760b are similar or the same. In some embodiments, the material forming the waveguides 670, 680, 690 may be different between one or more waveguides, and/or the material forming the layers 760a, 760b may be different, while still holding to the various refractive index relationships noted above.

With continued reference to FIG. 9A, light rays 770, 780, 790 are incident on the set 660 of waveguides. It will be appreciated that the light rays 770, 780, 790 may be injected into the waveguides 670, 680, 690 by one or more image injection devices 360, 370, 380, 390, 400 (FIG. 6).

In some embodiments, the light rays 770, 780, 790 have different properties, e.g., different wavelengths or different ranges of wavelengths, which may correspond to different colors. The in-coupling optical elements 700, 710, 720 each deflect the incident light such that the light propagates through a respective one of the waveguides 670, 680, 690 by TIR. In some embodiments, the in-coupling optical elements 700, 710, 720 each selectively deflect one or more particular wavelengths of light, while transmitting other wavelengths to an underlying waveguide and associated in-coupling optical element.

For example, in-coupling optical element 700 may be configured to deflect ray 770, which has a first wavelength or range of wavelengths, while transmitting rays 780 and 790, which have different second and third wavelengths or ranges of wavelengths, respectively. The transmitted ray 780 impinges on and is deflected by the in-coupling optical element 710, which is configured to deflect light of a second wavelength or range of wavelengths. The ray 790 is deflected by the in-coupling optical element 720, which is configured to selectively deflect light of third wavelength or range of wavelengths.

With continued reference to FIG. 9A, the deflected light rays 770, 780, 790 are deflected so that they propagate through a corresponding waveguide 670, 680, 690; that is, the in-coupling optical elements 700, 710, 720 of each waveguide deflects light into that corresponding waveguide 670, 680, 690 to in-couple light into that corresponding waveguide. The light rays 770, 780, 790 are deflected at angles that cause the light to propagate through the respective waveguide 670, 680, 690 by TIR. The light rays 770, 780, 790 propagate through the respective waveguide 670, 680, 690 by TIR until impinging on the waveguide's corresponding light distributing elements 730, 740, 750.

Figure 9B:
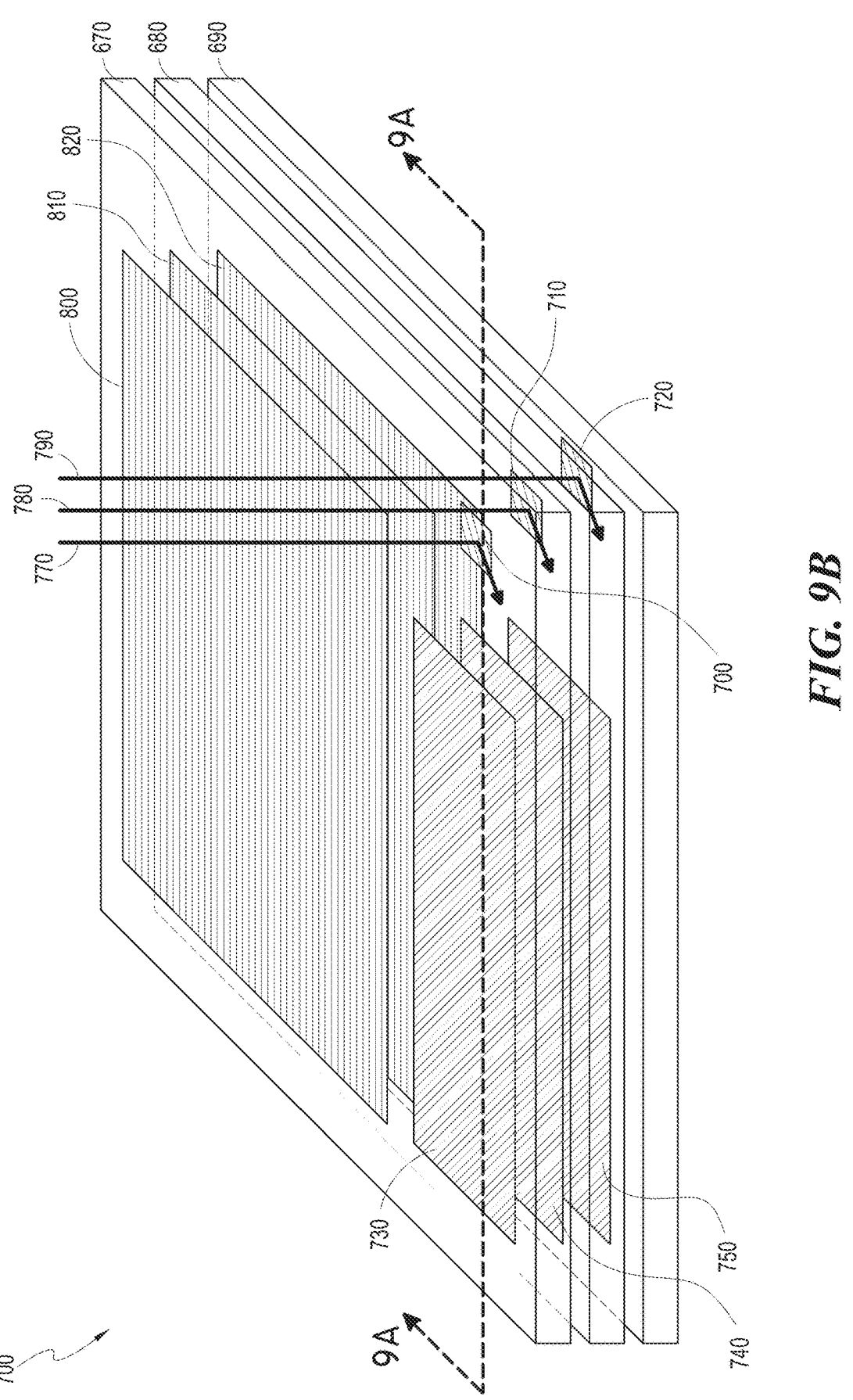
FIG. 9B illustrates a perspective view of an example of the plurality of stacked waveguides of FIG. 9A.

With reference now to FIG. 9B, a perspective view of an example of the plurality of stacked waveguides of FIG. 9A is illustrated. As noted above, the in-coupled light rays 770, 780, 790, are deflected by the in-coupling optical elements 700, 710, 720, respectively, and then propagate by TIR within the waveguides 670, 680, 690, respectively. The light rays 770, 780, 790 then impinge on the light distributing elements 730, 740, 750, respectively. The light distributing elements 730, 740, 750 deflect the light rays 770, 780, 790 so that they propagate towards the out-coupling optical elements 800, 810, 820, respectively.

In some embodiments, the light distributing elements 730, 740, 750 are orthogonal pupil expanders (OPE's). In some embodiments, the OPE's deflect or distribute light to the out-coupling optical elements 800, 810, 820 and, in some embodiments, may also increase the beam or spot size of this light as it propagates to the out-coupling optical elements. In some embodiments, the light distributing elements 730, 740, 750 may be omitted and the in-coupling optical elements 700, 710, 720 may be configured to deflect light directly to the out-coupling optical elements 800, 810, 820. For example, with reference to FIG. 9A, the light distributing elements 730, 740, 750 may be replaced with out-coupling optical elements 800, 810, 820, respectively. In some embodiments, the out-coupling optical elements 800, 810, 820 are exit pupils (EP's) or exit pupil expanders (EPE's) that direct light in a viewer's eye 210 (FIG. 7). It will be appreciated that the OPE's may be configured to increase the dimensions of the eye box in at least one axis and the EPE's may be to increase the eye box in an axis crossing, e.g., orthogonal to, the axis of the OPEs. For example, each OPE may be configured to redirect a portion of the light striking the OPE to an EPE of the same waveguide, while allowing the remaining portion of the light to continue to propagate down the waveguide. Upon impinging on the OPE again, another portion of the remaining light is redirected to the EPE, and the remaining portion of that portion continues to propagate further down the waveguide, and so on. Similarly, upon striking the EPE, a portion of the impinging light is directed out of the waveguide towards the user, and a remaining portion of that light continues to propagate through the waveguide until it strikes the EP again, at which time another portion of the impinging light is directed out of the waveguide, and so on. Consequently, a single beam of in-coupled light may be "replicated" each time a portion of that light is redirected by an OPE or EPE, thereby forming a field of cloned beams of light, as shown in FIG. 6. In some embodiments, the OPE and/or EPE may be configured to modify a size of the beams of light.

Accordingly, with reference to FIGS. 9A and 9B, in some embodiments, the set 660 of waveguides includes waveguides 670, 680, 690; in-coupling optical elements 700, 710, 720; light distributing elements (e.g., OPE's) 730, 740, 750; and out-coupling optical elements (e.g., EP's) 800, 810, 820 for each component color. The waveguides 670, 680, 690 may be stacked with an air gap/cladding layer between each one. The in-coupling optical elements 700, 710, 720 redirect or deflect incident light (with different in-coupling optical elements receiving light of different wavelengths) into its waveguide. The light then propagates at an angle which will result in TIR within the respective waveguide 670, 680, 690. In the example shown, light ray 770 (e.g., blue light) is deflected by the first in-coupling optical element 700, and then continues to bounce down the waveguide, interacting with the light distributing element (e.g., OPE's) 730 and then the out-coupling optical element (e.g., EPs) 800, in a manner described earlier. The light rays 780 and 790 (e.g., green and red light, respectively) will pass through the waveguide 670, with light ray 780 impinging on and being deflected by in-coupling optical element 710. The light ray 780 then bounces down the waveguide 680 via TIR, proceeding on to its light distributing element (e.g., OPEs) 740 and then the out-coupling optical element (e.g., EP's) 810. Finally, light ray 790 (e.g., red light) passes through the waveguide 690 to impinge on the light in-coupling optical elements 720 of the waveguide 690. The light in-coupling optical elements 720 deflect the light ray 790 such that the light ray propagates to light distributing element (e.g., OPEs) 750 by TIR, and then to the out-coupling optical element (e.g., EPs) 820 by TIR. The out-coupling optical element 820 then finally out-couples the light ray 790 to the viewer, who also receives the out-coupled light from the other waveguides 670, 680.

Figure 9C:
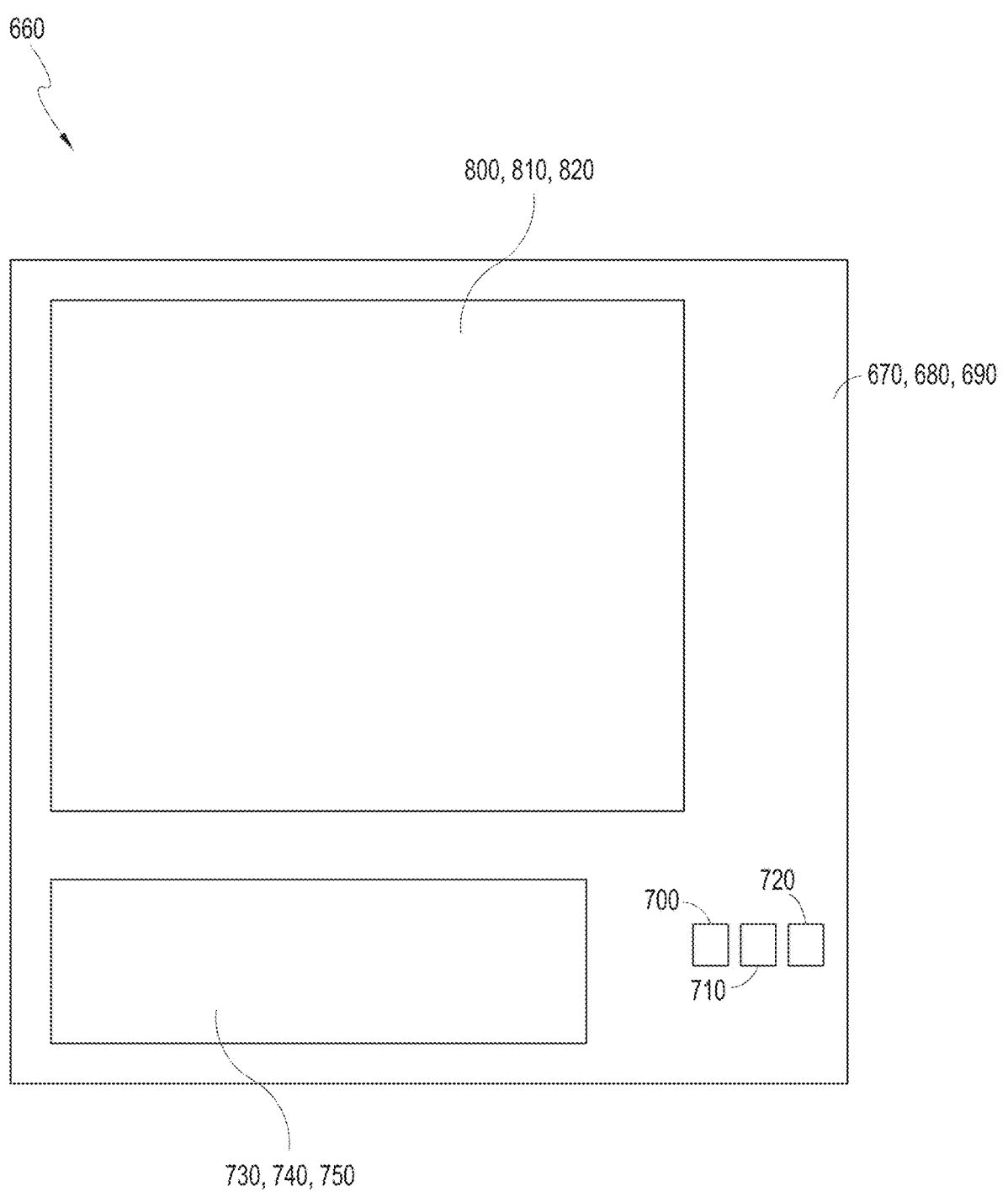
FIG. 9C illustrates a top-down plan view of an example of the plurality of stacked waveguides of FIGS. 9A and 9B.

FIG. 9C illustrates a top-down plan view of an example of the plurality of stacked waveguides of FIGS. 9A and 9B. As illustrated, the waveguides 670, 680, 690, along with each waveguide's associated light distributing element 730, 740, 750 and associated out-coupling optical element 800, 810, 820, may be vertically aligned. However, as discussed herein, the in-coupling optical elements 700, 710, 720 are not vertically aligned; rather, the in-coupling optical elements are preferably non-overlapping (e.g., laterally spaced apart as seen in the top-down view). As discussed further herein, this nonoverlapping spatial arrangement facilitates the injection of light from different resources into different waveguides on a one-to-one basis, thereby allowing a specific light source to be uniquely coupled to a specific waveguide. In some embodiments, arrangements including nonoverlapping spatially separated in-coupling optical elements may be referred to as a shifted pupil system, and the in-coupling optical elements within these arrangements may correspond to sub pupils.

Figure 9D:
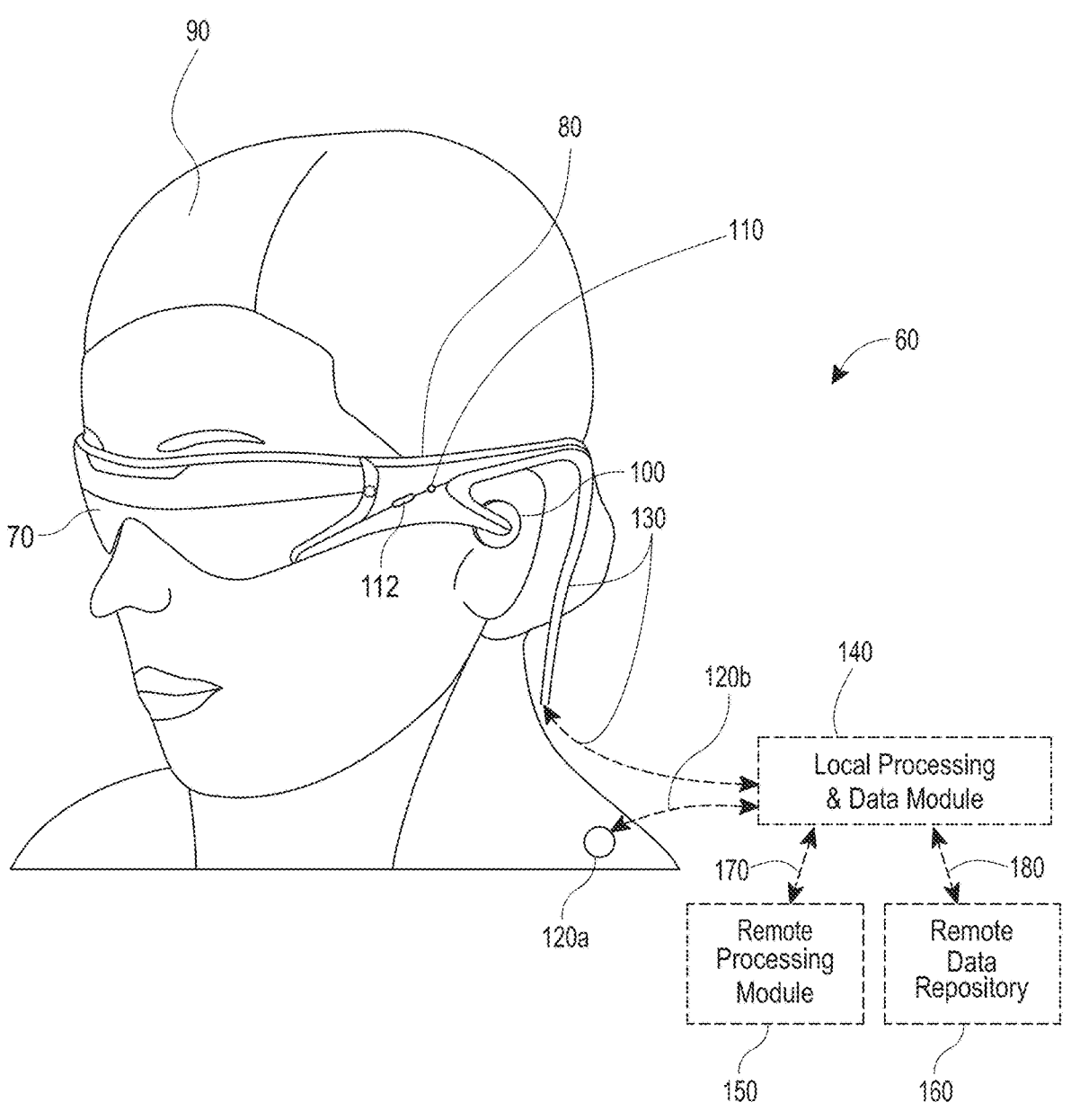
FIG. 9D illustrates an example of wearable display system.

FIG. 9D illustrates an example of wearable display system 60 into which the various waveguides and related systems disclosed herein may be integrated. In some embodiments, the display system 60 is the system 250 of FIG. 6, with FIG. 6 schematically showing some parts of that system 60 in greater detail. For example, the waveguide assembly 260 of FIG. 6 may be part of the display 70.

With continued reference to FIG. 9D, the display system 60 includes a display 70, and various mechanical and electronic modules and systems to support the functioning of that display 70. The display 70 may be coupled to a frame 80, which is wearable by a display system user or viewer 90 and which is configured to position the display 70 in front of the eyes of the user 90. The display 70 may be considered eyewear in some embodiments. In some embodiments, a speaker 100 is coupled to the frame 80 and configured to be positioned adjacent the ear canal of the user 90 (in some embodiments, another speaker, not shown, may optionally be positioned adjacent the other ear canal of the user to provide stereo/shapeable sound control). The display system 60 may also include one or more microphones 110 or other devices to detect sound. In some embodiments, the microphone is configured to allow the user to provide inputs or commands to the system 60 (e.g., the selection of voice menu commands, natural language questions, etc.), and/or may allow audio communication with other persons (e.g., with other users of similar display systems. The microphone may further be configured as a peripheral sensor to collect audio data (e.g., sounds from the user and/or environment). In some embodiments, the display system 60 may further include one or more outwardly directed environmental sensors 112 configured to detect objects, stimuli, people, animals, locations, or other aspects of the world around the user. For example, environmental sensors 112 may include one or more cameras, which may be located, for example, facing outward so as to capture images similar to at least a portion of an ordinary field of view of the user 90. In some embodiments, the display system may also include a peripheral sensor 120a, which may be separate from the frame 80 and attached to the body of the user 90 (e.g., on the head, torso, an extremity, etc. of the user 90). The peripheral sensor 120a may be configured to acquire data characterizing a physiological state of the user 90 in some embodiments. For example, the sensor 120a may be an electrode.

With continued reference to FIG. 9D, the display 70 is operatively coupled by communications link 130, such as by a wired lead or wireless connectivity, to a local data processing module 140 which may be mounted in a variety of configurations, such as fixedly attached to the frame 80, fixedly attached to a helmet or hat worn by the user, embedded in headphones, or otherwise removably attached to the user 90 (e.g., in a backpack-style configuration, in a belt-coupling style configuration). Similarly, the sensor 120a may be operatively coupled by communications link 120b, e.g., a wired lead or wireless connectivity, to the local processor and data module 140. The local processing and data module 140 may comprise a hardware processor, as well as digital memory, such as non-volatile memory (e.g., flash memory or hard disk drives), both of which may be utilized to assist in the processing, caching, and storage of data. Optionally, the local processor and data module 140 may include one or more central processing units (CPUs), graphics processing units (GPUs), dedicated processing hardware, and so on. The data may include data a) captured from sensors (which may be, e.g., operatively coupled to the frame 80 or otherwise attached to the user 90), such as image capture devices (such as cameras), microphones, inertial measurement units, accelerometers, compasses, GPS units, radio devices, gyros, and/or other sensors disclosed herein; and/or b) acquired and/or processed using remote processing module 150 and/or remote data repository 160 (including data relating to virtual content), possibly for passage to the display 70 after such processing or retrieval. The local processing and data module 140 may be operatively coupled by communication links 170, 180, such as via a wired or wireless communication links, to the remote processing module 150 and remote data repository 160 such that these remote modules 150, 160 are operatively coupled to each other and available as resources to the local processing and data module 140. In some embodiments, the local processing and data module 140 may include one or more of the image capture devices, microphones, inertial measurement units, accelerometers, compasses, GPS units, radio devices, and/or gyros. In some other embodiments, one or more of these sensors may be attached to the frame 80 or may be standalone structures that communicate with the local processing and data module 140 by wired or wireless communication pathways.

With continued reference to FIG. 9D, in some embodiments, the remote processing module 150 may comprise one or more processors configured to analyze and process data and/or image information, for instance including one or more central processing units (CPUs), graphics processing units (GPUs), dedicated processing hardware, and so on. In some embodiments, the remote data repository 160 may comprise a digital data storage facility, which may be available through the internet or other networking configuration in a "cloud" resource configuration. In some embodiments, the remote data repository 160 may include one or more remote servers, which provide information, e.g., information for generating augmented reality content, to the local processing and data module 140 and/or the remote processing module 150. In some embodiments, all data is stored, and all computations are performed in the local processing and data module, allowing fully autonomous use from a remote module. Optionally, an outside system (e.g., a system of one or more processors, one or more computers) that includes CPUs, GPUs, and so on, may perform at least a portion of processing (e.g., generating image information, processing data) and provide information to, and receive information from, modules 140, 150, 160, for instance via wireless or wired connections.

Example Waveguide Structures

Figure 10:
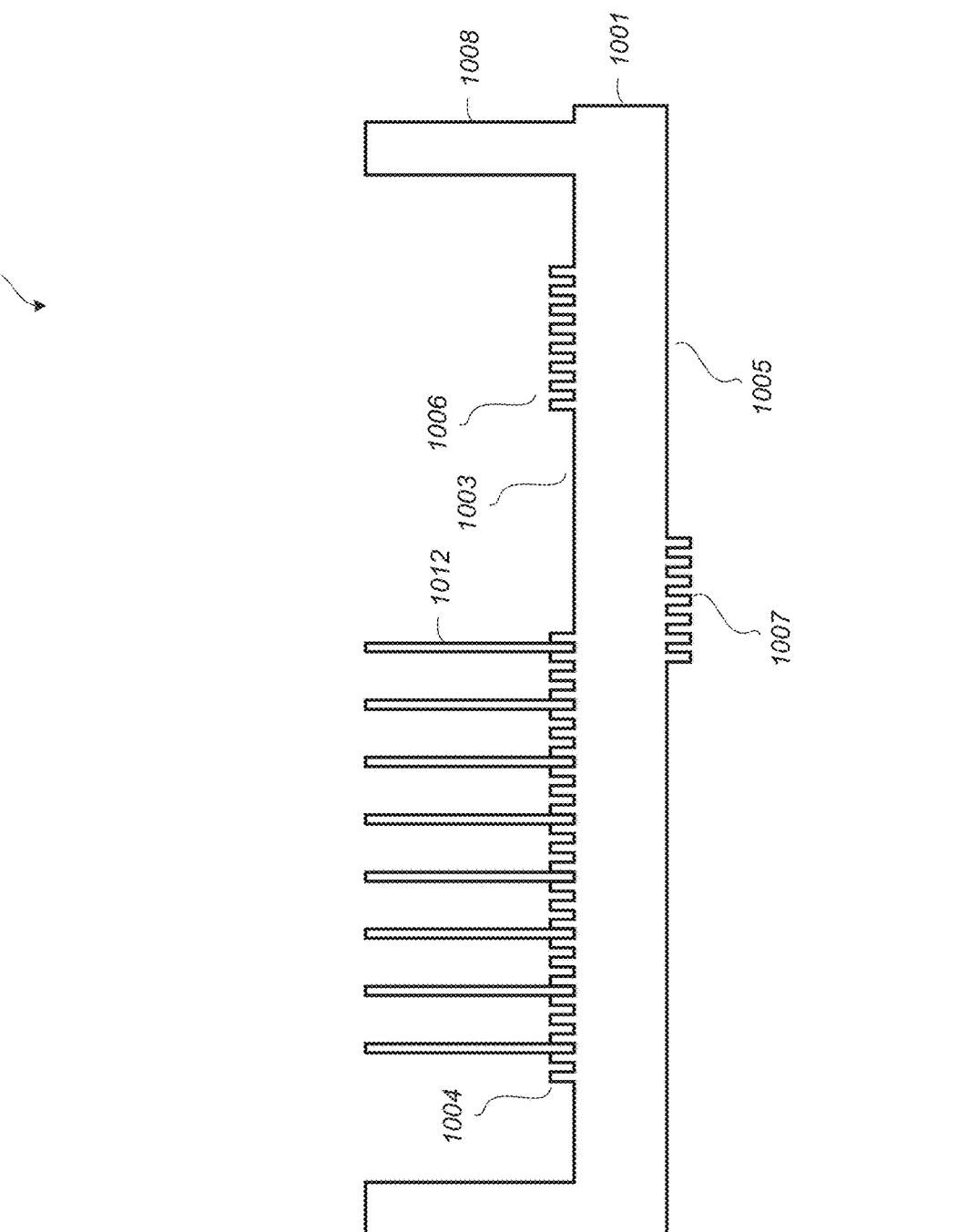
FIG. 10 illustrates an example of a side view of a waveguide comprising integrated pillars.

Referring now to FIG. 10, an example of a side view of a waveguide comprising integrated pillars is illustrated. A waveguide 1000 comprises a main optically transmissive body 1001 and pillars 1012 extending vertically from a major surface 1003 of the main body 1001. Additionally, in some embodiments, the spacers 1008 may extend from the major surface 1003 at a peripheral region of the major surface 1003. The pillars 1012 are smaller than the spacers 1008 in a lateral dimension and preferably have a smaller cross-sectional profile than the spacers 1008. In addition, the pillars 1012 may extend from the major surface 1003 at a central region of the major surface 1003. In some embodiments, the pillars 1012 are located amid first surface relief features 1004, which may correspond to the out-coupling optical elements 730, 740, 750 (FIGS. 9A-9C).

Preferably, the spacers 1008 and the pillars 1012 are integral with the waveguide 1000 and form a monolithic structure with the main optically transmissive body 1001. More preferably, the spacers 1008 and the pillars 1012 both form a monolithic structure with the main optically transmissive body 1001, with the material of the main optically transmissive body 1001 extending vertically to form the spacers 1008 and the pillars 1012. As a result, in some embodiments, the spacers 1008, the pillars 1012, and the main body 1001 may be formed of the same material and may be without an intervening boundary. In some embodiments, however, at least a tip of the pillars 1012 may have a different material composition than the spacers 1008, the remaining portion of the pillars 1012, and the main body 1001 of the waveguide 1000.

In some embodiments, the pillars 1012 may be formed of a different material composition than the main body 1001, such that an intervening boundary exists at the interface of the pillars 1012 and the main body 1001. For example, the pillars 1012 may comprise locally deposited material having a different composition from the main body 1001, and which may be imprinted to form the pillars 1012.

Figure 16:
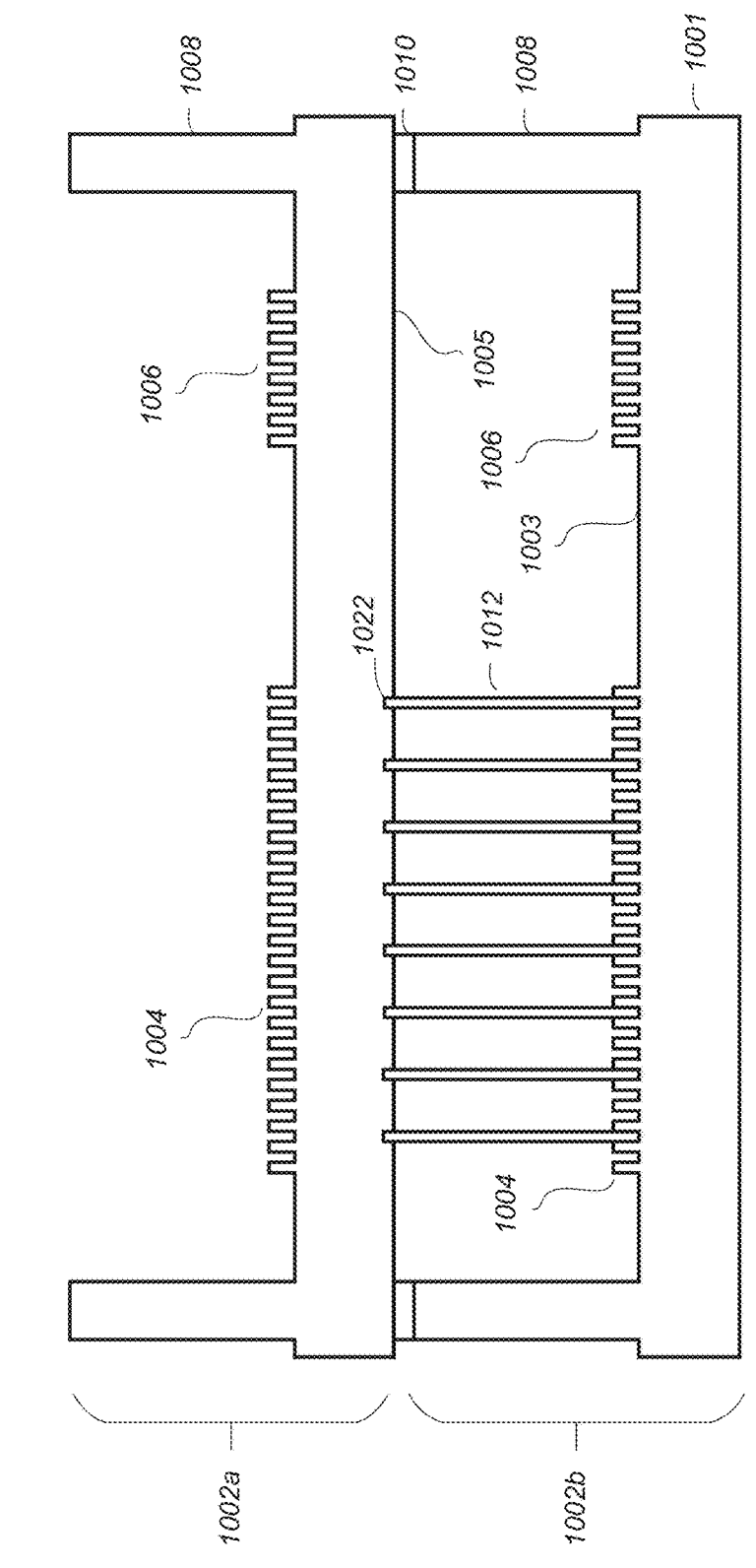
FIG. 16 illustrates an example of a side view of a stack of waveguides comprising indentations to accommodate the pillars in an immediately neighboring waveguide.

In some embodiments, as illustrated in FIG. 16, indentations 1022 are provided extending into a major surface 1005 of the waveguide 1000. As illustrated, the major surface 1005 and, thus, the indentations 1022 are disposed on a side of the waveguide 1000 opposite the major surface 1003. As discussed further herein, the indentations 1022 are preferably positioned, shaped, and sized such that pillars 1012 of an underlying waveguide may be accommodated within those indentations 1022. Similarly, the pillars 1012 are preferably positioned, shaped, and sized such that they may be accommodated within the indentations 1022 of an overlying waveguide 1002a.

In some embodiments, the waveguide 1000 may be provided without the indentations 1022, as illustrated in FIG. 10, and any underlying pillars 1012 forming part of an underlying waveguide (not shown) may simply contact the major surface 1005. Furthermore, in some embodiments, the orientation of the waveguide 1000 may be flipped, such that the pillars 1012 may be provided on the major surface 1005 and the indentations 1022 may be provided on the major surface 1003, and the pillars 1012 may extend to an underlying waveguide to be accommodated by the indentations 1022 on the major surface 1003 of the underlying waveguide. In some embodiments, no indentations 1022 are provided on either the major surface 1003 or the major surface 1005, such that the pillars 1012 disposed on the major surface 1003 extend to and directly contact the major surface 1005 (or the major surface 1003 when the pillars are disposed on the major surface 1005 of an overlying waveguide 1002a).

With continued reference to FIG. 10, in some embodiments, the major surface 1003 may comprise surface relief features 1004, 1006. As illustrated, the pillars 1012 and the spacers 1008 extend vertically to a height greater than the top of the surface relief features 1004, 1006. Preferably, the spacers 1008 and the pillars 1012 have a height sufficient to space the waveguide 1000 from an overlying waveguide 1002a or an underlying waveguide 1002b by a desired separation distance, e.g., 10 μm or more, or 30 μm or more, or 10 μm to 200 μm. In some embodiments, the spacers 1008 and the pillars 1012 have a height of 30 μm or more. As discussed herein, the spacers 1008 and the pillars 1012 may fit within the indentations 1022 of an overlying waveguide 1002a or an underlying waveguide 1002b in some embodiments. In such embodiments, the height of the spacers 1008 and the pillars 1012 may be equal to the desired separation between waveguides (e.g., 30 μm) plus the depth of the indentations 1022 in which the pillars 1012 and/or spacers 1008 are inserted. If no indentations 1022 are provided, the height of the pillars 1012 and/or the spacers 1008 may be equal to the desired separation between waveguides (e.g., 30 μm).

Additionally or alternatively to the surface relief features 1004, 1006 on the major surface 1003, in some embodiments, surface relief features 1007 may be provided on the opposing major surface 1005. In some embodiments, one or more of the surface relief features 1004, 1006, and 1007 may include a pattern of protrusions and indentations sized and arranged to form a diffractive optical element, such as a diffractive grating. It will be appreciated that such diffractive optical elements may correspond to one or more of the in-coupling optical elements 700, 710, 720; the light distributing elements 730, 740, 750; or the out-coupling optical elements 800, 810, 820 of FIGS. 9A-9C. For example, the surface relief features 1004, 1006, and 1007 may correspond to the out-coupling optical elements 800, 810, 820, the in-coupling optical elements 700, 710, 720, and the light distributing elements 730, 740, 750, respectively. In some embodiments, the waveguide 1000 may omit one or more of the surface relief features 1004, 1006, 1007 such that the major surfaces 1003, 1005 may be smooth except for the pillars 1012 and the spacers 1008. Furthermore, it will be appreciated that one or more of the surface relief features 1004, 1006, and 1007 may differ in size, number placement, and/or orientation from the illustrated embodiments. For example, the surface relief features 1004, 1006, and 1007 may comprise a plurality of diffractive gratings (e.g., for light in-coupling) disposed away from the center of the waveguide 1000 along the major surfaces 1003, 1005.

In some embodiments, the surface relief features 1004, 1006, and 1007 may be identical. In some other embodiments, the surface relief features 1004, 1006, and 1007 may be different from one another. For example, the surface relief features 1004 may be configured to diffract light of different wavelengths and/or different incident angles and/or to output light at different angles from the surface relief features 1006, which may be configured to diffract light of different wavelengths and/or different incident angles and/or to output light at different angles from the surface relief features 1007.

With continued reference to FIG. 10, the waveguide 1000 is preferably highly transparent and may be formed of an optically transmissive material, e.g., a highly transparent material. Preferably, the material has a high refractive index, which may provide advantages for providing a large field of view. In some embodiments, the material has a refractive index greater than 1.5, or greater than 1.65. The material forming the waveguide 1000 may be a highly transparent polymer material, e.g., an organic polymer material. Examples of high refractive index materials include polyimide-based high index resins, halogen-containing (e.g., bromine or iodine-containing) polymers, phosphorous containing polymers, thiol-ene based polymers, and high refractive index resin materials. Examples of high refractive index resin materials include those commercially available from NTT-AT of Kawasaki-shi, Kanagawa, Japan, such as the high refractive index resins sold under the name #565 and #566; and high refractive index resin materials commercially available from Akron Polymer System of Akron, Ohio, USA, such as the high refractive index resins sold under the name APS-1000, APS2004, APS-4001, and as part of the APS 3000 series.

Figure 11:
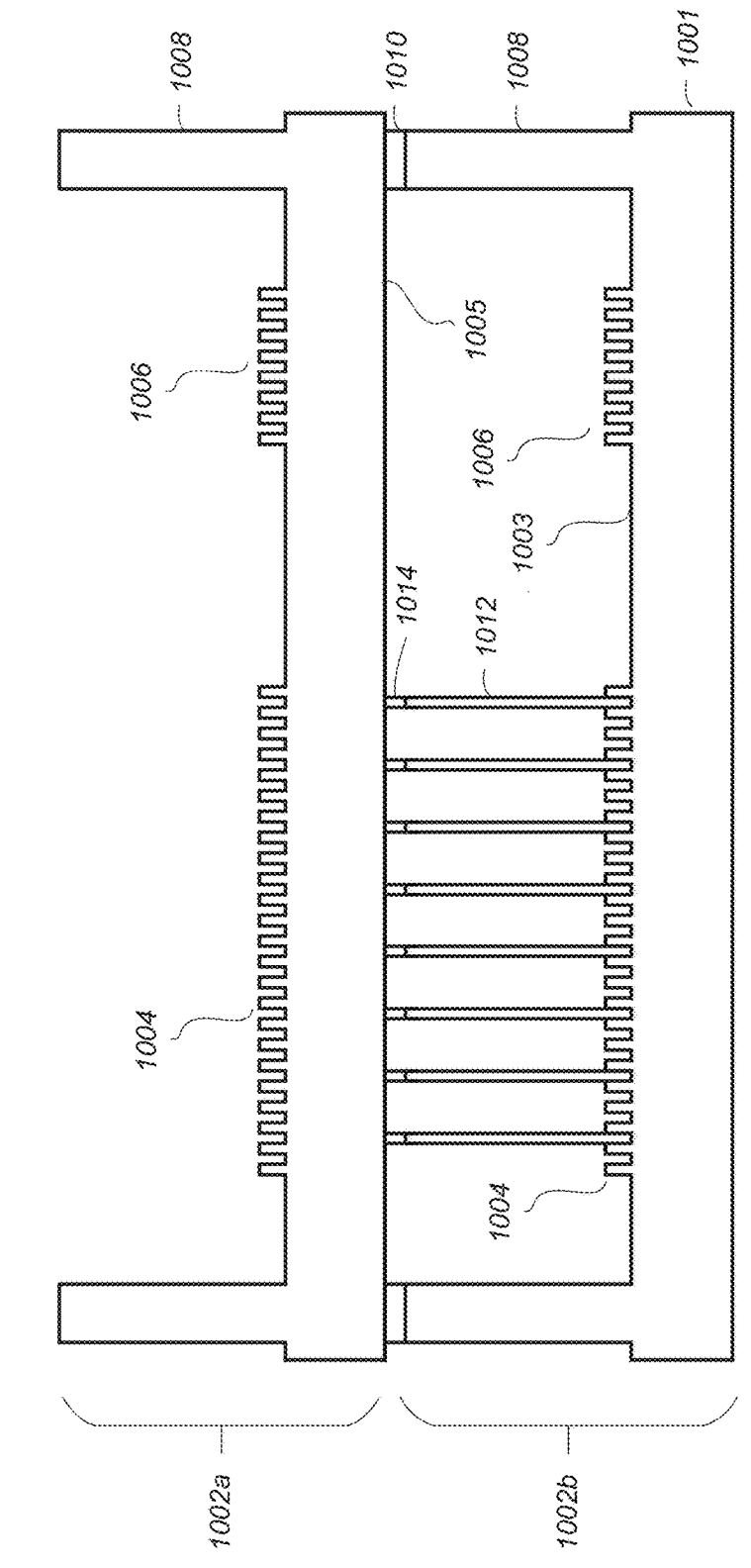
FIG. 11 illustrates an example of a side view of a stack of waveguides comprising an adhesive at the interface between integrated waveguide pillars and an immediately neighboring waveguide.

With reference now to FIG. 11, an example of a stack 1100 of waveguides comprising pillars 1012 is illustrated. A stack 1100 of waveguides comprises individual waveguides 1002a, 1002b, which may each correspond to the waveguide 1000 (FIG. 10). Individual waveguides 1002a, 1002b, comprise optically transmissive bodies 1001. Each waveguide of the stack 1100 further comprises pillars 1012 and spacers 1008. It will be appreciated that the pillars 1012 may be located in a central area in which diffractive optical elements, such as in-coupling and out-coupling optical elements, are disposed, while the spacers 1008 may be placed in the periphery around such an area. As such, the pillars 1012 may be placed within the sight lines of a user of a wearable near-eye display device comprising waveguide stack 1100 but may be sized and shaped such that the pillars 1012 are imperceptible or otherwise do not substantially impair the optical performance of the eyepiece.

The pillars 1012 may be sized and shaped to be substantially imperceptible to the human eye. For example, the longest lateral dimension of the cross-sectional shapes of the pillars 1012 (with the cross sections taken transverse to the height dimension of the pillars 1012) may be in the range of about 10 μm to about 500 μm. Preferably, the longest lateral dimension is less than 300 μm. More preferably, the longest lateral dimension is less than 250 μm. As examples, the longest lateral dimension may be about 10 μm, about 15 μm, about 20 μm, about 25 μm, about 30 μm, about 35 μm, about 40 μm, about 45 μm, about 50 μm, about 60 μm, about 70 μm, about 80 μm, about 90 μm, about 100 μm, about 110 μm, about 120 μm, about 130 μm, about 140 μm, about 150 μm, about 160 μm, about 170 μm, about 180 μm, about 190 μm, about 200 μm, about 210 μm, about 220 μm, about 230 μm, about 240 μm, about 250 μm, about 260 μm, about 270 μm, about 280 μm, about 290 μm, about 300 μm, about 310 μm, about 320 μm, about 330 μm, about 340 μm, about 350 μm, about 360 μm, about 370 μm, about 380 μm, about 390 μm, about 400 μm, about 410 μm, about 420 μm, about 430 μm, about 440 μm, about 450 μm, about 460 μm, about 470 μm, about 480 μm, about 490 μm, about 500 μm, or any value between any two of the aforementioned values. In some embodiments, the pillars 1012 may be roughly symmetrical about the above-noted longest lateral dimension.

Formation of smaller pillars 1012 (having smaller cross-sectional areas) may be less optically objectionable than larger pillars 1012. Similarly, to further reduce the perceptibility of a plurality of the pillars 1012 and to reduce interference with sight lines of a user, the pillars 1012 are preferably provided at a density of one or fewer pillars/mm² on the major surface of the waveguide. However, as discussed below with respect to FIGS. 24-27, closely spaced pillars 1012 may provide enhanced mechanical and thermal stability relative to lower densities. As examples, the pillars 1012 may be provided at a density of about 0.05 pillars/mm², about 0.10 pillars/mm², about 0.15 pillars/mm², about 0.20 pillars/mm², about 0.25 pillars/mm², about 0.30 pillars/mm², about 0.35 pillars/mm², about 0.40 pillars/mm², about 0.45 pillars/mm², about 0.50 pillars/mm², about 0.55 pillars/mm², about 0.60 pillars/mm², about 0.65 pillars/mm², about 0.70 pillars/mm², about 0.75 pillars/mm², about 0.80 pillars/mm², about 0.85 pillars/mm², about 0.90 pillars/mm², about 0.95 pillars/mm², about 1.00 pillars/mm², or any value between any two of the aforementioned values. The pillars 1012 may be provided in any pattern, orientation, placement, geometry, or number, and at any location on a major surface of a waveguide, including the viewing area. In some embodiments, rather than being in the midst of surface relief features such as in-coupling, out-coupling, and light redirecting features, the pillars 1012 may be provided centrally on a waveguide, but away from the various surface features.

In some embodiments, one or more of the waveguides 1002a, 1002b, may comprise surface relief features on one or more major surfaces of those waveguides 1002a, 1002b. For example, each of these waveguides 1002a, 1002b may comprise surface relief features 1004, 1006, and 1007 (not illustrated). In some embodiments, different ones of the waveguides 1002a, 1002b may include diffractive optical elements configured to in-couple and/or out-couple light of different wavelengths, e.g., corresponding to different component colors for forming a full-color image. For example, the waveguides 1002a, 1002b may correspond to the waveguides 670, 680, 690 of FIGS. 9A-9C.

It will be appreciated that, in some embodiments, the waveguides 1002a, 1002b may each be parts of larger sheets of optically transmissive material, which may then be cut or singulated to form multiple discrete waveguides, which may be stacked to form waveguide stacks, each of which may form an individual eyepiece for the display device. Thus, prior to stacking the waveguides and curing the adhesives 1010, 1014, an excess peripheral area of each waveguide of the stack of waveguides 1100 may be removed as part of a singulation process. During singulation, excess material may be removed from each waveguide of the waveguide stack 1100 along a singulation path in addition to forming multiple waveguides 1100 from a single sheet of material. Singulation may be performed using, for example, a laser cutting apparatus. In some embodiments in which the singulation path proceeds along a length of the spacers 1008, the spacers 1008 may be understood to define an edge of the waveguide, since the edge of the waveguide and the spacers 1008 are effectively coextensive.

An adhesive 1014 may be used to adhere the integral pillars disclosed herein to a neighboring waveguide. In some embodiments, the adhesive 1014 may be used alone or in combination with the indentations 1022 in an adjacent waveguide to secure the spacers 1008 to the adjacent waveguide. In some embodiments, the pillars 1012 may be bonded to an adjacent waveguide with adhesive 1014 such that the waveguides remain attached under device operation.

In some embodiments, the adhesive 1014 is a low viscosity adhesive. For example, in some embodiments, the adhesive 1014 may have a viscosity of less than about 25 cP at 25° C. For example, in some embodiments, the adhesive 1014 may comprise a viscosity of about 1 cP, about 2 cP, about 3 cP, about 4 cP, about 5 cP, about 6 cP, about 7 cP, about 8 cP, about 9 cP, about 10 cP, about 11 cP, about 12 cP, about 13 cP, about 14 cP, about 15 cP, about 16 cP, about 17 cP, about 18 cP, about 19 cP, about 20 cP, about 21 cP, about 22 cP, about 23 cP, about 24 cP, about 25 cP, or any value between any of the aforementioned values. In some embodiments, the adhesive 1014 may be applied to the pillars 1012 with an ink-jet printer. Alternatively, the adhesive 1014 may be applied by dipping the waveguide structure, including the pillars 1012, into a pool of liquid adhesive or a "sponge pad" that is loaded with liquid adhesive. When a pool of liquid adhesive or a "sponge pad" is utilized, the viscosity of the adhesive 1014 may exceed 25 cP.

In some embodiments, an adhesive may be applied during a stacking process, in which two or more waveguides are bonded and stacked to form a stacked waveguide assembly or waveguide stack 1100, such as stacked waveguide assembly 260 of FIG. 6. In some embodiments, after stacking two adjacent waveguides, or after stacking all waveguides of the waveguide assembly, the adhesive may undergo a curing process, in which the adhesive 1014 may be hardened, e.g., by exposure to heat, light, air, etc. Once cured, the adhesive 1014 may provide a high strength bond, which may be flexible or rigid, between directly adjacent waveguides. After curing, the adhesive 1014 is preferably resistant to changes in temperature or humidity, such that the adhesive 1014 maintains a strong bond despite temperature changes or exposure to moisture inside of a display device. Preferably, a low-viscosity adhesive, which may be advantageously dispensed by jet deposition, may be utilized to attach the pillars 1012 to the neighboring waveguide. Thus, adhesive 1014 may be provided to bond the pillars 1012 of an underlying waveguide to the surface of an overlying waveguide 1002*a*, such as the major surface 1005.

In some embodiments, the adhesive 1014 may be provided on the bottom surface of an overlying waveguide 1002*a* or within the indentations 1022 on the bottom surface of an overlying waveguide 1002*a*, such as the major surface 1006. For example, the adhesive 1014 may be dispensed within an indentation 1022 on the bottom surface of a waveguide while the bottom surface is facing up. The waveguide may then be flipped and placed on top of an underlying waveguide with pillars to bond the overlying waveguide 1002*a* and the underlying waveguide 1002*b* using the adhesive 1014. Alternatively, with the indentations 1022 facing upwards, a waveguide with the pillars 1012 facing downwards may be positioned such that the pillars 1012 contact the adhesive 1014 in the indentations 1022. This method may be preferable when using a low-viscosity adhesive, which may be more difficult to keep localized than a high-viscosity adhesive. In some embodiments, the adhesive 1014 may be applied to a top surface of the pillar 1012 and then the overlaying waveguide may be placed on top of the pillar 1012 to attach the overlying waveguide 1002*a* to the underlying waveguide 1002*b*.

With continued reference to FIG. 11, in some embodiments, a second adhesive 1010 may also be placed on or adjacent to the spacers 1008 to provide increased adhesion between the overlying waveguide 1002*a* to the underlying waveguide 1002*b*. It will be appreciated that the second adhesive 1010 may have the same composition as the adhesive 1014 and is preferably dispensed at the same time as the adhesive 1014.

As discussed herein, the adhesive 1014 and the second adhesive 1010 may be low-viscosity adhesives, which have advantages for ease of dispensing, particularly by jet deposition. The low-viscosity adhesive may include, for example, one or more of the following: epoxies, silicones, polyurethanes, cyanoacrylates, methyl-cyanoacrylates, ethyl-cyanoacrylates, elastomeric contact cements, UV curable adhesives, fast cure adhesives, low-viscosity glues, and adhesive resins, among others. The adhesive 1014 or second adhesive 1010 preferably have an as-deposited viscosity (the viscosity of the adhesive before being cured) in the range of less than 100 mPa·s, but preferably less than 25 mPa·s (1 mPa·s=1 cP) at 25° C. As examples, the adhesive 1014 and the second adhesive 1010 may have a viscosity of about 5 mPa·s, about 10 mPa·s, about 15 mPa·s, about 20 mPa·s, about 25 mPa·s, about 30 mPa·s, about 35 mPa·s, about 40 mPa·s, about 45 mPa·s, about 50 mPa·s, about 55 mPa·s, about 60 mPa·s, about 65 mPa·s, about 70 mPa·s, about 75 mPa·s, about 80 mPa·s, about 85 mPa·s, about 90 mPa·s, about 95 mPa·s, about 100 mPa·s, or any value between any two the aforementioned values. It will be appreciated that, after being deposited, the adhesive may become hardened, that is, change from a flowable liquid form to a solid form (e.g., by curing). In some embodiments, the adhesive 1014 or the second adhesive 1010 may comprise a thickness defined by a distance between the top surface of pillars 1012 and the underlying surface 1005 of directly adjacent waveguide 1002*a*. In some embodiments, the thickness of the adhesive 1014 or the second adhesive 1010 after curing may range from about 2 μm to about 20 μm. As examples, the thickness of adhesive 1014 or the second adhesive 1010 may be about 2.0 μm, about 2.5 μm, about 3.0 μm, about 3.5 μm, about 4.0 μm, about 4.5 μm, about 5.0 μm, about 5.5 μm, about 6.0 μm, about 6.5 μm, about 7.0 μm, about 7.5 μm, about 8.0 μm, about 8.5 μm, about 9.0 μm, about 9.5 μm, about 10.0 μm, about 10.5 μm, about 11.0 μm, about 11.5 μm, about 12.0 μm, about 12.5 μm, about 13.0 μm, about 13.5 μm, about 14.0 μm, about 14.5 μm, about 15.0 μm, about 15.5 μm, about 16.0 μm, about 16.5 μm, about 17.0 μm, about 17.5 μm, about 18.0 μm, about 18.5 μm, about 19.0 μm, about 19.5 μm, about 20.0 μm, or any value between any two of the aforementioned values.

Figure 12:
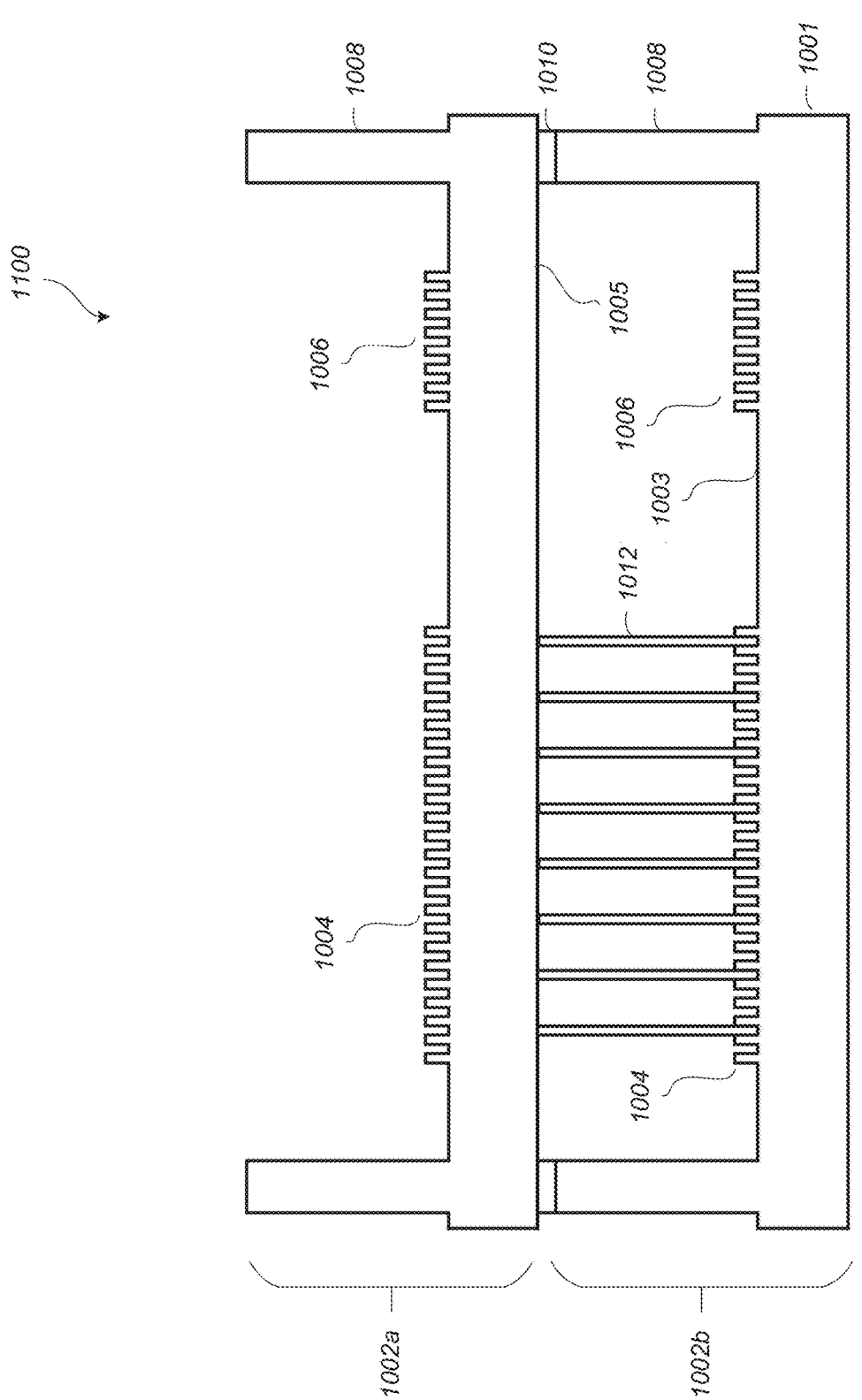
FIG. 12 illustrates an example of a side view of a stack of waveguides comprising integrated pillars directly bonded to an immediately neighboring waveguide.

Referring to FIG. 12, an example of a stack of waveguides 1100 comprising integrated pillars 1012 bonded to an immediately neighboring waveguide is illustrated. As discussed herein, the use of the integrated pillars 1012 and the spacers 1008 which define the separation distance between the neighboring waveguides provides one or more advantages. The integrated pillars 1012 and the spacers 1008 provide a fixed gap between the upper surface of an underlying waveguide 1002*b* and the bottom surface of an overlying waveguide 1002*a*, maintaining a consistent gap between waveguides of a waveguide stack 1100. The integrated pillars 1012 and the spacers 1008 may be cast with a consistent height, which provides a consistent gap (e.g., an air gap) between adjacent waveguides and may increase the performance of a display device, as discussed herein.

In some embodiments, after stacking directly adjacent waveguides 1002*a*, 1002*b* and one or more additional waveguides, the waveguide stack 1100 may be annealed. The anneal may be performed in an oven, in which the waveguide stack 1100 may undergo a process of softening or changing various properties through heating and cooling. The oven may be configured in various chamber styles such as a batch or continuous throughput configuration. Annealing the waveguide stack 1100 may soften and enhance ductility of the polymer material making up the stack, including the material forming the pillars 1012.

In some embodiments, the pillars 1012 in a central portion of the major surface 1003 are casted to have a height taller than the spacers 1008 near the periphery such that when an adhesive 1010 is provided on spacers 1008, the pillars 1012 and the spacers 1008 with adhesive 1010 maintain the overlying waveguide at an equal, fixed height. The waveguide stack 1100 may be placed into the oven vertically, such that waveguides 1002a, 1002b of the waveguide stack 1100 are arranged laterally, at the sides of one another, with major surfaces (e.g., major surface 1005) of the waveguides extending vertically. In addition, the pillars 1012 are preferably in contact with the major surface 1005 of waveguide 1002a prior to the anneal. In some embodiments, because heating of the waveguide stack 1100 may cause softening of the material forming the waveguide stack 1100, the heating may undesirably cause sagging or bowing of the relatively heavy constituent waveguides 1002a, 1002b. Advantageously, the vertical orientation of the waveguide stack 1100 within the oven may prevent undesired bowing of the waveguides 1002a, 1002b during an anneal. During the annealing step, the waveguide stack 110, including the pillars 1012 and the portions of the waveguide 1002a in contact with those pillars 1012, may undergo a softening, and then may be hardened by cooling, after which the pillars 1012 are bonded to major surface 1005 of an overlying waveguide (e.g., waveguide 1002a). In some embodiments, the pillars 1012 and the underlying waveguide 1002b may be formed of the same material and may form a monolithic structure with an overlying waveguide 1002a and any additional waveguides similarly bonded to the underlying waveguide 1002b or the overlying waveguide 1002a.

Figure 13:
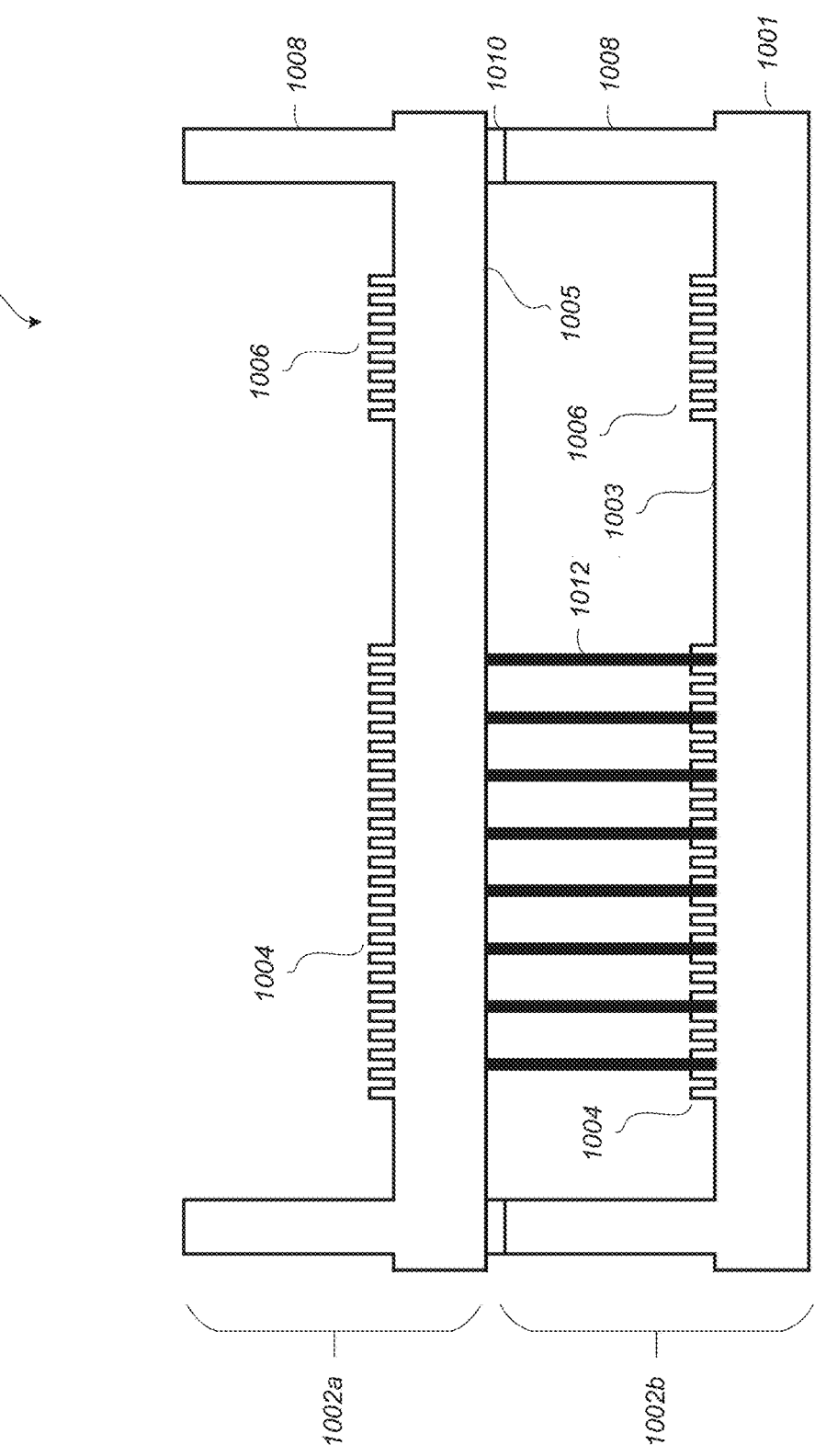
FIG. 13 illustrates an example of a side view of a stack of waveguides comprising pillars having a different material composition than the waveguides.

Referring now to FIG. 13, an example of a stack of waveguides 1100 comprising pillars 1012 of a different material composition than the waveguides is illustrated. As noted above, in some embodiments, eyepiece waveguides may be cured prior to stacking in such a way that the pillars 1012 or the tips of the pillars 1012 are cured to a lesser extent than the rest of the waveguide of which the pillars 1012 are a part. For example, in some embodiments, when a UV cure is utilized, the UV exposure may be configured such that the pillars 1012 or the tips of the pillars 1012 receive less exposure to UV than other portions of the eyepiece. For example, the waveguide 1002b, when formed in a mold, may be cured using a light source direct light through the bottom of the waveguide 1002b, so that the waveguide 1002b is essentially cured from the bottom up and, as such, the tips of the pillars 1012 receive light attenuated by propagation through the waveguide 1002b and the length of the pillar 1012.

Alternatively, a least a tip of the pillars 1012 may comprise a different material composition than the remaining portion of the pillars 1012 and the waveguide on which it is disposed. For example, the concentration of photoinitiator in the pillars 1012 or a tip of the pillars 1012 may be relatively low compared to the main body of the waveguide 1002b, such that the polymerization of monomers forming the pillars 1012 or the tips of the pillars 1012 during the UV cure occurs at a lesser extent relative to the material of the waveguide 1002b with the higher concentration of photoinitiator. FIG. 13 illustrates an example waveguide stack 1100 in which the pillars 1012 comprise a first material and the main bodies of waveguides 1002a, 1002b, the surface relief features 1004, 1006, and the spacers 1008 comprise a second material. In some embodiments, the inhibition of the photochemical reaction may result in pillars 1012 or tips of the pillars 1012 that are cured to a lesser extent than the main bodies of waveguides 1002a, 1002b, the surface relief features 1004, 1006, and the spacers 1008. The relatively un-cured pillars 1012 may facilitate adhesion of the pillars 1012 to the adjacent waveguide 1002a when stacked and put in contact with that waveguide.

Figure 14:
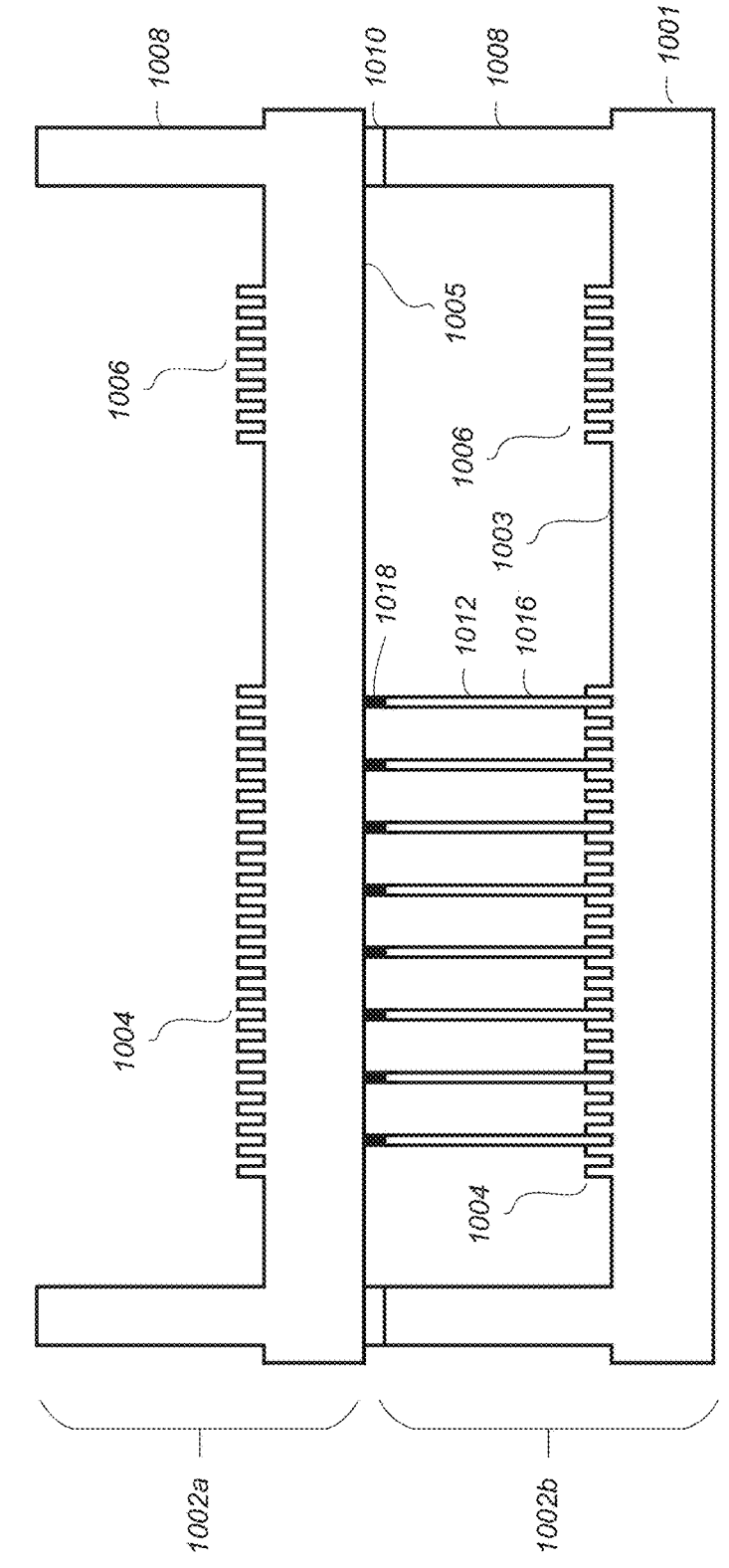
FIG. 14 illustrates an example of a side view of a stack of waveguides comprising pillars having a tip comprising a different material composition than a second portion of the pillars and of the waveguides.

FIG. 14 illustrates an example of a stack of waveguides 1100 comprising pillars 1012 having a tip comprising a first material 1018, such as a polymer material with a reduced amount of photoinitiator, and a second portion of the pillars 1012 comprising a second material 1016. Alternatively, or in addition to altering the amount of photoinitiator in the pillars 1012 or tips of pillars 1012 to affect the extent of curing, the pillars 1012 may be initially casted either in full or in part of the length (e.g., the tip that is in contact with the adjacent waveguide) with a different first material 1018 which is superhydrophilic. In some embodiments, a hydrophilic or superhydrophilic material may facilitate adhesion between the pillars 1012 or tips of the pillars 1012 and the bottom surface of the waveguide 1002a.

In addition to hydrophilic or superhydrophilic materials, the pillars 1012 or tips of the pillars 1012 may comprise a first material 1018, such as a monomer material coating that polymerizes under a thermal or UV cure of the individual waveguides or of the stack 1100. In some embodiments, a coating of monomers may be unnecessary as residual monomers may remain on the surface of the pillars 1012 after casting, e.g., due to incomplete curing of the pillars 1012, as discussed herein. In either case, monomers coated after casting or residual monomers on the surface of the pillars 1012 may diffuse and bond the pillars 1012 to adjacent waveguides. In some embodiments, the pillars 1012 may be formed of polymers such as polydimethylsiloxanes (PDMS), and the monomers may be monomers forming the PDMS.

In some embodiments, energy, such as in the form of a thermal or UV treatment 1019, may also be applied on the waveguide stack 1100 after stacking the individual waveguides. FIG. 15B illustrates an example of a stack of waveguides 1100 comprising pillars exposed to an ultraviolet (UV) or thermal cure after stacking. For some polymer system such as PDMS, the residual monomers on the surface of the pillars 1012 may diffuse and form bonds between the pillars 1012 and the major surface 1005 when subjected to a UV or thermal treatment after stacking the waveguides.

In some embodiments, the first material 1018 may comprise an adhesion-promoting material. The adhesion-promoting material may be a layer disposed between the pillars 1012 and the adhesive forming the first material 1018. Adhesion-promoting materials include, for example, some silanes, titanates, zirconates, zircoaluminates, or alkyl phosphate ester mixtures, or metal organics, among others. The adhesion-promoting material may participate in cross-linking and/or establishing bonds with adjacent waveguides. For example, the adhesion-promoting material may form an intra-facial layer between the pillars 1012 and the adhesive of the first material 1018, with the adhesion-promoting material forming bonds with the pillars 1012 and the adhesive, and with these bonds forming a stronger connection than would be formed between the pillars 1012 and the adhesive. In some embodiments, the adhesion-promoting material may be coated on the tips of the pillars 1012 before application of the adhesive on those tips. In some other embodiments, the adhesion-promoting material may be deposited onto the surfaces of holes for forming the pillars 1012 in a waveguide mold.

Figure 15A:
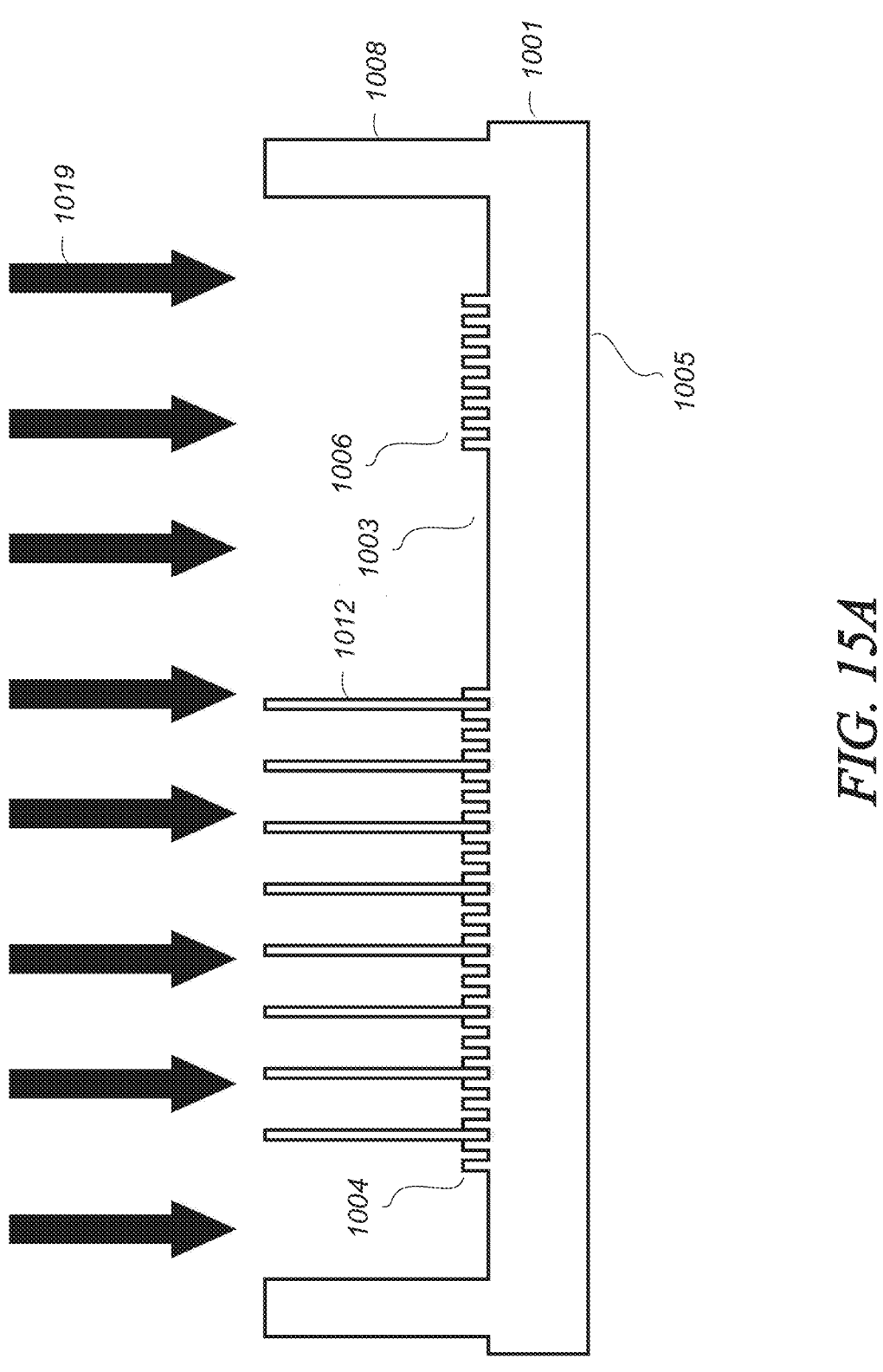
FIG. 15A illustrates an example of a side view of a waveguide comprising pillars exposed to a surface modification process.
Figure 15B:
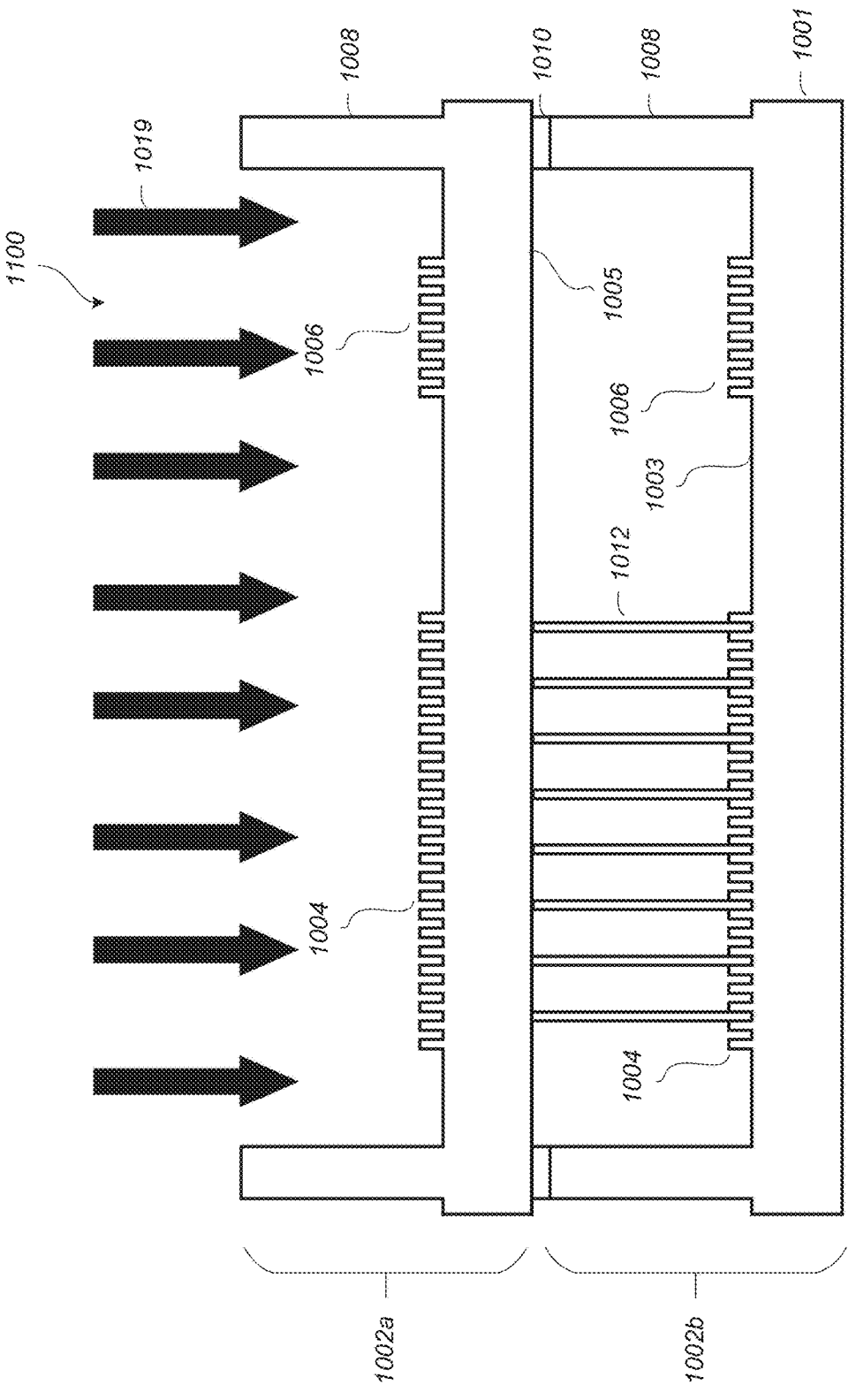
FIG. 15B illustrates an example of a side view of a stack of waveguides comprising pillars exposed to energy, such as in the form of ultraviolet (UV) light, and/or heat.

FIG. 15A illustrates an example of a waveguide comprising pillars exposed to a surface modification, which may include a plasma bombardment. A plasma bombardment 1019 may be utilized on a waveguide prior to stacking. Alternatively, or in addition to the UV or thermal cure noted above, the pillars 1012 may be subjected to a plasma bombardment 1019 with a soft plasma prior to stacking. Without being limited by theory, the plasma bombardment may modify the composition of the pillar surface, creating an OH bond, and making the polymer surface more hydrophilic, leading to greater adhesion between the pillars 1012 and the neighboring overlying waveguide 1002*a*. In some embodiments, during the plasma bombardment 1019, a precursor gas is introduced, and a combination of energy and low-pressure causes the gas to ionize and become plasma. The excited plasma ions collide with the surfaces of the pillars 1012, microscopically changing the geometry of the surface. For example, during the plasma bombardment, the surface may undergo an oxidation, which may form hydroxyl groups on the bombarded surface. These hydroxyl groups are polar, which may enhance the surface's adhesive properties, particularly where the surface of an overlying waveguide 1002*a* is also polar. In some embodiments, before the plasma bombardment 1019, other surfaces of the underlying waveguide 1002*b* may be protected, such as by a planarizing material that exposes the top surfaces of the pillars 1012. After the plasma bombardment 1019, the protective material may be removed, e.g., by a wet etch.

FIG. 16 illustrates an example of a stack of waveguides 1100 comprising indentations 1022 to accommodate the pillars 1012 in an immediately neighboring waveguide. In some embodiments, each waveguide also comprises indentations 1022 for accommodating the pillars 1012 of a directly underlying waveguide 1002*b*. It will be appreciated that the pillars 1012 have a height greater than the depth of the indentations 1022, such that, once accommodated into the indentations 1022, the pillars 1012 separate the waveguides by a gap (e.g., an air gap). As illustrated, the pillars 1012 fit within the indentations 1022.

In some embodiments, the pillars 1012 are disposed on one major surface 1003 of a waveguide and indentations or grooves 1022 are provided (e.g., casted) on an opposite major surface of the waveguide 1005. The indentations 1022 are sized and positioned to align with the pillars 1012 of immediately neighboring waveguides, thereby forming a self-aligned stack of waveguides 1100. In some embodiments, the indentations or grooves 1022 may have a height of about 2 μm to about 20 μm from the major surface 1003 of the eyepiece waveguide. Furthermore, the indentations or grooves 1022 may comprise a slightly larger lateral dimension compared to the pillars 1012 to provide a margin for alignment errors during stacking. For example, the lateral dimensions of the indentations or grooves 1022 may be about 10% larger than the pillars 1012. In some embodiments, the indentations or grooves 1022 may comprise between about a 5% and about a 50%, or 5% and about a 20%, larger lateral dimension than the pillars 1012.

Figure 17:
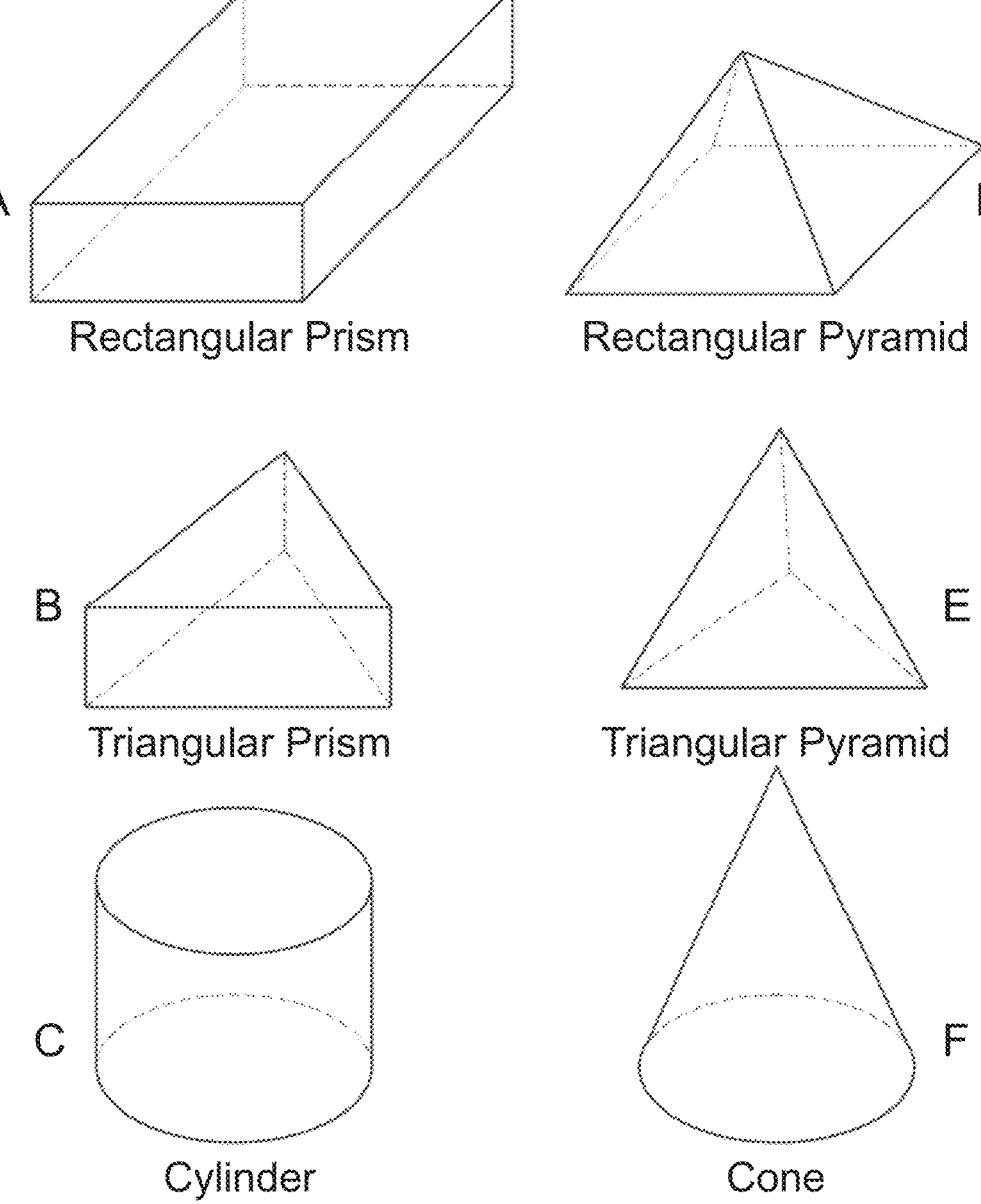
FIG. 17 illustrates perspective views of example shapes for pillars.

With reference now to FIG. 17, examples of 3-dimensional shapes for the pillars 1012 and the indentations 1022 for accommodating the pillars 1012 are illustrated. In some embodiments, the pillars 1012 may have the shape of a laterally elongated three-dimensional volume such as shape A, a rectangular prism. In some embodiments, the pillars 1012 and corresponding indentations 1022 may have other shapes including rectangular prisms (shape B), cylinders (shape C), rectangular pyramids (shape D), triangular pyramids (shape E), and cones (shape F). It will be appreciated that, in a single waveguide and/or a stack of waveguides 1100, multiple different shapes may be utilized in some embodiments. When indentations 1022 are used, indentations 1022 can be shaped and sized to match the shape and size of the corresponding pillars 1012, such that the pillars 1012 fit within indentations 1022. In some embodiments, the tops of the pillars 1012 may comprise a pointed shape (e.g., a rectangular pyramid (shape D), a triangular pyramid (shape E), or a cone (shape F)), which may facilitate alignment with indentations 1022 in an adjacent waveguide. It will be appreciated that the sides and tops of the pillars 1012 may comprise other shapes according to the requirements and specifications of an optical device comprising the stack of waveguides 1100.

Where the pillars are formed by imprinting, the desired rounding or flattening of the tops of the shapes may be formed by an appropriately shaped mold or imprint reticle. It will be appreciated that the sides and tops of the pillars 1012 may have one or more cross-sectional shapes (with the cross-section taken transverse to the long vertical axis of the spacers). The cross-sectional shapes comprise any shape according to the requirements and specifications of an optical device comprising the stack of waveguides 1100.

Figure 18:
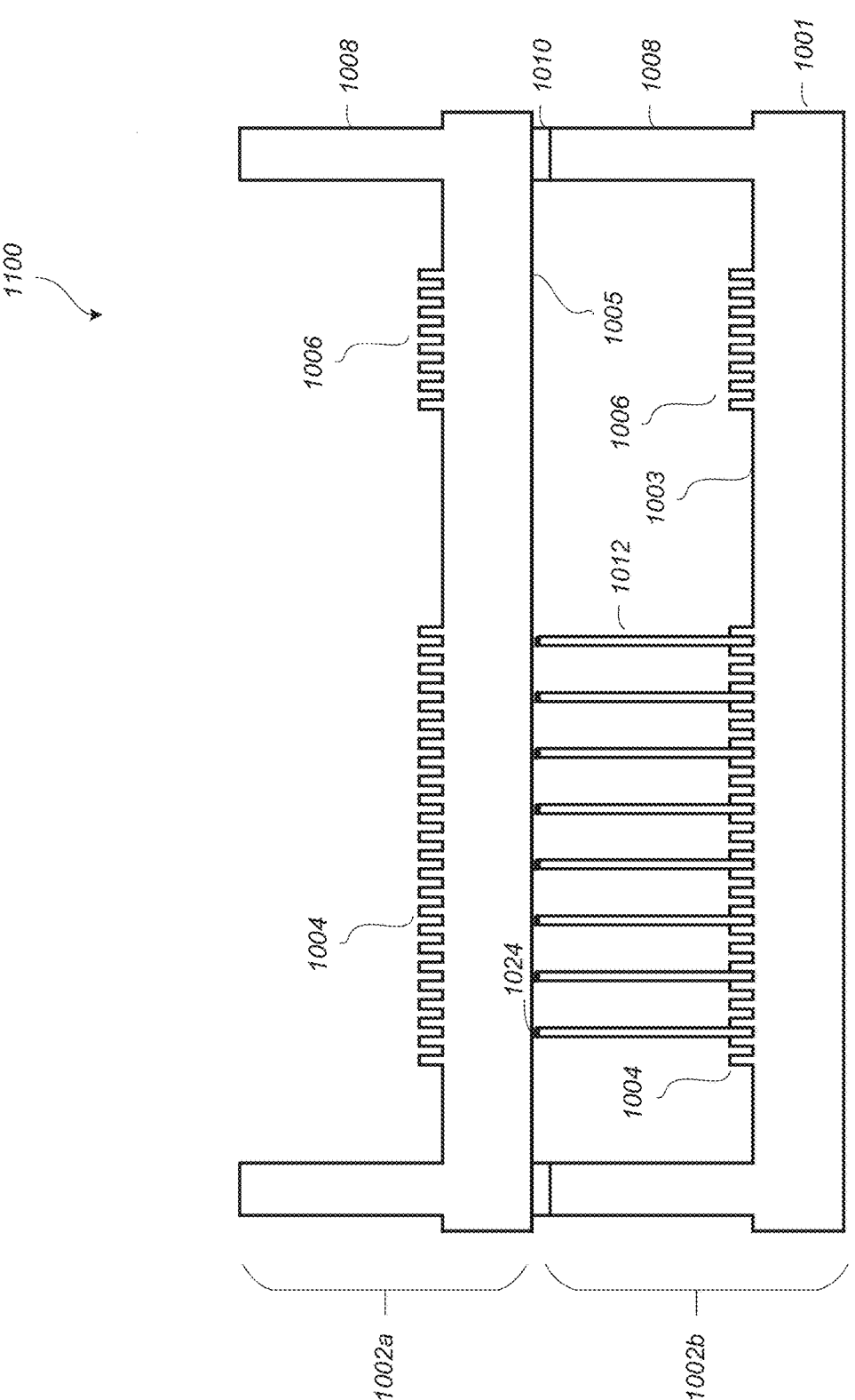
FIG. 18 illustrates an example of a side view of a stack of waveguides comprising rough surfaces on some areas of pillars.
Figure 19:
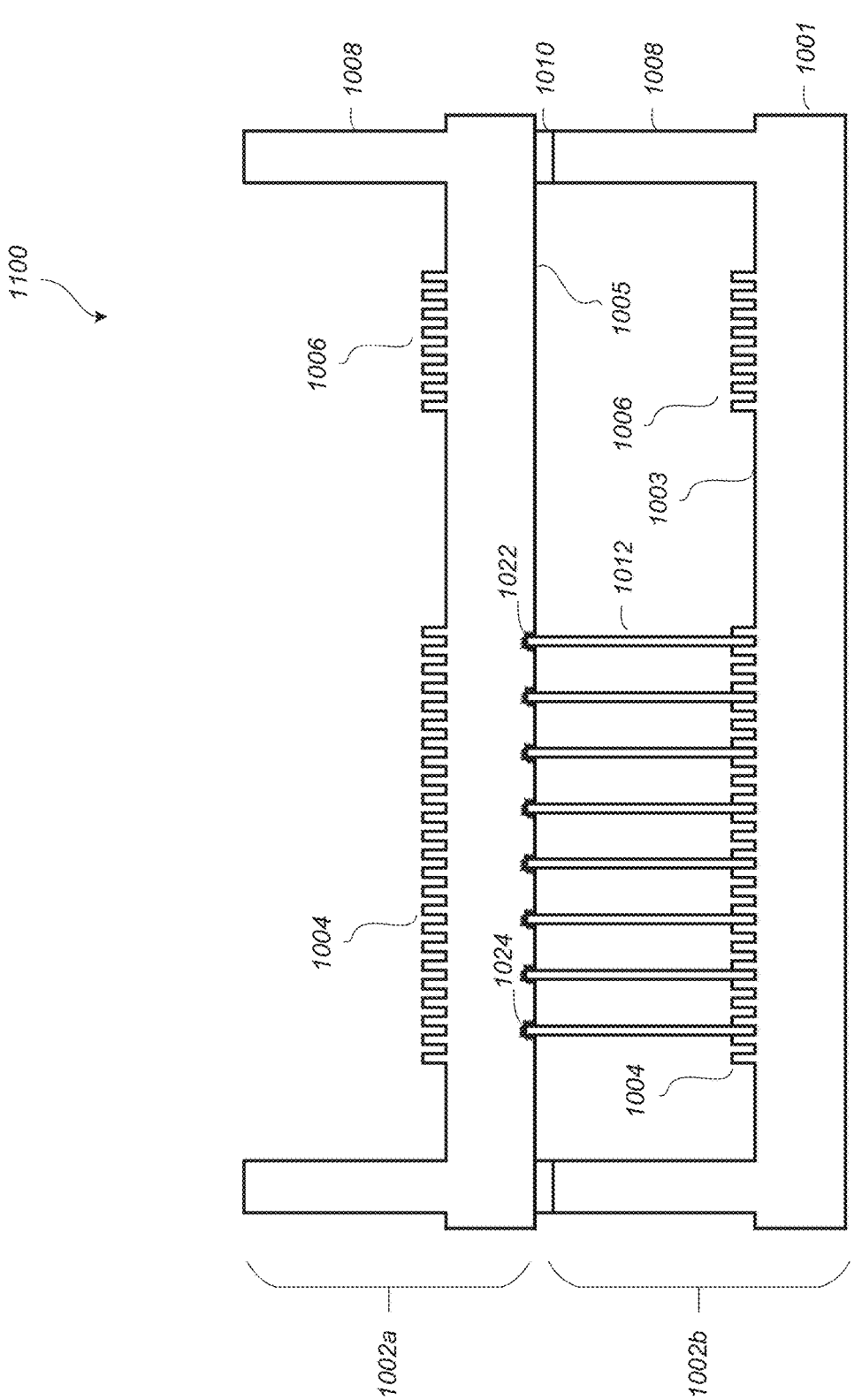
FIG. 19 illustrates an example of a side view of a stack of waveguides comprising indentations for accommodating pillars comprising rough surfaces.

FIG. 18 illustrates an example of a stack of waveguides comprising one or more rough surfaces on tips of the pillars 1012. In some embodiments, surfaces can be roughened, e.g., by physical abrasion, and/or by nanostructures formed during casting of the waveguide and the pillars 1012 to enhance adhesion of the surfaces. For example, roughened surface areas 1024 may be provided along the tops of pillars 1012 and/or along the bottom major surface 1005 of waveguide 1002*a*. The sides of the pillars 1012 adjacent the top surfaces may also be rough in some embodiments. Roughened surface areas 1024 may be combined with any of the aforementioned configurations, including, for example, the configurations of FIGS. 11-16. For example, roughened surface areas 1024 may be provided on surfaces contacting the adhesive 1014 of FIG. 11 to increase adhesion between the surfaces and the adhesive 1014. Without being bound to any particular theory, it is postulated that adhesion is enhanced when the adhesive 1014 penetrates into the pores, holes and crevices and other irregularities of the adhered surface, and locks mechanically to that surface. Furthermore, FIG. 19 illustrates an example of a stack of waveguides 1100 comprising indentations 1022 for accommodating pillars 1012 comprising rough surfaces. In some embodiments, the combination of the interlocking mechanical structure provided by the indentations 1022 and the increased adhesion provided by the roughened surfaces 1024 of the pillars 1012 may provide even greater adhesion and stability than either feature alone.

Figure 20:
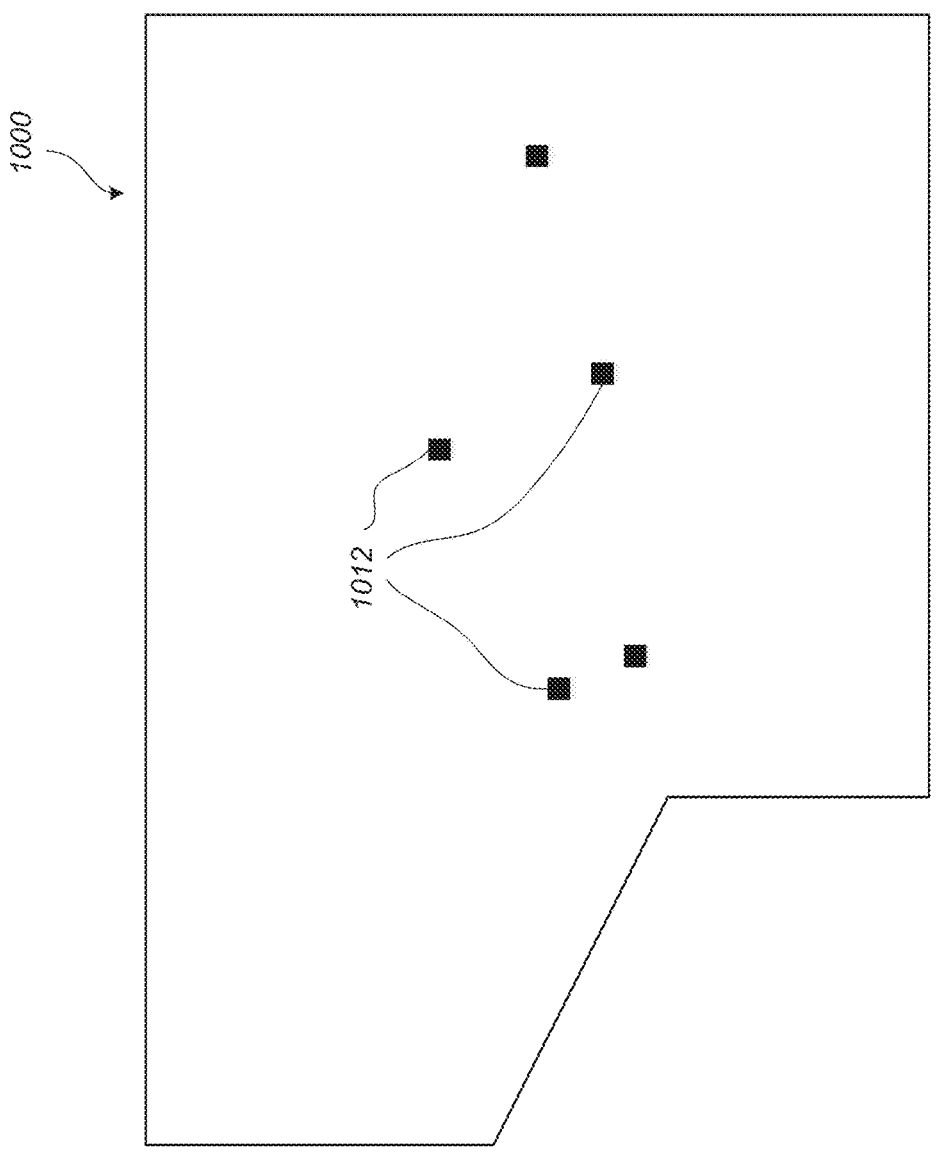
FIGS. 20-23 illustrate examples of top-down plan views of waveguides comprising pillars in central areas of the waveguides.
Figure 21:
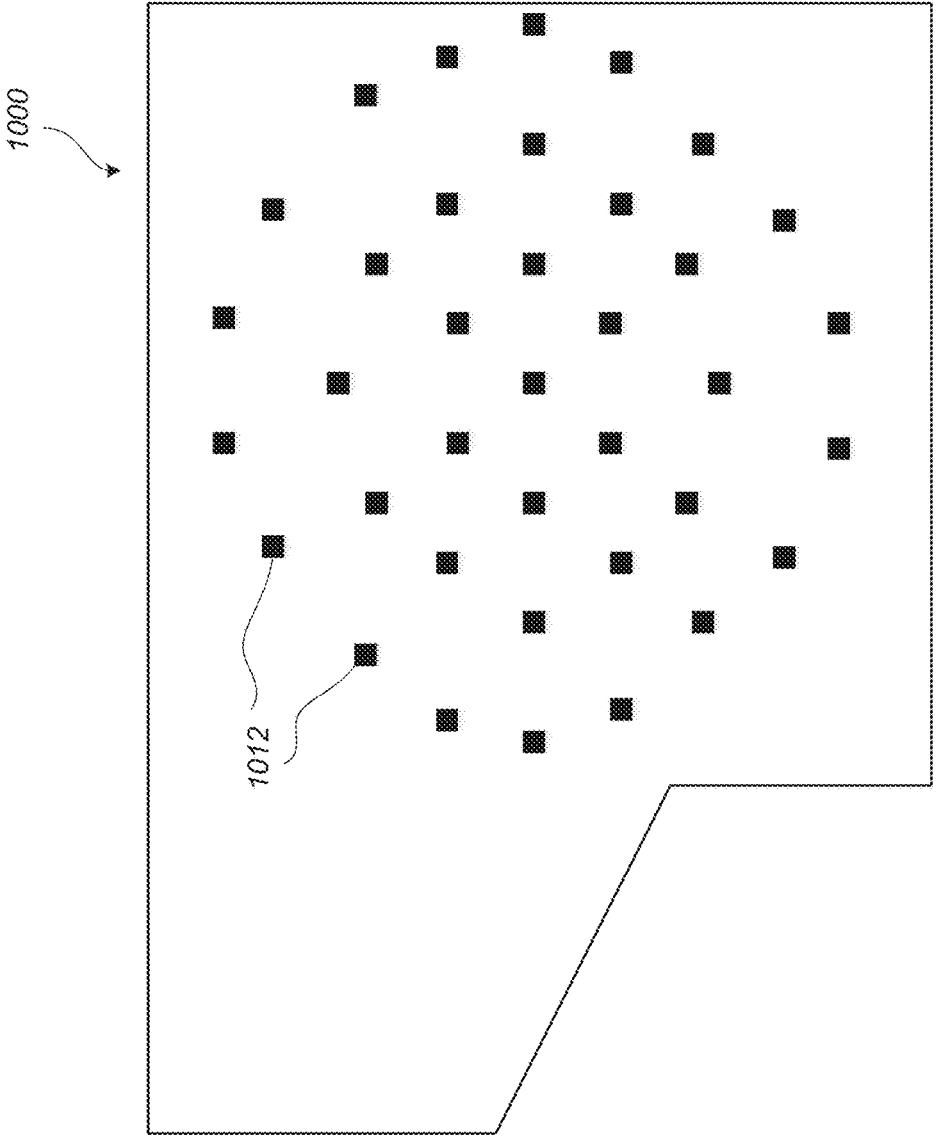
Figure 22:
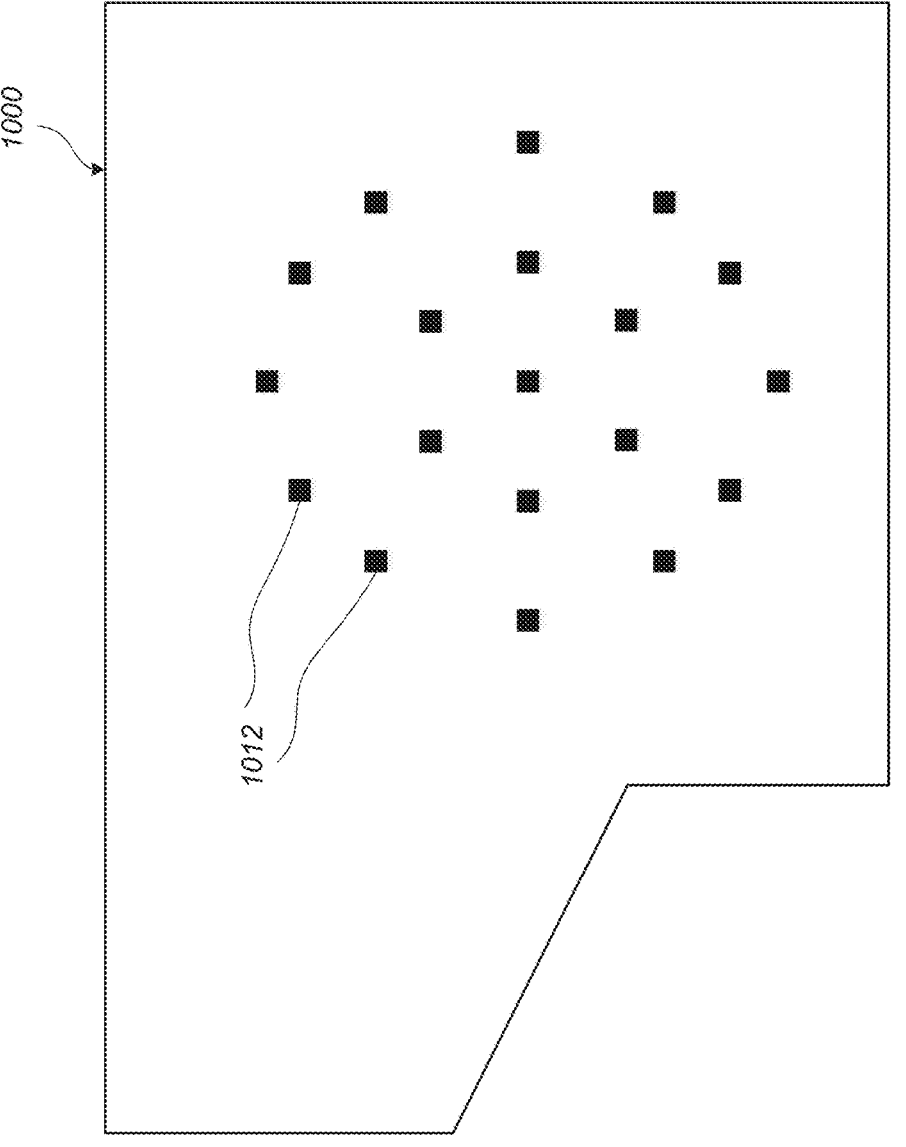
Figure 23:
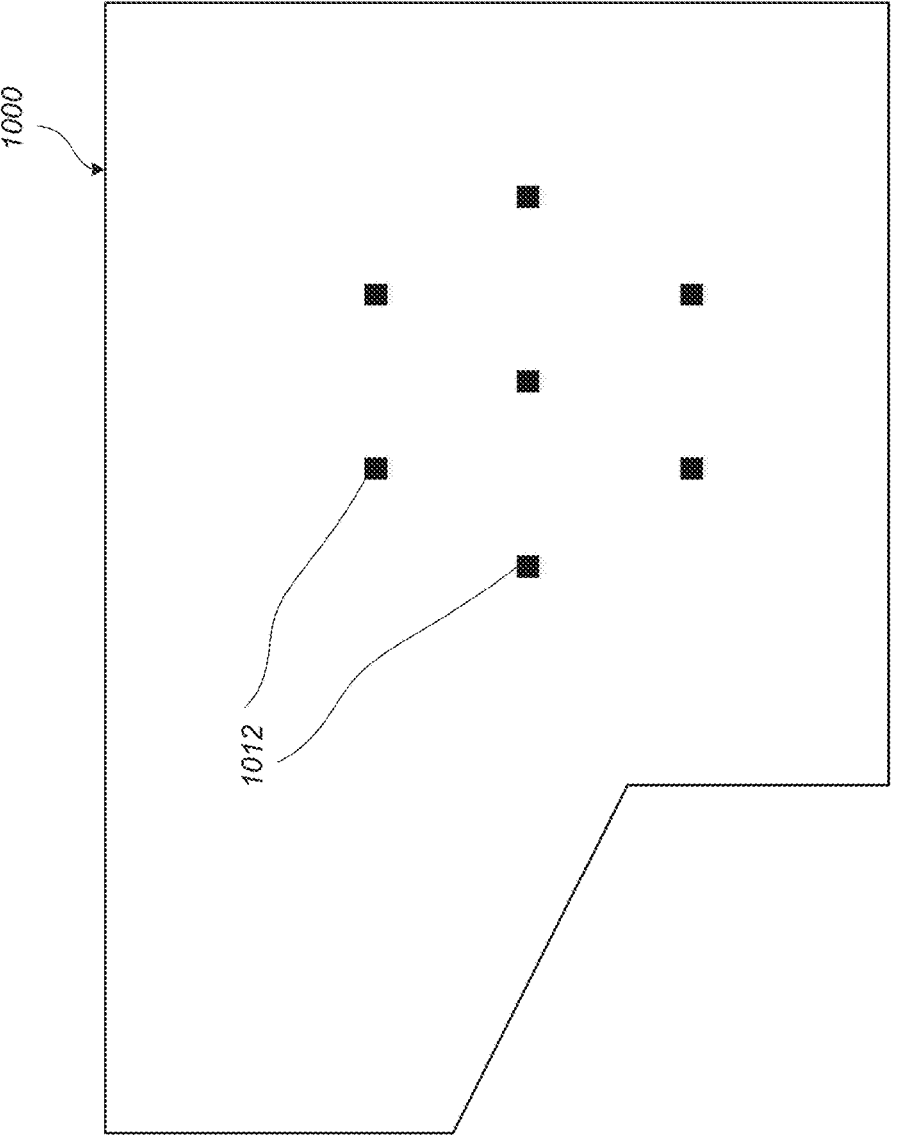

FIGS. 20-23 illustrate examples of top-down plan views of waveguides comprising pillars 1012. In some embodiments, as illustrated in FIG. 20, the pillars 1012 may be provided in any location and any configuration on a major surface of waveguide 1000, including within viewing areas of the waveguide 1000 with other surface relief features such as in-coupling and out-coupling optical elements or other light redirecting features, such as diffractive gratings. In some embodiments, the pillars 1012 may be located along concentric rings. For example, FIG. 21 illustrates a waveguide 1000 comprising concentric rings of pillars 1012 which, in some embodiments, may have a constant distance between pillars 1012. As an example, the pillars 1012 may be separated from other pillars 1012 by a distance of 5 mm. In some embodiments, a denser configuration of pillars 1012 may provide enhanced mechanical stability for a waveguide stack 1100. Additional examples of pillar configurations are provided in FIGS. 22 and 23. FIG. 22 illustrates a waveguide 1000 comprising concentric circles of pillars 1012 with a distance of 8 mm between each pillar, and FIG. 23, illustrates a waveguide 1000 comprising concentric circles of pillars 1012 with a distance of 10 mm between each pillar. However, it will be appreciated that the layout of the pillars 1012 is not limited to concentric rings, any shape or configuration of pillars 1012 is possible.

Figure 24:
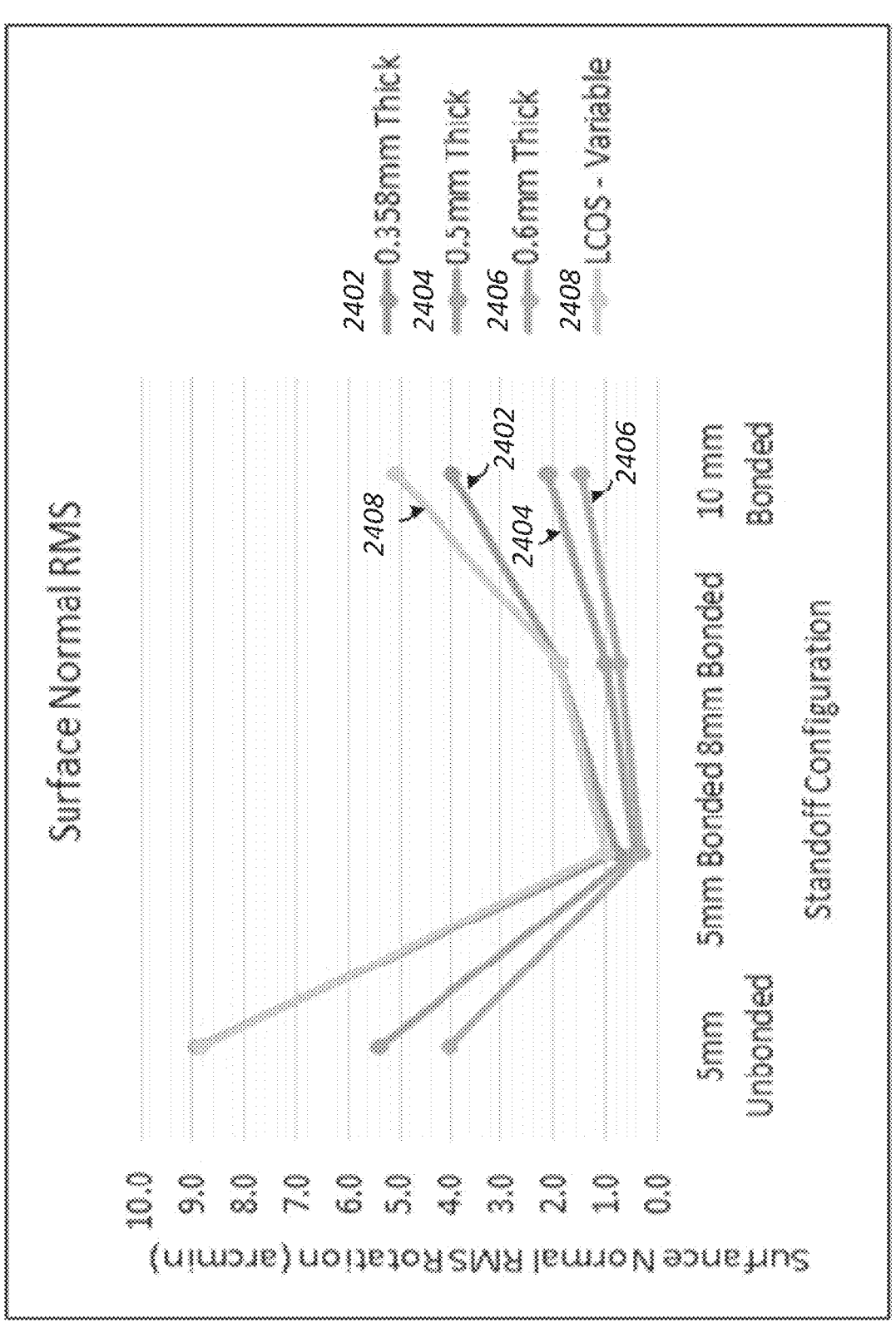
FIG. 24 illustrates a chart illustrating an example of the surface normal root mean squared (RMS) rotation for stacks of waveguides having various pillar configurations.
Figure 25:
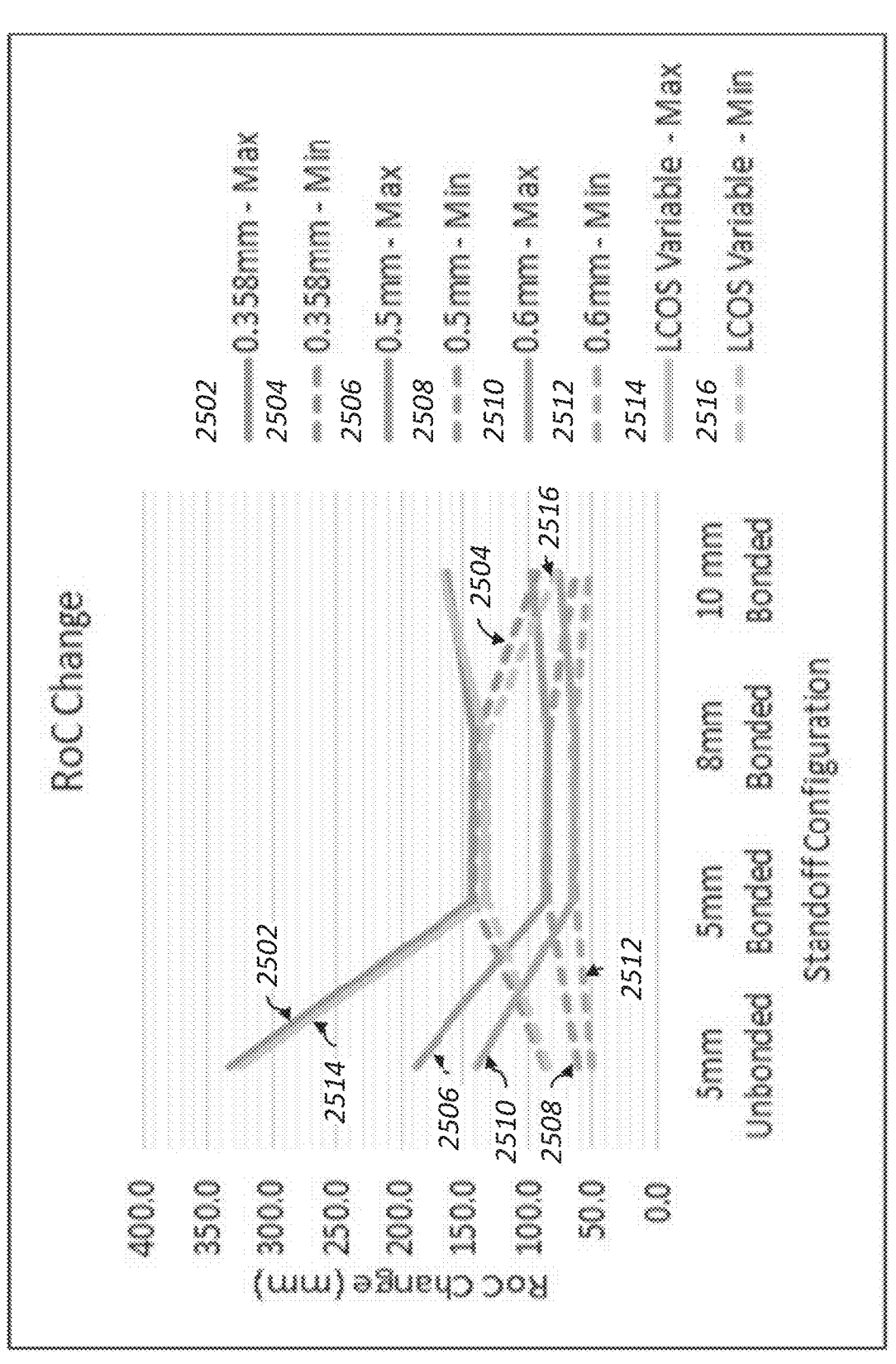
FIG. 25 illustrates a chart illustrating an example of the radius of top curvature for stacks of waveguides having various pillar configurations.
Figure 26:
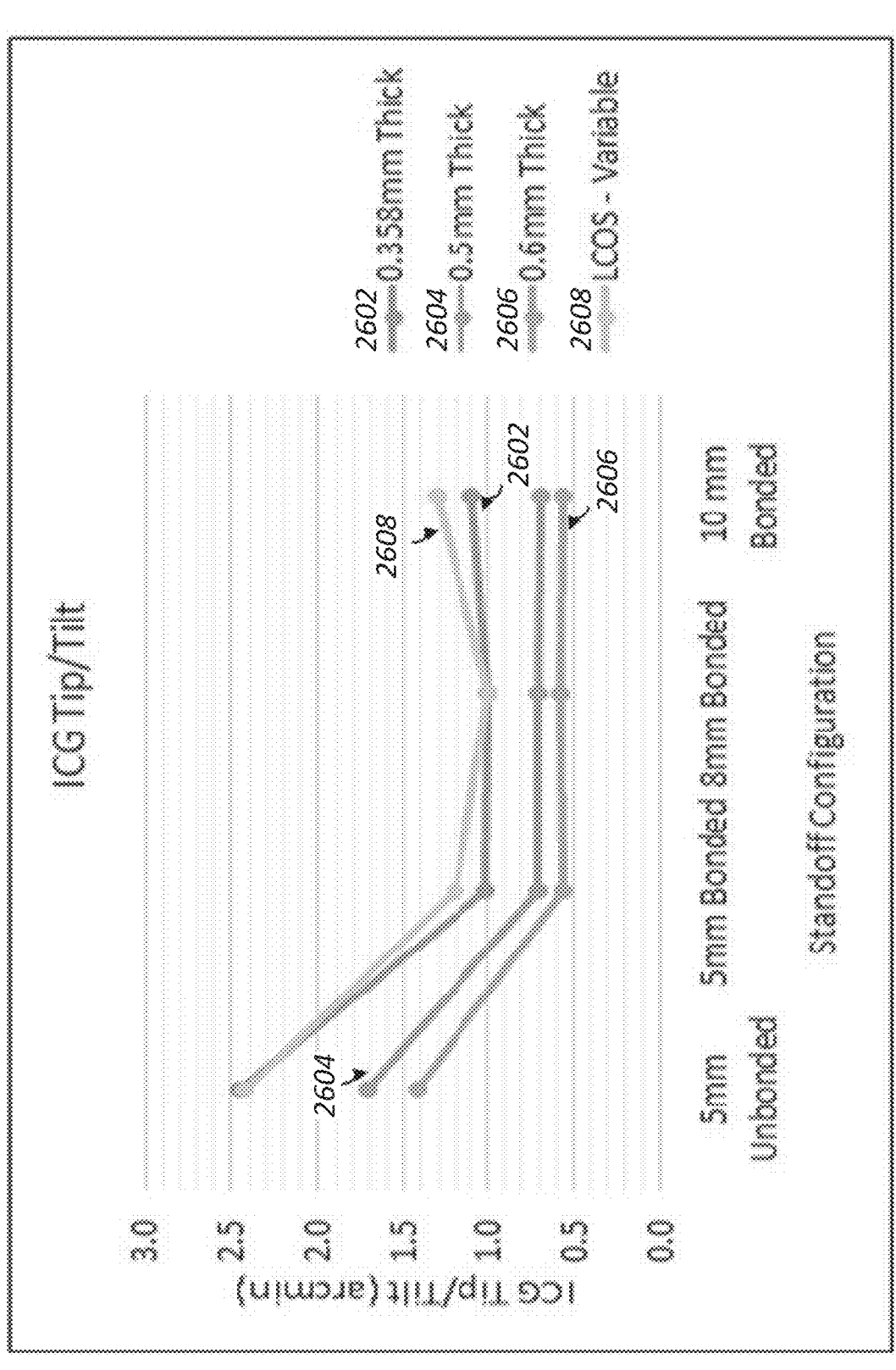
FIG. 26 illustrates a chart illustrating an example of the incoupling grating (ICG) tip/tilt for stacks of waveguides having various pillar configurations.
Figure 27:
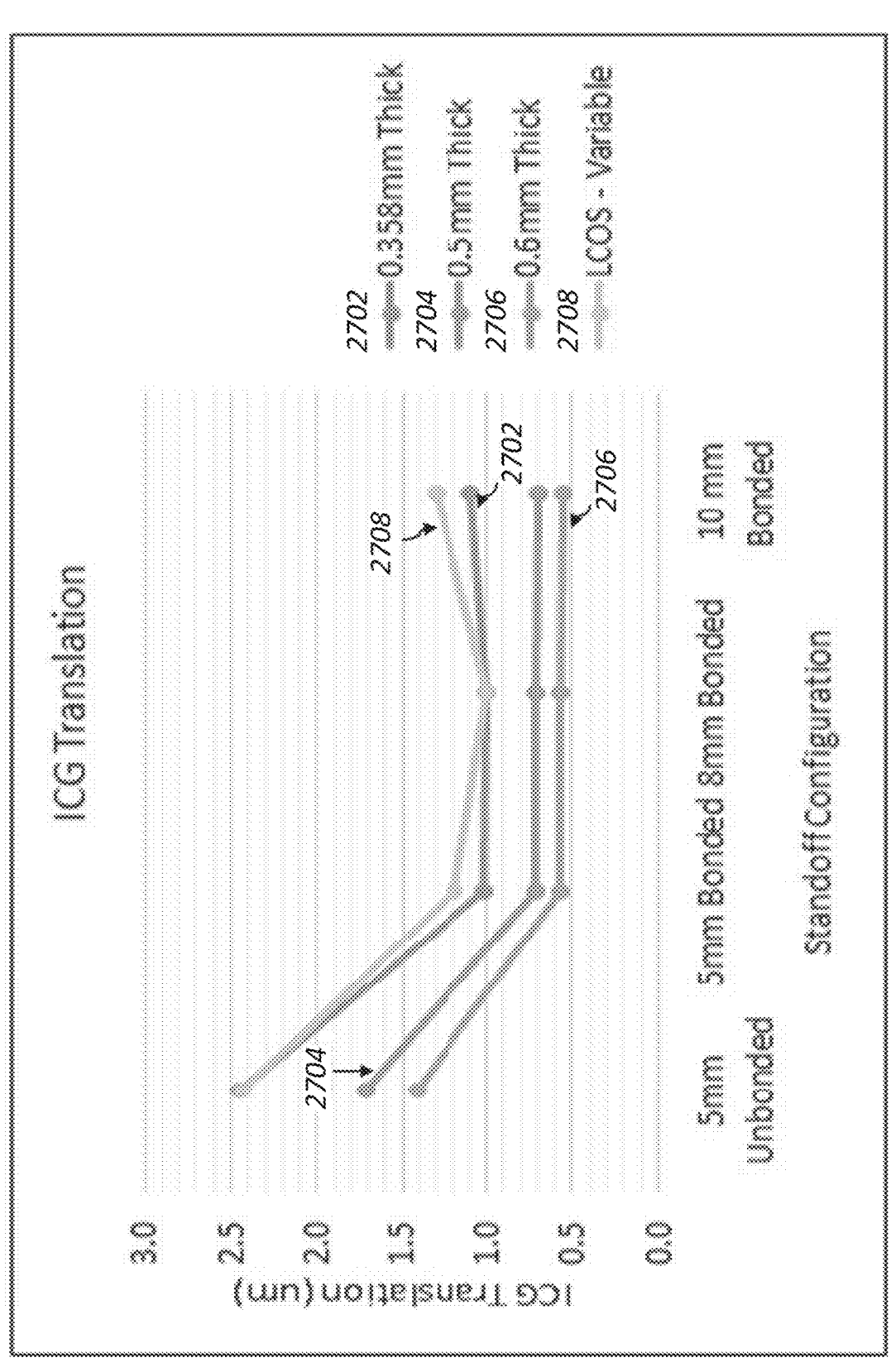
FIG. 27 illustrates a chart illustrating an example of the incoupling grating (ICG) translation for stacks of waveguides having various pillar configurations.

FIGS. 24-27 illustrate simulation results of the effect of the pillar configurations on thermal-stability metrics. Advantageously, as seen in the figures, waveguides having pillars that are adhered or bonded to directly adjacent waveguides exhibited superior thermal and mechanical stability in all tested pillar configurations, and with waveguides of different thicknesses, relative to unbonded pillars. FIG. 24 illustrates a chart showing the surface normal root mean squared (RMS) rotation between waveguides for various pillar configurations. Line 2402 corresponds to a thickness of 0.358 mm. Line 2404 corresponds to a thickness of 0.5 mm. Line 2406 corresponds to a thickness of 0.6 mm. Line 2408 corresponds to a variable thickness Liquid Crystal on Silicon (LCOS). FIG. 25 illustrates a chart showing the radius of top curvature for various pillar configurations. Line 2502 corresponds to a maximum thickness of 0.358 mm. Line 2504 corresponds to a minimum thickness of 0.358 mm. Line 2506 corresponds to a maximum thickness of 0.5 mm. Line 2508 corresponds to a minimum thickness of 0.5 mm. Line 2410 corresponds to a maximum thickness of 0.6 mm. Line 2412 corresponds to a minimum thickness of 0.6 mm. Line 2414 corresponds to a maximum variable thickness Liquid Crystal on Silicon (LCOS). Line 2416 corresponds to a minimum variable thickness Liquid Crystal on Silicon (LCOS). FIG. 26 illustrates a chart showing the in-coupling grating (ICG) tip/tilt for various pillar configurations. Line 2602 corresponds to a thickness of 0.358 mm. Line 2604 corresponds to a thickness of 0.5 mm. Line 2606 corresponds to a thickness of 0.6 mm. Line 2608 corresponds to a variable thickness Liquid Crystal on Silicon (LCOS). FIG. 27 illustrates a chart showing the incoupling grating (ICG) translation for various pillar configurations. Line 2702 corresponds to a thickness of 0.358 mm. Line 2704 corresponds to a thickness of 0.5 mm. Line 2706 corresponds to a thickness of 0.6 mm. Line 2708 corresponds to a variable thickness Liquid Crystal on Silicon (LCOS).

The results of the simulations showed that eyepieces comprising pillars bonded to a major surface of overlying waveguides using one or more of the embodiments described herein had superior thermal and mechanical stability under operation than eyepieces comprising unbonded pillars. In particular, the bonded pillars at a 5 mm distance showed significant improvements in all the thermal-stability metrics compared to an eyepiece comprising unbonded pillars at a 5 mm distance. Furthermore, bonded pillars at a lower density (e.g., 8 mm and 10 mm distance between pillars) had superior thermal-stability metrics than unbonded pillars, despite the unbonded pillars having a higher density (e.g., 5 mm distance between pillars). Thus, pillars bonded to adjacent eyepiece waveguides using one or more of the embodiments herein may reduce eyepiece deformation, relative rotation, tilt, and translational movement of eyepieces under operation (e.g., under spatially nonuniform heating of the eyepiece). Consequently, the bonded pillars may increase the stability of polymer eyepieces by maintaining a fixed distance and angle between adjacent waveguides of the eyepiece. As such, optical performance of polymer eyepieces can be improved by bonding pillars to adjacent eyepiece waveguides using one or more the embodiments described herein.

ALTERNATIVE EMBODIMENTS

As described above, an eyepiece may comprise one or more waveguides comprising layers of the eyepiece. As used herein, the term "waveguide" may be understood as any structure that guides electromagnetic waves by total internal reflection within that structure and may comprise a single layer of a plurality of layers, which may be used to form an eyepiece.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than restrictive sense.

Indeed, it will be appreciated that the systems and methods of the disclosure each have several innovative aspects, no single one of which is solely responsible or required for the desirable attributes disclosed herein. The various features and processes described above may be used independently of one another or may be combined in various ways. All possible combinations and subcombinations are intended to fall within the scope of this disclosure.

Certain features that are described in this specification in the context of separate embodiments also may be implemented in combination in a single embodiment. Conversely, various features that are described in the context of a single embodiment also may be implemented in multiple embodiments separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination. No single feature or group of features is necessary or indispensable to each and every embodiment.

It will be appreciated that conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list. In addition, the articles "a," "an," and "the" as used in this application and the appended claims are to be construed to mean "one or more" or "at least one" unless specified otherwise. Similarly, while operations may be depicted in the drawings in a particular order, it is to be recognized that such operations need not be performed in the particular order shown or in sequential order, or that all illustrated operations be performed, to achieve desirable results. Further, the drawings may schematically depict one more example processes in the form of a flowchart. However, other operations that are not depicted may be incorporated in the example methods and processes that are schematically illustrated. For example, one or more additional operations may be performed before, after, simultaneously, or between any of the illustrated operations. Additionally, the operations may be rearranged or reordered in other embodiments. In certain circumstances, multitasking and parallel processing may be advantageous. Moreover, the separation of various system components in the embodiments described above should not be understood as requiring such separation in all embodiments, and it should be understood that the described program components and systems may generally be integrated together in a single software product or packaged into multiple software products. Additionally, other embodiments are within the scope of the following claims. In some cases, the actions recited in the claims may be performed in a different order and still achieve desirable results.

Accordingly, the claims are not intended to be limited to the embodiments shown herein but are to be accorded the widest scope consistent with this disclosure, the principles and the novel features disclosed herein.

What is claimed is:

1. A near-eye display system comprising:
   a stack of waveguides configured to display images by outputting image light, the stack of waveguides comprising:
   a first waveguide comprising an optically transmissive body, a first major surface, and a pillar integral with the optically transmissive body, the pillar extending vertically from the first major surface;
   a second waveguide comprising an optically transmissive body and a second major surface, the second major surface facing and spaced apart from the first major surface of the first waveguide by the pillar;
   one or more diffractive optical elements in a central area of the first major surface of the first waveguide, wherein the pillar is located in the central area; and
   an adhesive on a top surface of the pillar, the adhesive attaching the pillar to the second major surface of the second waveguide,
   wherein the one or more diffractive optical elements include out-coupling optical elements configured to out-couple light propagating within the optically transmissive body of the first waveguide,
   wherein the optically transmissive body of the first waveguide comprises a first composition of a UV curable material and at least the adhesive on the pillar comprises a second composition of a UV curable material different from the first composition, and
   wherein the second composition comprises a lower concentration of photoinitiator than the first composition.

2. The near-eye display system of claim 1, further comprising a spacer integral with the optically transmissive body, the spacer extending vertically from the first major surface, wherein the spacer extends laterally along a perimeter of the first waveguide.

3. The near-eye display system of claim 2, wherein the spacer defines an edge of the first waveguide.

4. The near-eye display system of claim 2, wherein the first waveguide comprises a plurality of spacers extending vertically from the first major surface and laterally along a perimeter of the first waveguide.

5. The near-eye display system of claim 1, wherein the top surface comprises a roughened surface.

6. The near-eye display system of claim 1, wherein the pillar comprises a maximum transverse cross-sectional dimension of 500 μm or less.

7. The near-eye display system of claim 1, wherein the pillar comprises a maximum transverse cross-sectional dimension of 300 μm or less.

8. The near-eye display system of claim 1, wherein the pillar comprises a maximum transverse cross-sectional dimension of 100 μm or less.

9. The near-eye display system of claim 1, wherein the second major surface of the second waveguide comprises an indentation accommodating the pillar in the indentation.

10. The near-eye display system of claim 9, wherein the stack of waveguides comprises a plurality of waveguides, wherein two or more waveguides of the plurality of waveguides comprise a pillar and an indentation, wherein the indentations accommodate pillars of underlying waveguides.

11. The near-eye display system of claim 1, wherein the pillar comprises a shape selected from the group consisting of rectangular prism, rectangular pyramid, triangular prism, triangular pyramid, cylinder, and cone.

12. The near-eye display system of claim 1, wherein the first and the second waveguide are separated by an air gap having a size defined by the pillar and adhesive.

13. The near-eye display system of claim 1, wherein the one or more diffractive optical elements comprise: in-coupling optical elements configured to in-couple incident image light, wherein the out-coupling optical elements are disposed within the central area.

14. The near-eye display system of claim 13, further comprising a light projector system configured to project the image light to the in-coupling optical elements.

15. A near-eye display system comprising: an eyepiece comprising:
   a waveguide comprising:
   an optically transmissive body comprising at least one pillar integral with the optically transmissive body; and
   out-coupling optical elements configured to out-couple light propagating within the optically transmissive body; and
   an overlying waveguide spaced from the waveguide by the at least one pillar;
   wherein the optically transmissive body comprises a first composition and at least a tip of the at least one pillar comprises a second composition different from the first composition, and
   wherein the second composition comprises a lower concentration of photoinitiator than the first composition, and wherein the second composition comprises at least one of a transparent material, a hydrophilic or superhydrophilic material, or a hydroxyl group.

16. The near-eye display system of claim 15, wherein the out-coupling optical elements comprises a diffractive grating comprising a plurality of protrusions and intervening recesses on a major surface of the optically transmissive body, wherein the at least one pillar extends from the major surface to a height greater than a height of the plurality of protrusions.

17. The near-eye display system of claim 15, wherein the second composition comprises at least the adhesion-promoting layer and wherein the adhesion-promoting layer comprises a silane mixture.

18. The near-eye display system of claim 15, wherein the second composition comprises at least the adhesion-promoting layer and wherein the adhesion-promoting layer forms a top surface of the at least one pillar.

* * * * *